(12) United States Patent
Kunii et al.

(10) Patent No.: US 8,542,974 B2
(45) Date of Patent: Sep. 24, 2013

(54) PORTABLE INFORMATION TERMINAL APPARATUS, INFORMATION PROCESSING METHOD, COMPUTER-PROGRAM STORAGE MEDIUM

(75) Inventors: Koji Kunii, Kanagawa (JP); Masaki Takase, Tokyo (JP); Hiroyuki Shimizu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/433,840

(22) Filed: Mar. 29, 2012

(65) Prior Publication Data

US 2012/0201507 A1 Aug. 9, 2012

Related U.S. Application Data

(60) Continuation of application No. 11/787,393, filed on Apr. 16, 2007, which is a division of application No. 10/084,871, filed on Feb. 27, 2002, now abandoned.

(30) Foreign Application Priority Data

Feb. 28, 2001 (JP) ................................. 2001-053305

(51) Int. Cl.
*H04N 5/932* (2006.01)
(52) U.S. Cl.
USPC .......................................... 386/216; 386/219

(58) Field of Classification Search
None
See application file for complete search history.

(56) References Cited

U.S. PATENT DOCUMENTS

| 6,072,983 | A | 6/2000 | Klosterman |
| 6,437,836 | B1 | 8/2002 | Huang et al. |
| 6,799,327 | B1 | 9/2004 | Reynolds et al. |
| 2005/0028208 | A1 | 2/2005 | Ellis et al. |

FOREIGN PATENT DOCUMENTS

| JP | 10 164483 | 6/1998 |
| JP | 10 222889 | 8/1998 |
| JP | 11 136658 | 5/1999 |
| JP | 2000 13697 | 1/2000 |

*Primary Examiner* — Huy T Nguyen
*Assistant Examiner* — Eileen Adams
(74) *Attorney, Agent, or Firm* — Frommer Lawrence & Haug LLP; William S. Frommer

(57) ABSTRACT

A portable information terminal apparatus generates a first signal, based on the user's operation, that causes a recording/reproducing apparatus to acquire program information. A second signal based on the user's operation, causes the recording/reproducing apparatus to display the acquired program information. A third signal based on the user's operation causes the recording/reproducing apparatus to preset the program for unattended recording. A fourth signal based on the user's operation causes the recording/reproducing apparatus to convert the recorded program to video data in a predetermined file format.

17 Claims, 56 Drawing Sheets

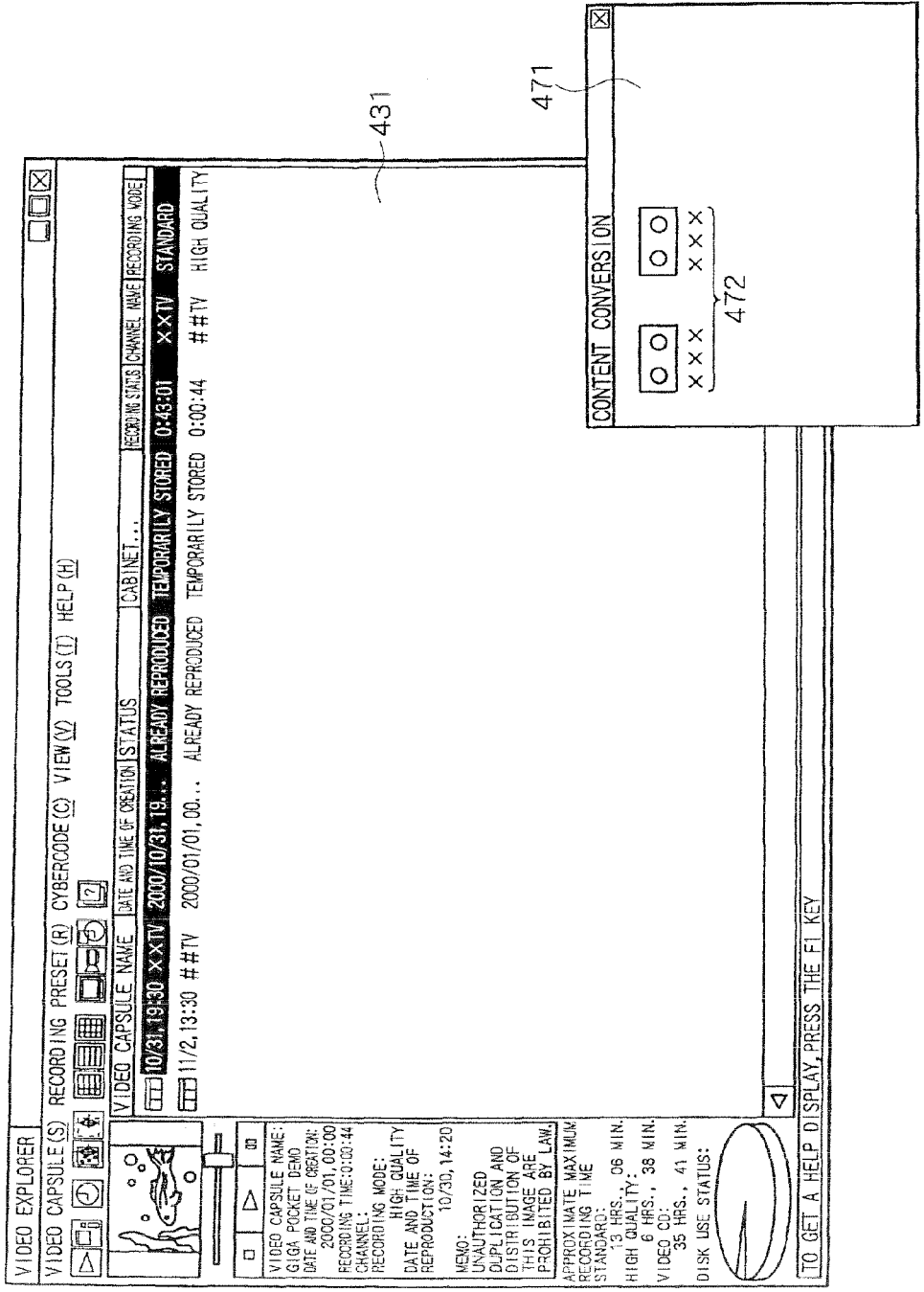

PORTABLE INFORMATION TERMINAL APPARATUS, INFORMATION PROCESSING METHOD, COMPUTER-PROGRAM STORAGE MEDIUM

This application is a continuation of U.S. application Ser. No. 11/787,393, filed Apr. 16, 2007, which is a divisional of U.S. application Ser. No. 10/084,871, filed Feb. 27, 2002 (Abandoned), with a claim of priority under 35 U.S.C. 119 to Japanese Application 2001-053305, filed in Japan on Feb. 28, 2001, the entirety thereof being incorporated herein by reference.

BACKGROUND OF THE INVENTION

The present invention relates to a portable information terminal apparatus, an information processing method, a computer-program storage medium, and a computer-program. More particularly, the invention relates to a portable information terminal apparatus, an information processing method, a computer-program storage medium, and a computer-program, whereby a user operating the portable information terminal apparatus such as a so-called PDA can preset a desired TV program to be recorded unattended.

Some TV program recorders known as VTRs (video tape recorders) allow users to preset desired programs to be later recorded unattended using the so-called G code (trademark of Gemstar Development Corp.). This technology involves the user operating a remote commander to input a G code corresponding to the desired TV program, the G code being transmitted as an infrared ray signal to the VTR. Upon receipt of the infrared ray signal, the VTR decodes the G code carried by the signal to find out the date of broadcast, the name of the TV station concerned, the name of the TV program to be recorded, a program start time, and a program end time for analysis, and presets accordingly the TV program for recording.

Examples of the technology above are disclosed illustratively in U.S. Pat. Nos. 5,335,079 and 5,307,173.

One disadvantage of the above-disclosed method is its complexity of operation. The method requires the user to look up a G code of up to eight digits corresponding to a desired TV program in the program list carried by the newspaper, magazines or other publications and to manually input the selected G code.

Recent years have seen the launch of a service based on a system utilizing a TV program preset website on the Internet allowing users to preset website programs to be later recorded unattended. According to this preset recording system, a user operates a portable information terminal apparatus such as a PDA (Personal Digital Assistant) or a personal computer initially to access a TV program preset website offering TV program information (in the form of a TV program list). Browsing through the program information, the user searches for the desired TV program. Once the desired program is chosen, the user operates a preset button to download the relevant program information describing the name of the TV station concerned, the name of the TV program to be recorded, a program start time, and a program end time.

A disadvantage of the recording preset system above is that users must keep displaying the TV program list on their PDA or personal computer screen after gaining access to the TV program preset website, until they find the programs they have been searching for. The search process is time-consuming and expensive in an online communication environment.

SUMMARY OF THE INVENTION

An object of the present invention is to provide techniques involving a portable information terminal apparatus allowing users to acquire and record program information in advance so that they can later browse through the recorded program information as needed to look up a desired program offline and to preset unattended recording of the desired program.

To achieve the above object, according to a first aspect thereof, there is provided a portable information terminal apparatus connected to a recording/reproducing apparatus, including: a first generating element for generating a first signal for causing the recording/reproducing apparatus to acquire program information about a program, the generation of the first signal being based on an operation performed by a user; a first transmitting element for transmitting to the recording/reproducing apparatus the first signal generated by the first generating element; a second generating element for generating a second signal for causing the recording/reproducing apparatus to display the acquired program information, the generation of the second signal being based on an operation performed by the user; a second transmitting element for transmitting to the recording/reproducing apparatus the second signal generated by the second generating element; a third generating element for generating a third signal for causing the recording/reproducing apparatus to preset the program for unattended recording, the generation of the third signal being based on an operation performed by the user; and a third transmitting element for transmitting to the recording/reproducing apparatus the third signal generated by the third generating element.

In one preferred structure of the portable information terminal apparatus according to the first aspect of the invention, the first transmitting element, the second transmitting element and the third transmitting element may transmit infrared rays modulated to represent the first signal, the second signal and the third signal generated by the first generating element, the second generating element and the third generating element respectively.

In another preferred structure of the portable information terminal apparatus according to the first aspect of the invention, the first transmitting element, the second transmitting element and the third transmitting element may transmit radio waves modulated to represent the first signal, the second signal and the third signal generated by the first generating element, the second generating element and the third generating element respectively.

A further preferred structure information terminal apparatus according to the first aspect of the invention may further includes: a fourth generating element for generating a fourth signal for causing the recording/reproducing apparatus to convert the recorded program to video data in a predetermined file format before outputting the converted video data, the generation of the fourth signal being based on an operation performed by the user; and a fourth transmitting element for transmitting to the recording/reproducing apparatus the fourth signal generated by the fourth generating element.

In an even further preferred structure of the portable information terminal apparatus according to the first aspect of the invention, the fourth transmitting element may transmit infrared rays modulated to represent the fourth signal generated by the fourth generating element.

In a still further preferred structure of the portable information terminal apparatus according to the first aspect of the invention, the fourth transmitting element may transmit radio waves modulated to represent the fourth signal generated by the fourth generating element.

According to a second aspect of the invention, there is provided an information processing method for use with a portable information terminal apparatus connected to a recording/reproducing apparatus, including the steps of:

firstly generating a first signal for causing the recording/reproducing apparatus to acquire program information about a program, the generation of the first signal being based on an operation performed by a user; firstly transmitting to the recording/reproducing apparatus the first signal generated in the first generating step; secondly generating a second signal for causing the recording/reproducing apparatus to display the acquired program information, the generation of the second signal being based on an operation performed by the user; secondly transmitting to the recording/reproducing apparatus the second signal generated in the second generating step; thirdly generating a third signal for causing the recording/reproducing apparatus to preset the program for unattended recording, the generation of the third signal being based on an operation performed by the user; and thirdly transmitting to the recording/reproducing apparatus the third signal generated in the third generating step.

According to a third aspect of the invention, there is provided a computer-program storage medium which stores a computer-program readable by a computer for controlling a portable information terminal apparatus connected to a recording/reproducing apparatus, including the steps of: firstly generating a first signal for causing the recording/reproducing apparatus to acquire program information about a program, the generation of the first signal being based on an operation performed by a user; firstly transmitting to the recording/reproducing apparatus the first signal generated in the first generating step; secondly generating a second signal for causing the recording/reproducing apparatus to display the acquired program information, the generation of the second signal being based on an operation performed by the user; secondly transmitting to the recording/reproducing apparatus the second signal generated in the second generating step; thirdly generating a third signal for causing the recording/reproducing apparatus to preset the program for unattended recording, the generation of the third signal being based on an operation performed by the user; and thirdly transmitting to the recording/reproducing apparatus the third signal generated in the third generating step.

According to a fourth aspect of the invention, there is provided a computer-program for causing a computer connected to a recording/reproducing apparatus to execute the steps of: firstly generating a first signal for causing the recording/reproducing apparatus to acquire program information about a program, the generation of the first signal being based on an operation performed by a user; firstly transmitting to the recording/reproducing apparatus the first signal generated in the first generating step; secondly generating a second signal for causing the recording/reproducing apparatus to display the acquired program information, the generation of the second signal being based on an operation performed by the user; secondly transmitting to the recording/reproducing apparatus the second signal generated in the second generating step; thirdly generating a third signal for causing the recording/reproducing apparatus to preset the program for unattended recording, the generation of the third signal being based on an operation performed by the user; and thirdly transmitting to the recording/reproducing apparatus the third signal generated in the third generating step.

Through the use of the portable information terminal apparatus, information processing method, and computer-program according to the first, the second and the fourth aspects of the invention respectively, an operation carried out by the user generates the first signal for causing the recording/reproducing apparatus to acquire program information about a specific program, and the first signal is transmitted to the recording/reproducing apparatus. Another operation performed by the user generates the second signal for causing the recording/reproducing apparatus to display the acquired program information, and the second signal is transmitted to the recording/reproducing apparatus. Yet another operation effected by the user generates the third signal for causing the recording/reproducing apparatus to preset the program for unattended recording, and the third signal is transmitted to the recording/reproducing apparatus.

According to a fifth aspect of the invention, there is provided a portable information terminal apparatus connected to a recording/reproducing apparatus, including: a first generating element for generating a first signal for causing the recording/reproducing apparatus to acquire program information about a program, the generation of the first signal being based on an operation performed by a user; a first transmitting element for transmitting to the recording/reproducing apparatus the first signal generated by the first generating element; a second generating element for generating a second signal for causing the recording/reproducing apparatus to display the acquired program information, the generation of the second signal being based on an operation performed by the user; a second transmitting element for transmitting to the recording/reproducing apparatus the second signal generated by the second generating element; a third generating element for generating a third signal for causing the recording/reproducing apparatus to preset the program for unattended recording, the generation of the third signal being based on an operation performed by the user; a third transmitting element for transmitting to the recording/reproducing apparatus the third signal generated by the third generating element; and a receiving element for receiving a fourth signal transmitted from the recording/reproducing apparatus.

In one preferred structure of the portable information terminal apparatus according to the fifth aspect of the invention, the first transmitting element, the second transmitting element and the third transmitting element may transmit infrared rays modulated to represent the first signal, the second signal and the third signal generated by the first generating element, the second generating element and the third generating element respectively.

In another preferred structure of the portable information terminal apparatus according to the fifth aspect of the invention, the first transmitting element, the second transmitting element and the third transmitting element may transmit radio waves modulated to represent the first signal, the second signal and the third signal generated by the first generating element, the second generating element and the third generating element respectively.

In a further preferred structure of the portable information terminal apparatus according to the fifth aspect of the invention, the fourth signal may be carried either by infrared rays or by radio waves.

An even further preferred structure of the portable information terminal apparatus according to the fifth aspect of the invention may further includes: a fourth generating element for generating a fifth signal for causing the recording/reproducing apparatus to convert the recorded program to video data in a predetermined file format before outputting the converted video data, the generation of the fifth signal being based on an operation performed by the user; and a fourth transmitting element for transmitting to the recording/reproducing apparatus the fifth signal generated by the fourth generating element.

In a still further preferred structure of the portable information terminal apparatus according to the fifth aspect of the invention, the fourth transmitting element may transmit infrared rays modulated to represent the fifth signal generated by the fourth generating element.

In a yet further preferred structure of the portable information terminal apparatus according to the fifth aspect of the invention, the fourth transmitting element may transmit radio waves modulated to represent the fifth signal generated by the fourth generating element.

According to a sixth aspect of the invention, there is provided an information processing method for use with a portable information terminal apparatus connected to a recording/reproducing apparatus, including the steps of: firstly generating a first signal for causing the recording/reproducing apparatus to acquire program information about a program, the generation of the first signal being based on an operation performed by a user; firstly transmitting to the recording/reproducing apparatus the first signal generated in the first generating step; secondly generating a second signal for causing the recording/reproducing apparatus to display the acquired program information, the generation of the second signal being based on an operation performed by the user; secondly transmitting to the recording/reproducing apparatus the second signal generated in the second generating step; thirdly generating a third signal for causing the recording/reproducing apparatus to preset the program for unattended recording, the generation of the third signal being based on an operation performed by the user; thirdly transmitting to the recording/reproducing apparatus the third signal generated in the third generating step; and receiving a fourth signal transmitted from the recording/reproducing apparatus.

According to a seventh aspect of the invention, there is provided a computer-program storage medium which stores a computer-program readable by a computer for controlling a portable information terminal apparatus connected to a recording/reproducing apparatus, including the steps of: firstly generating a first signal for causing the recording/reproducing apparatus to acquire Program information about a program, the generation of the first signal being based on an operation performed by a user; firstly transmitting to the recording/reproducing apparatus the first signal generated in the first generating step; secondly generating a second signal for causing the recording/reproducing apparatus to display the acquired program information, the generation of the second signal being based on an operation performed by the user; secondly transmitting to the recording/reproducing apparatus the second signal generated in the second generating step; thirdly generating a third signal for causing the recording/reproducing apparatus to preset the program for unattended recording, the generation of the third signal being based on an operation performed by the user; thirdly transmitting to the recording/reproducing apparatus the third signal generated in the third generating step; and receiving a fourth signal transmitted from the recording/reproducing apparatus.

According to an eighth aspect of the invention, there is provided a computer-program for causing a computer connected to a recording/reproducing apparatus to execute the steps of: firstly generating a first signal for causing the recording/reproducing apparatus to acquire program information about a program, the generation of the first signal being based on an operation performed by a user; firstly transmitting to the recording/reproducing apparatus the first signal generated in the first generating step; secondly generating a second signal for causing the recording/reproducing apparatus to display the acquired program information, the generation of the second signal being based on an operation performed by the user; secondly transmitting to the recording/reproducing apparatus the second signal generated in the second generating step; thirdly generating a third signal for causing the recording/reproducing apparatus to preset the program for unattended recording, the generation of the third signal being based on an operation performed by the user; thirdly transmitting to the recording/reproducing apparatus the third signal generated in the third generating step; and receiving a fourth signal transmitted from the recording/reproducing apparatus.

Through the use of the portable information terminal apparatus, information processing method, and computer-program according to the fifth, the sixth and the eighth aspects of the invention respectively, an operation carried out by the user generates the first signal for causing the recording/reproducing apparatus to acquire program information about a specific program, and the first signal is transmitted to the recording/reproducing apparatus. Another operation performed by the user generates the second signal for causing the recording/reproducing apparatus to display the acquired program information, and the second signal is transmitted to the recording/reproducing apparatus. Yet another operation effected by the user generates the third signal for causing the recording/reproducing apparatus to preset the program for unattended recording, and the third signal is transmitted to the recording/reproducing apparatus. In turn, the portable information terminal apparatus receives the fourth signal that is transmitted from the recording/reproducing apparatus.

BRIEF DESCRIPTION OF THE DRAWINGS

FIG. 56 is an explanatory view showing how a content conversion process is executed from the AV content management/search screen.

DETAILED DESCRIPTION OF THE PREFERRED EMBODIMENTS

Preferred embodiments of this invention will now be described by referring to the accompanying drawings.

Figure 1:
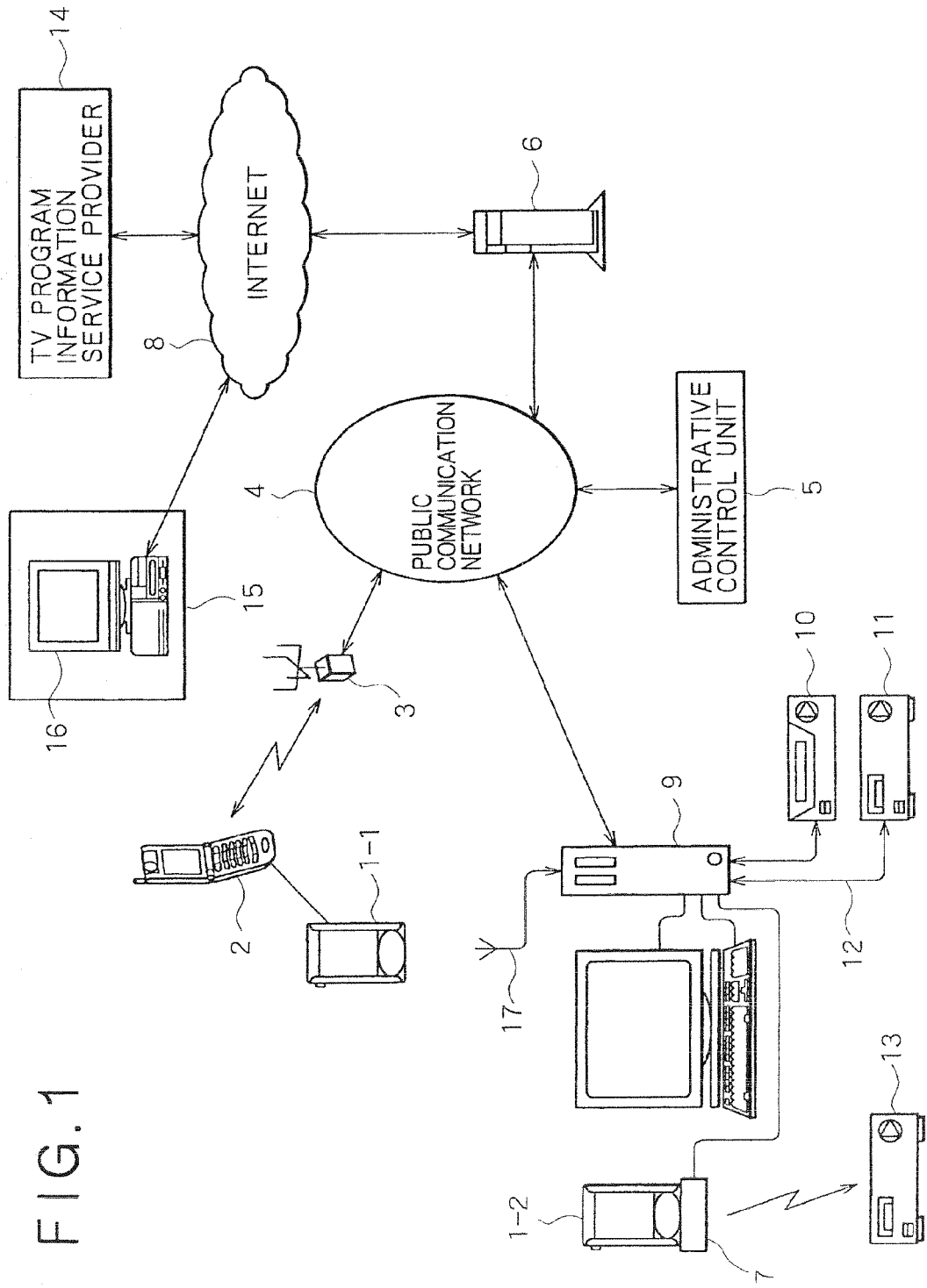
FIG. 1 is a schematic view showing a typical configuration of a TV program data acquisition system according to the present invention.

FIG. 1 is a schematic view showing a typical configuration of a TV program data acquisition system according to the invention.

In FIG. 1, PDA 1-1 and PDA 1-2 are each a portable information terminal apparatus running on a Palm OS (trademark). The PDAs may be connected in a wired or wireless manner to a digital portable telephone 2, a personal computer 9, and a VCR (video cassette recorder) 13. In the setup of FIG. 1, the PDA 1-1 is wired to the digital portable telephone 2 via a communication module, not shown. The PDA 1-2 is wired to the personal computer 9 through a cradle 7 and is connected wirelessly to the VCR 13. Obviously, the PDA 1-1 and PDA 1-2 may also be connected to any of the digital portable telephone 2, personal computer 9 and VCR 13 or may operate on a stand-alone basis.

In the description that follows, the PDA 1-1 and PDA 1-2 will be referred to generically as the PDA 1 except where they need to be distinguished from one another.

The cradle 7 is an interface device that connects the PDA 1 with the personal computer 9 to carry out what is called a hot sync process. This is the process of synchronizing files and data between two computers of different types, i.e., between the PDA 1 running on the Palm OS on the one hand and the personal computer 9 on the other hand. The synchronization is made possible regardless of dissimilar computer models. Illustratively, the cradle 7 interfaces with the PDA 1 through an RS-232C port and with the personal computer 9 through a serial bus interface or a USB (universal serial bus).

The digital portable telephones 2 connect with a base station 3 (fixed wireless terminal) allocated to each of so-called cells suitably dividing the area where the communication service is offered. The base station 3 allows the digital portable telephones 2 to link up with a public communication network 4. The personal computer 9 is also connected to the public communication network 4.

The base station 3 connects wirelessly with each digital portable telephone 2 (mobile wireless terminal) on a W-CDMA (Wideband-Code Division Multiple Access) basis. The wireless connection ensures high-speed communication of large quantities of data between the base station 3 and the digital portable telephone 2 at data transfer speeds of up to 2 Mbps over a 2-GHz frequency band.

The base stations 3 are wired to the public communication network 4. The public communication network 4 is connected to the Internet 8 via an access server 6 of an Internet service provider. The network 4 is also connected to wired subscriber terminal equipment, computer networks, and local area networks such as those inside corporations, not shown.

The digital portable telephone 2 is capable of exchanging large amounts of data at high speed with the base station 3 on a W-CDMA basis. Through the digital portable telephone 2 that it hooks up to, the PDA 1 can send and receive e-mail, browse simple-format websites, send and receive image data, and perform many other forms of data communication.

The PDA 1-1 connects with a TV program information service provider 14 via the digital portable telephone 2, base station 3, public communication network 4, access server 6, and the Internet 8. Through the connection, the PDA 1-1 may request the service provider 14 to transmit TV program information. The transmitted program information allows the PDA user to look up a TV program list and preset accordingly the unattended recording of a desired program broadcast by a particular TV station. As with the PDA 1-1, the personal computer 9 also connects with the TV program information service provider 14 via the public communication network 4, access server 6, and the Internet 8. Through the connection, the personal computer 9 can request the service provider 14 to transmit TV program information so that the PC user may likewise perform what the PDA user was shown carrying out above.

In reference to FIG. 1, the PDA 1-1 was described above as capable of connecting with the public communication network 4 via the digital portable telephone 2 and base station 3. Alternatively, the PDA 1-1 may gain access to the public communication network 4 through a PHS (Personal Handyphone System) terminal or a data card-type PHS terminal linked to a suitable base station that provides PHS call services.

When connected to the digital portable telephone 2, the PDA 1-1 obeys a simple-format transport protocol of 2 Mbps for connection to the base station 3 and in accordance with TCP/IP (Transmission Control Protocol/Internet Protocol) for communication from the base station 3 to the TV program information service provider 14 and a WWW (Word Wide Web) server, not shown, over the Internet 8.

An administrative control unit 5 is connected to wired subscriber terminal equipment, to the personal computer 9 or to the digital portable telephone 2 via the public communication network 4. Through the connection, the administrative control unit 5 performs authentication, settlement of charges and other related processes with regard to the wired subscriber terminal equipment, personal computer 9 or digital portable telephone 2.

The personal computer 9 admits signals from an antenna 17 that receives radio waves from TV stations. From the input signal, the personal computer 9 reproduces video and audio data (i.e., images and sounds of TV programs) and records them. The personal computer 9 further receives analog signals from a VCR 10 or digital data from a DVCR (digital video cassette recorder) 11 through a network 12 such as an IEEE (Institute of Electrical and Electronic Engineers) 1394 network. The personal computer 9 then reproduces and records images and sounds derived from the analog signals or digital data thus received.

The personal computer 9 supplies analog signals representing recorded sounds and images to the VCR 10 or feeds digital data constituting recorded sounds and images to the DVCR 11. Furthermore, the personal computer 9 receives TV program information from the TV program information service provider 14 over the Internet 8. Upon receipt of the program information, the personal computer 9 forwards the information to the PDA 1-2 or presets accordingly a TV program to be later recorded unattended.

The TV program information service provider 14 provides the service of offering users TV program lists, detailed introductions to specific programs and other relevant information by way of the Internet 8. An internal database of the service provider 14 contains EPG (electronic program guide) information, TV program information used to preset unattended recording of particular TV programs from particular TV stations, advertisement information distributed along with the program information, and user information about registered users.

The TV program information service provider 14 receives a message requesting transmission of TV program information pertaining to a specific date. The message is sent from the PDA 1-1 or personal computer 9 connected to the digital portable telephone 2. In response to the message, the service provider 14 transmits the program information to the PDA 1-1 or personal computer 9 through the digital portable telephone 2 and by way of the Internet 8, access server 6, and public communication network 4, for use in presetting unattended recording of a specific program from a specific TV station.

The TV program information service provider 14 offers TV program information in pdb (Palm Database) format files to the personal computer 9 or to the PDA 1 in response to requests from the latter. Web-based TV program information offered by existing TV program service providers has been typically described in such page description languages as HTML (HyperText Markup Language), XML (eXtensible Markup Language) and Compact-HTML. While being fit for general use, the program information written in these languages tends to be bulky and structured hierarchically using tags. That means the data are flexible in terms of formats but require analysis before use following their retrieval. In its related-art form, the program information is thus not very suitable for browsing by the PDA 1.

By contrast, the pdb format is a general-purpose database format compatible with the Palm OS. Binary data and text data can be stored in mixed fashion in the pdb format that is dependent on Palm OS applications. Because pdb-format data are converted by a converter to a specific format, there is no need for data analysis. With no extra tag information to deal with, the amount of the data can be minimized.

Related-art terrestrial broadcasting setups were subject to limited numbers of available channels carrying TV programs. Today's widespread acceptance of satellite broadcasts and cable TV distributions has resulted in a far larger number of available channels. If the TV program information service provider 14 were to address broadcast services with multitudes of channels by furnishing the user with program information about all available channels, then the quantity of the data involved would be so enormous that the user would find it extremely difficult to search the offered program information for a desired TV program using the PDA 1 with its small display screen.

The problem above is bypassed by the TV program information service provider 14 accepting from each user a registration of desired TV channels in advance. The registered user is then supplied with program information about the desired channels. The TV program information service provider 14 issues a unique user ID to each user who has registered desired TV channels.

On receiving from the personal computer 9 or PDA 1-1 a request including a user ID for transmission of TV program information, the TV program information service provider 14 determines whether the user in question is a registered user. If the user is judged to be properly registered, the service provider 14 looks up the registered content applicable to the user ID, selects program information about the TV channels based on the registered content, and transmits the selected program information in keeping with a designated date. Upon receipt of a program information transmission request without a user ID, the TV program information service provider 14 transmits a relatively small quantity of terrestrial broadcast program information about the most-commonly-watched channels in keeping with a specified date.

In that manner, the TV program information service provider 14 can furnish users with desired TV program information that addresses multiple-channel broadcast services covering satellite broadcasts and cable TV distributions.

The Internet 8 is connected with personal computers 16 owned by corporations 15 and with numerous WWW servers, not shown. While only one personal computer 16 of a corporation is shown connected to the Internet 8 in FIG. 1, it is obvious that a plurality of personal computers 16 are in fact connected. The WWW servers, not shown, are accessed in accordance with TCP/IP by the PDA 1-1, by the personal computer 9, or by personal computers 16 owned by corporations 15.

The corporation 15 in FIG. 1 is assumed to be a sponsor for advertisement attached to the program information offered by the TV program information service provider 14. Using a personal computer 16 typically over the Internet 8, the corporation 15 asks the service provider 14 to carry advertisement and is charged a fee for the advertisement.

Alternatively, the corporation 15 may ask the TV program information service provider 14 to carry advertisement and be charged a fee for the advertisement by mail or by other suitable offline means.

Figure 2:
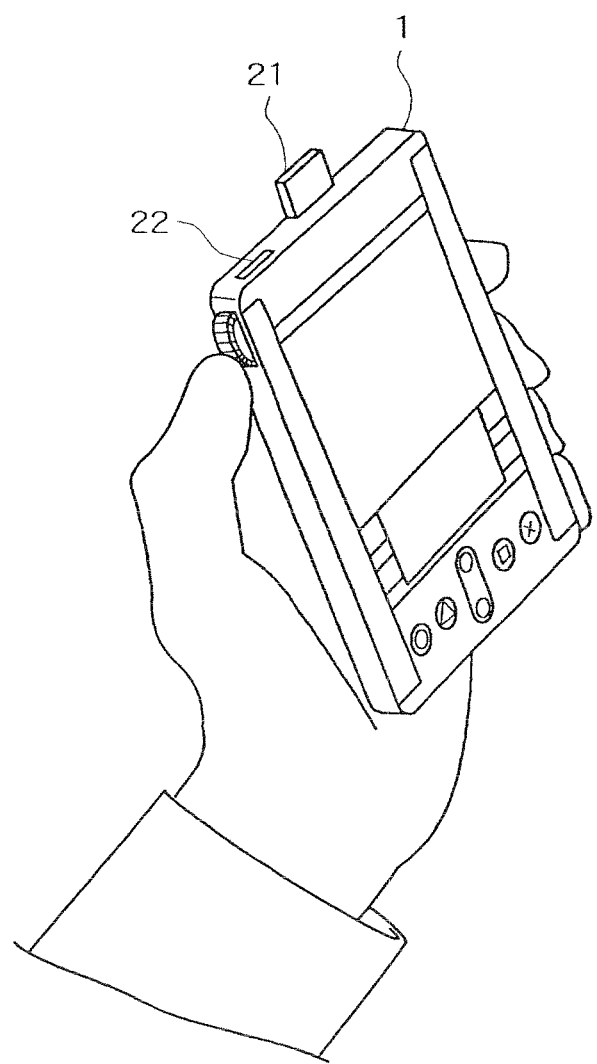
FIG. 2 is a perspective view of a PDA included in the setup of FIG. 1.
Figure 3:
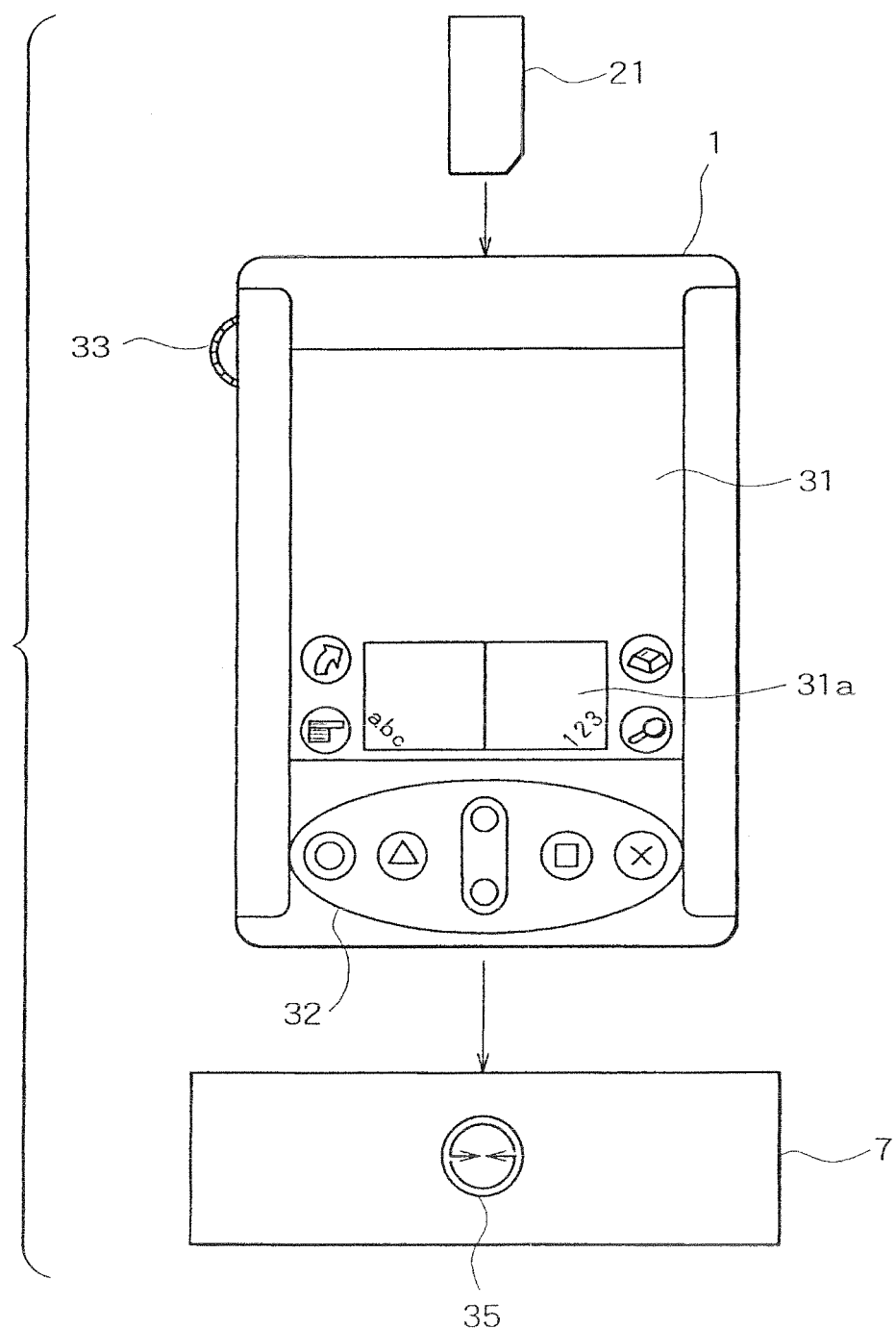
FIG. 3 is a front view of the PDA in FIG. 1.

FIGS. 2 and 3 are provided to show what the PDA 1 typically looks like and how it is structured. FIG. 2 is a perspective view of the PDA 1 as gripped by a user's hand. FIG. 3 is a front view of the PDA 1.

The PDA 1 is housed in an enclosure small enough to be gripped and handled by a single hand. At the top of the PDA 1 is a slot that accommodates a memory card 21 incorporating a semiconductor memory. Also located at the top is an infrared communication unit 22 that exchanges information with other devices. The PDA 1 further comprises a wireless LAN (local area network) communication unit 64, not shown (but is included in FIG. 5).

At the bottom of the PDA 1 are a modem, not shown, for connecting with the public communication network 4, and a USB port or an RS-232C port, not shown, for exchanging data with other devices. This PDA 1 is assumed to possess an RS-232C port. Also furnished on the PDA 1 are a display unit 31, keys 32, and a jog dial 33.

The display unit 31 is made of a thinly formed display device such as a liquid crystal display which gives displays of icons, thumbnail images and text. In the lower part of the display unit 31 is a touch pad 31*a* that the user may push by fingertips or by a pen to enter relevant data or operation commands into the PDA 1.

The keys 32 are operated by the user to input various commands into a CPU (central processing unit) 41 (see FIG. 4) of the PDA 1.

The jog dial 33 is rotated on its axis or pushed into the enclosure by the user selecting an icon, a thumbnail image or a text portion appearing on the display unit 31. With a plurality of icons displayed on the display unit 31, the user may rotate the jog dial 33 to reach a desired icon and then push the dial into the enclosure. The pushing action finalizes the selection of the currently displayed icon. If the finalized icon corresponds to an application program, that program is then started.

Alternatively, a rotate-while-push action of the jog dial 33 may be arranged to correspond with commands different from those of ordinary dial rotating operations. Illustratively, with a TV program list of a given channel shown on the display unit 31, turning the jog dial 33 may feed the program list of the same channel until a desired program name is reached; turning the jog dial 33 while pushing it may call up a TV program list of a different channel on the display unit 31.

The correspondence between the operations of the jog dial 33 and what actually occurs in the apparatus is not limited to what was described above. Any other operation-performance combinations may be devised and implemented as desired on the PDA.

The PDA 1 is designed to be mountable on the cradle 7. The cradle 7 connects with the PDA 1 illustratively through the RS-232C interface. The PDA 1 automatically determines whether it is currently connected to the cradle 7. The cradle 7 has a hot sync button 35. With the PDA 1 mounted on the cradle 7, pushing the hot sync button 35 causes the PDA 1 and personal computer 9 to carry out the hot sync process to synchronize files and data therebetween.

Figure 4:
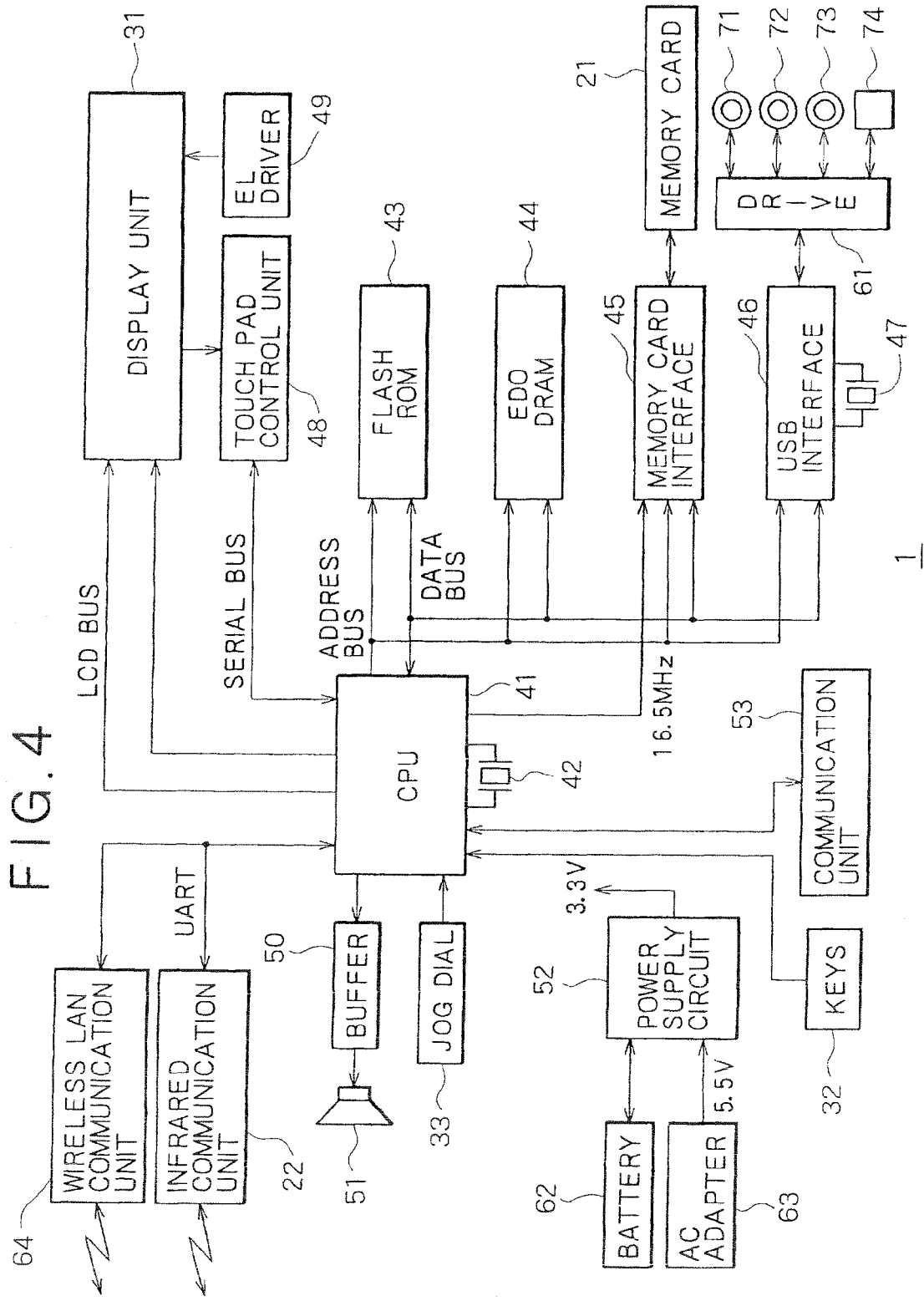
FIG. 4 is a block diagram depicting a typical electrical structure of the PDA in FIG. 1.

FIG. 4 is a block diagram depicting a typical electrical structure of the PDA 1.

In synchronism with a clock signal from an oscillator 42, the CPU 41 runs the operating system and performs various programs such as application programs, all retrieved from a flash ROM (read-only memory) 43 or an EDO-DRAM (extended data-out dynamic random-access memory) 44.

The flash ROM 43 is made up of a flash memory, a variation of EEPROM (electrically erasable programmable read-only memory). Generally, the flash ROM 43 accommodates basically fixed data as part of those constituting programs and operation parameters used by the CPU 41. The EDO-DRAM 44 stores programs executed by the CPU 41, data needed for the program execution, and parameters varied as needed during the execution.

A memory card interface 45 reads data from the memory card 21 loaded in the PDA 1 and writes data coming from the CPU 41 to the memory card 21.

The memory card 21 is illustratively a Memory Stick (trademark), a variation of flash memory card developed by this applicant. The memory card 21 is composed of flash memory elements housed in a plastic case measuring 21.5 mm by 50 mm by 2.8 mm. The memory elements constitute an EEPROM, a nonvolatile read-only memory that is electrically erasable and programmable. Through a 10-pin terminal, various data including image, voice and music data may be written to and read from the memory card 21.

The Memory Stick adopts a proprietary serial protocol that ensures the compatibility of the memory with a host device having undergone specification changes of a built-in flash memory for a larger storage capacity. Data are written to and read from the Memory Stick at high speeds of up to 1.5 MB/S and 2.45 MB/S respectively. A write-protect switch is provided to ensure high reliability of the memory.

when accommodating the memory card 21 of the above-described type, the PDA 1 can readily share data with other electronic devices through the card.

In synchronism with a clock signal from an oscillator 47, a USB interface 46 admits data or programs from a drive 61, i.e., an attached USB device, and feeds data coming from the CPU 41 to the drive 61.

The drive 61 reads data or programs from a magnetic disk 71, an optical disk 72, a magneto-optical disk 73, or a semiconductor memory 74 loaded into the drive as needed. The data or programs thus retrieved are fed to the CPU 41 or EDO-DRAM 44 through the USB interface 46. The drive 61 also writes data or programs to the magnetic disk 71, optical disk 72, magneto-optical disk 73, or semiconductor memory 74 that is loaded in the drive.

The flash ROM 43, EDO-DRAM 44, memory card interface 45, and USB interface 46 are connected to the CPU 41 via an address bus and a data bus.

The display unit 31 receives data from the CPU 41 through an LCD bus and displays images or characters represented by the received data. When the display unit 31 or the touch pad 31*a* is operated, a touch pad control unit 48 receives data representative of the operation (e.g., coordinates of the touched location) from the display unit 31 or touch pad 31a and supplies a signal denoting the received data to the CPU 41 through the serial bus.

An EL (electroluminescence) driver 49 drives electroluminescent elements at the back of a liquid crystal display portion of the display unit 31, controlling the brightness of displays on the display unit 31.

The infrared communication unit 22 receives data from the CPU 41 through a UART (universal asynchronous receiver-transmitter) and sends the received data as infrared ray signals to an external device, not shown. The unit 22 also receives infrared ray signals from the external device and transfers the received signals to the CPU 41. The UART also allows the PDA 1 to communicate with other devices.

The wireless LAN communication unit 64 is used to communicate wirelessly with other devices (e.g., in a wireless communication setup based on Bluetooth that is a wireless communication scheme utilizing a 2.4-GHz frequency band). Data received from the CPU 41 are converted by a predetermined method into radio waves that are transmitted to other devices, not shown. Radio waves sent from another device are received by the wireless LAN communication unit 64 which in turn supplies the CPU 41 with data represented by the received radio waves.

An audio reproduction unit 51 is made up of speakers and audio data decoding circuits. As such, the unit 51 decodes and audibly outputs audio data that were previously recorded by the PDA 1 or received from another device. Illustratively, the audio reproduction unit 51 is supplied with audio data from the CPU 41 via a buffer 50, reproduces the supplied data, and gives an audible output representative of the data.

A power supply circuit 52, connected to a loaded battery 62 or an attached AC (alternating current) adapter 63, converts the supplied voltage into power at suitable levels. The power is then fed to the components ranging from the CPU 41 to the audio reproduction unit 51.

A communication unit 53 is connected to the cradle 7 or to a communication module illustratively through the RS-232C interface. Typically, the communication unit 53 connects with the Internet 8 via the communication module and digital portable telephone 2. Using a suitable packetizing method, the communication unit 53 arranges data from the CPU 41 (e.g., e-mail) into packets that are sent to other devices over the Internet 8. Upon receipt of packets from another device over the Internet 8, the communication unit 53 retrieves data or programs from the packets and outputs what is retrieved to the CPU 41.

Figure 5:
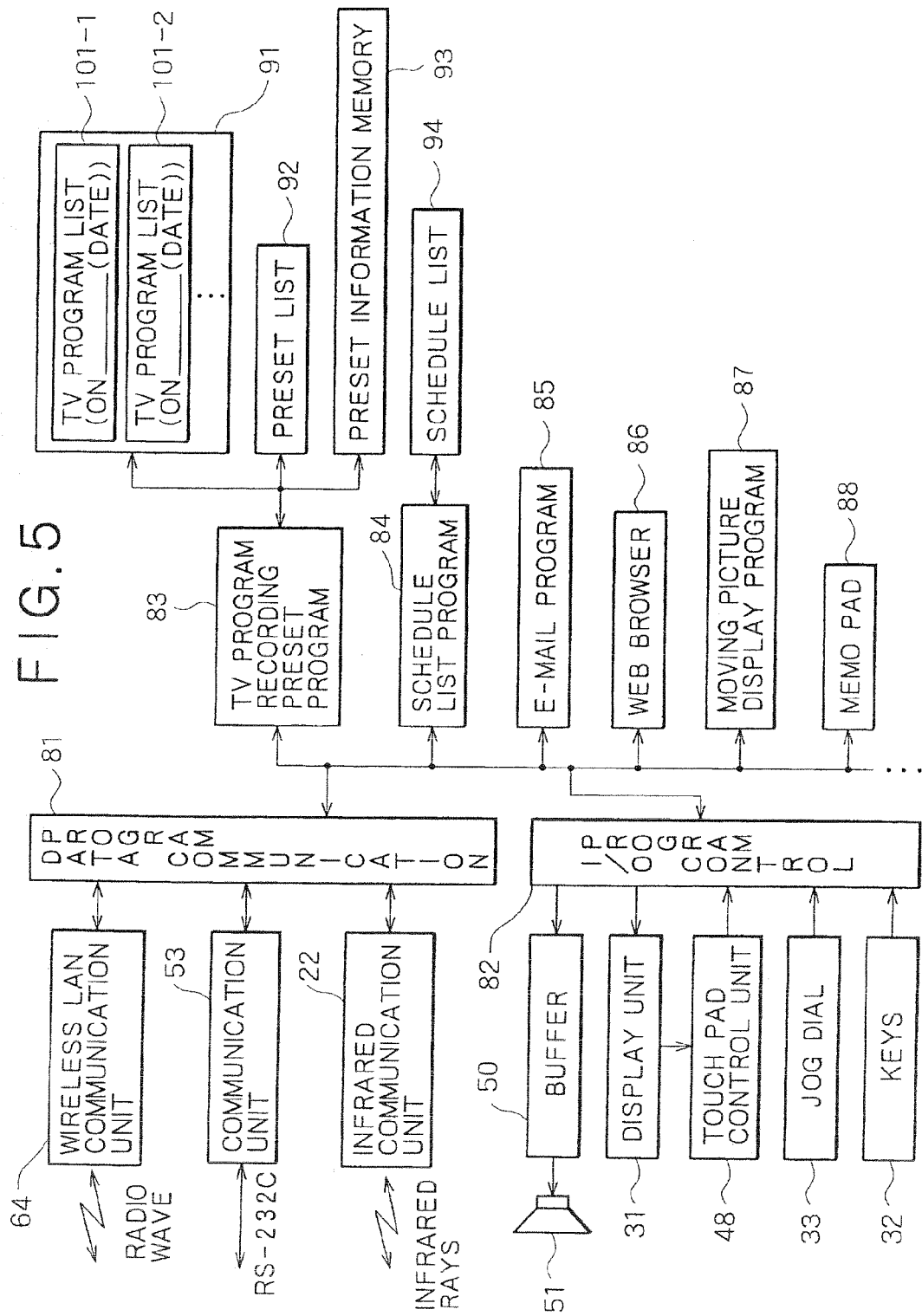
FIG. 5 is a function block diagram of the PDA in FIG. 1.

FIG. 5 is a function block diagram of the PDA 1. With the PDA 1 at hand, a user may utilize such basic functions as address book, memo pad, e-mail and schedule list and may execute various applications called Palmware. All functions (i.e., programs) shown in FIG. 5 run under the Palm OS.

A data communication program 81 controls communications that may take place between an application run by the CPU 41 (e.g., TV program recording preset program 83) on the one hand, and other devices on the other hand. The communications are effected through the communication unit 53, infrared communication unit 22, or wireless LAN communication unit 64.

An I/O control program 82 furnishes a given application with signals representing operations or commands performed or entered by the user using the display unit 31, touch pad 31a, or keys 32. Based on the processing of the application executed by the CPU 41, the I/O control program 82 further controls output of data through the buffer 50 to the audio reproduction unit 51 for audio playback or to the display unit 31 for image display.

In accordance with the user's operation, a TV program recording preset program 83 writes to a preset information memory a date for which to acquire TV program information along with the program broadcast region of interest, remote commander mode, and/or user information including a member ID. In turn, the TV program recording preset program 83 downloads relevant program lists 101-1 and 101-2 from the TV program information service provider 14 and stores the downloaded lists into a TV program list memory 91. In order to preset desired TV programs for unattended recording, the user performs operations to select relevant program information from the program lists 101-1 and 101-2 held in the TV program list memory. When selected, the program information is established as preset information in a preset list 92 by the TV program recording preset program 83. The preset program 83 also causes the program list 101 stored in the TV program list memory 91, preset information established in the preset list 92, or user information held in a preset information memory 93, to be displayed on the display unit 31. Furthermore, in keeping with the user's operation, the TV program recording preset program 83 stores or establishes new information in the TV program list memory 91, preset list 92, or preset information memory 93 or updates what is stored or established in these memories or list.

A schedule list program 84 is a schedule management program that allows the use to register his or her schedule in a schedule list along with start and end times of the events involved, their locations, and other details. Based on the user's operation, the schedule list program 84 writes new information to the schedule list 94 or updates what is stored therein. In addition, the schedule list program 84 allows the user to set an alarm that will be activated illustratively five or ten minutes before a specific start time so as to remind the user of the approaching event scheduled earlier.

An e-mail program 85 is a software program that transmits and receives e-mail to and from the access server 6.

A Web browser 86 is a software program that allows the client side to browse information provided by WWW servers. Between a WWW server and a WWW client, the Web browser 86 ensures communications based on appropriate communication protocols (HTTP and HTML). The Web browser 86 also ensures security in communication, provides reproduction of multimedia data such as audio data and moving picture data, and supports extended language (e.g., Java) enabling program transfer between the WWW server and the WWW client.

A moving picture display program 87, under control of the I/O control program 82, performs data conversion and image processing causing the display unit 31 to display moving picture data retrieved from any one of the magnetic disk 71, optical disk 72, magneto-optical disk 73 and semiconductor memory 74 loaded in the drive 61.

A memo pad 88 is a text editor program which, under control of the I/O control program 82, receives signals reflecting text data entered by the user operating the touch pad 31a. Text data are generated corresponding to the received signals and are displayed on the display unit 31 under control of the I/O control program 82.

The programs outlined above all run under the Palm OS.

Figure 6:
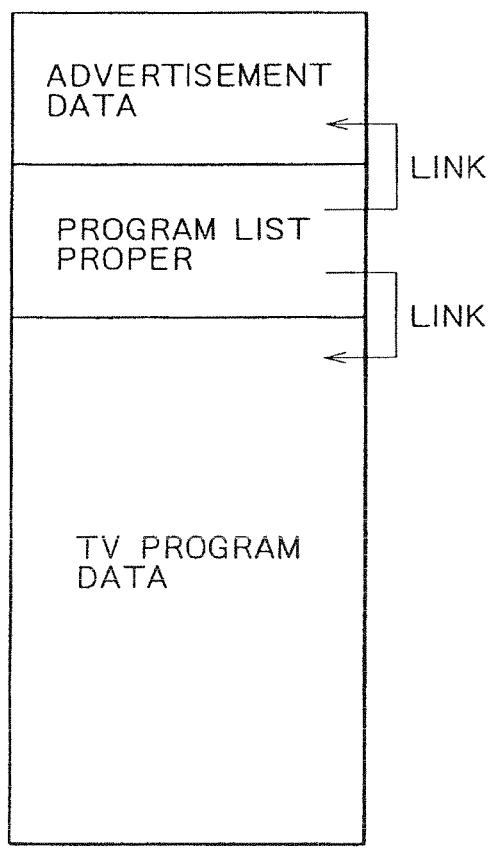
FIG. 6 is a schematic view indicating a typical data structure of a TV program list recorded to a TV program list memory shown in FIG. 5.

As shown in FIG. 6, the TV program list 101 is constituted by advertisement data, a program list proper, and program data. The advertisement data are data that describe an advertisement entrusted by each corporation 15. Typically, the advertisement data may include information such as a URL (Uniform Resource Locator) of the website run by the corporation 15 and an e-mail address through which the corporation 15 accepts inquiries from the public, or reference information allowing the public to send or receive the advertisement data using a protocol other than TCP/IP commonly adopted on the Internet.

Because advertisement data are sent to users possessing the PDA 1, it is conceivable more or less to identify a particular group of users to which particular advertisement data can be targeted. Illustratively, it is possible effectively to sell targeted PDA users on Palm OS applications, new mobile computers, and novel personal computers using suitable advertisements.

As its name implies, the TV program list is a list TV programs that are to be broadcast over specific channels on a particular date. The program data illustratively describe the cast of each program, program contents, and other detailed information associated with the program.

The TV program list is linked to advertisement data and program data. That is, each program list is displayed together with a plurality of advertisements that are changed periodically. When the user selects a specific TV program name from the program list, the program data about that program are displayed. The advertisement data contain information designating a display time during which the advertisement is allowed to appear continuously on the PDA 1. The TV program recording preset program 83 changes the advertisement data on display by referring to the display time information included in the data.

If the display time information specifies an extremely short time or a very long time, the user may feel uncomfortable being interminably fed with, or abruptly deprived of, the advertisement. To avert that eventuality, the TV program recording preset program 83 may automatically set the advertisement data display time for, say, five seconds if the previously set time is anything other than three to seven seconds.

Where each set of TV program information is furnished with a plurality of advertisements switched over time, the business operator running the TV program information service provider 14 can gain more advertisement revenues than before.

If necessary, the advertisement data, program list proper, and program data making up the TV program list 101 may be provided with valid period information, update time limit information, and/or version information about the data involved. The program data are updated in one of two ways using such information.

On the one hand, if valid period information is contained in the advertisement data, program list proper, and program data making up the TV program list, then the TV program recording preset program 83 checks periodically or at certain events (e.g., upon writing of new data to the TV program list 101) whether or not the TV program list 101 has any expired data. If any expired data are detected, the preset program 83 attempts to update the data. Even if the updated data turn out to be identical to the old data, the data in the TV program list 101 are simply overwritten.

On the other hand, suppose that when a data update time limit or version information is contained in the advertisement data, program list proper, and program data making up the TV program list, the TV program recording preset program 83 is to write new data to the TV program list 101. In that case, based on the data update time or version information, the recording preset program 83 checks the data source (e.g., personal computer 9, another PDA 1, or TV program information service provider 14) to see whether the most recent information (updated information) is available. If the latest information is judged available, the program 83 obtains the information anew.

One of the two updating methods above may be adopted depending on the updating frequency or the size of the data involved. Illustratively, if the updating cycle is constant, then the data in the TV program list 101 may be furnished with valid period information eliminating any additional and wasteful communications. If an exact update time is uncertain, then it is better to furnish the data making up the TV program list 101 with data update time or version information whereby the latest information is made available reliably.

When TV program information (TV program list 101) is exchanged between the PDA 1-1 and the PDA 1-2 or between the PDA 1-2 and the personal computer 9, advertisement data are first to be transmitted ahead of the program list proper and program data. If advertisement data are deleted from the TV program list 101 or if program information excluding any advertisement data is written to the TV program list memory 91 as a TV program list 101, then the TV program recording preset program 83 will not display the program list 101 corresponding to the specified date, giving a warning message such as this: "The TV program list for this date cannot be displayed. Please download data again."

Figure 7:
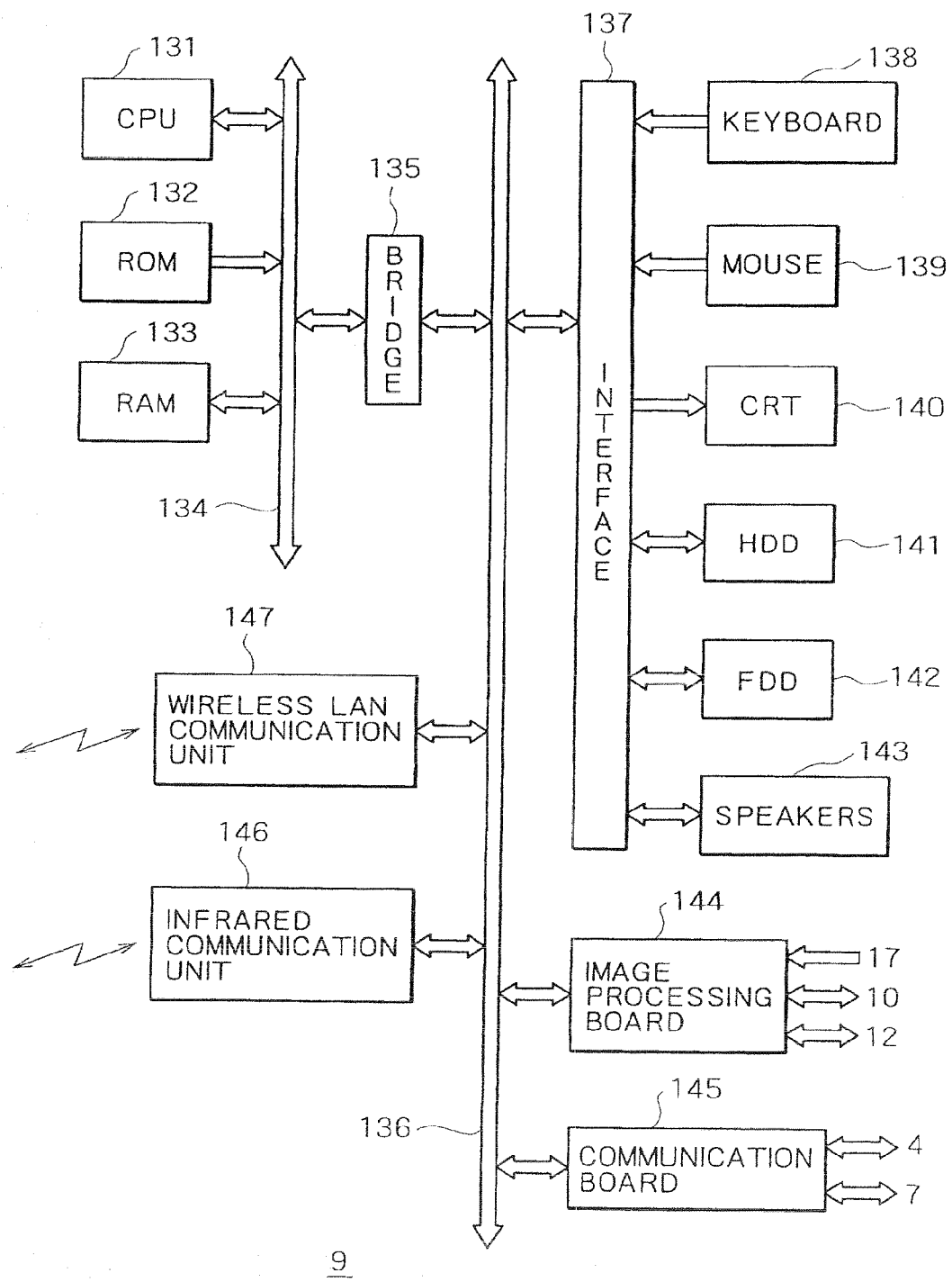
FIG. 7 is a block diagram illustrating a typical structure of a personal computer included in FIG. 1.

FIG. 7 is a block diagram depicting a typical structure of the personal computer 9.

In the setup of FIG. 7, a CPU 131 carries out various application programs under a basic OS (operating system). A ROM 132 generally accommodates basically fixed data as part of those constituting programs and operation parameters used by the CPU 131. A RAM 133 stores programs executed by the CPU 131 and parameters varied as needed during the program execution. These components are interconnected via a host bus 134 constituted by a CPU bus or a memory bus.

A host bus 134 is connected via a bridge 135 to an external bus 136 such as a PCI (Peripheral Component Interconnect/Interface) bus.

A keyboard 138 is operated by the user entering various commands into the CPU 131. A mouse 139 is also operated by the user pointing to and making choices on the screen of a CRT (cathode ray tube) 140. The CRT 140 displays diverse kinds of information in text and images. A hard disk drive (HDD) 141 and a floppy disk drive (FDD) 142 drive a hard disk and a floppy disk respectively, writing programs and information to and from the disks for execution by the CPU 131. Speakers 143 provide audio reproduction. The components ranging from the keyboard 138 to the speakers 143 are connected to an interface 137. In turn, the interface 137 is connected to the CPU 131 via the external bus 136, bridge 135, and host bus 134.

An image processing board 144 under control of the CPU 131 generates video and audio data based on video and audio analog signals from the antenna 17 or VCR 10 or on the basis of video and audio digital data coming from the DVCR 11 through the network 12. The video and audio data thus generated are output to the hard disk drive 141 via the external bus 136 and interface 137.

The image processing board 144 also admits video and audio data retrieved from the hard disk drive 141 via the external bus 136 and interface 137. In turn, the image processing board 144 generates analog signals representing the input video and audio data before supplying the generated signals to the VCR 10, or produces digital data denoting the input video and audio data so as to feed the produced data to the DVCR 11 over the network 12.

In the setup of FIG. 7, the image processing board 144 is connected to the CPU 131 via the external bus 136, bridge 135, and host bus 134.

A communication board 145 is a device that ensures connection with the public communication network 4 or with the cradle 7. Typically, the communication board 145 is constituted by an Ethernet board or the like and connected to the CPU 131 through the external bus 136, bridge 135, and host bus 134.

An infrared communication unit 146 receives infrared ray signals sent illustratively from the PDA 1. The received signals are output to the CPU 131 via the external bus 136, bridge 135, and host bus 134. Given signals from the CPU 131, the infrared communication unit 146 coverts them into infrared ray signals for output to the outside.

A wireless LAN communication unit 147 receives radio waves sent illustratively from the PDA 1, converts the received radio waves by a suitable method into data compatible with the CPU 131, and outputs the data to the CPU 131 through the external bus 136, bridge 135, and host bus 134. The wireless LAN communication unit 147 also converts signals from the CPU 131 into radio waves for output to the outside.

Figure 8:
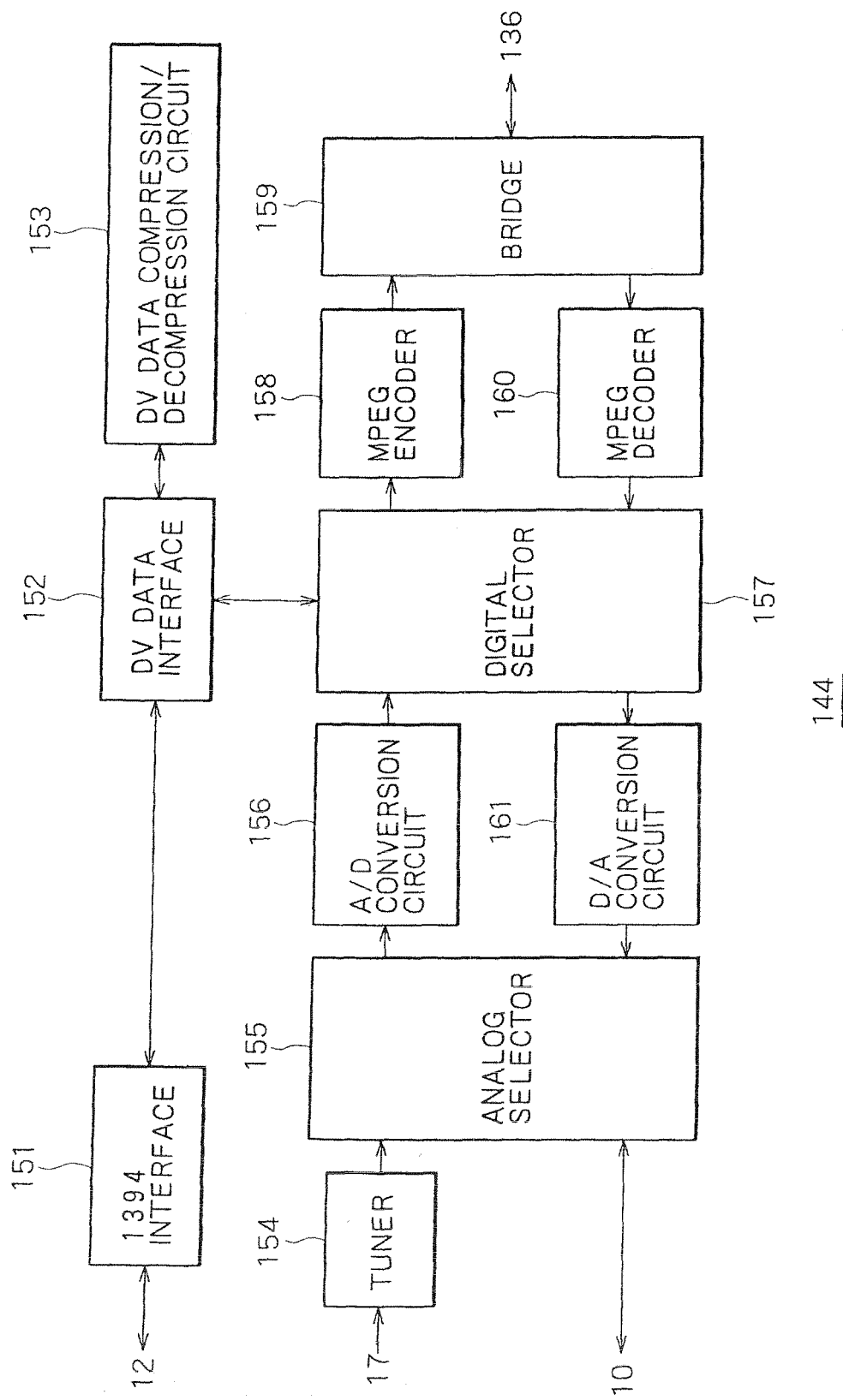
FIG. 8 is a block diagram of an image processing board shown in FIG. 7.

A detailed structure of the image processing board 144 will now be described by referring to FIG. 8.

A 1394 interface 151, structured to comply with IEEE 1394 criteria, is connected to the network 12. In accordance with an IEEE 1394-compatible protocol, the 1394 interface 151 receives video and audio digital data in DVCR format from the DVCR 11 and feeds the received data to a DV (digital video) data interface 152.

The 1394 interface 151 supplies the DVCR 11 with video and audio digital data in DVCR format sent from the DV data interface 152. The supply of the digital data to the DVCR 11 is effected in accordance with the IEEE 1394-compatible protocol.

The DV data interface 152 outputs to a DV data compression/decompression circuit 153 video and audio digital data in DVCR format coming from the 1394 interface 151 or from a digital selector 157 (such as 4:1:1 decompressed digital data). The DV data interface 152 also outputs to the 1394 interface 151 video and audio digital data in DVCR format coming from the DV data compression/decompression circuit 153, and supplies the digital selector 157 with decompressed audio and video digital data sent from the DV data compression/decompression circuit 153.

The DV data compression/decompression circuit 153 converts video and audio digital data in DVCR format from the DV data interface 152 into decompressed video and audio digital data for output to the DV data interface 152. The compression/decompression circuit 153 also converts decompressed video and audio digital data from the DV data interface 152 into compressed video and audio digital data in DVCR format for output to the DV data interface 152.

A tuner 154 admits RF (radio frequency) signals from the antenna 17 and outputs the corresponding video and audio analog signals on a given channel to an analog selector 155. The analog selector 155 selects the video and audio analog signals from any one of the tuner 154, VCR 10, and a D/A (digital/analog) conversion circuit 161. The selected signals are output to either an A/D (analog/digital) conversion circuit 156 or to the VCR 10.

The A/D conversion circuit 156 converts the video and audio analog signals from the analog selector 155 into digital data for output to the digital selector 157. The digital selector 157 selectively admits the video and audio digital data from any one of the DV data interface 152, A/D conversion circuit 156, and an MPEG decoder 160. The selected digital data are output to a bridge 159 as well as to the DV data interface 152, to an MPEG encoder 158, or to the D/A conversion circuit 161.

The MPEG encoder 158 converts the video and audio digital data sent from the digital selector 157 into compressed MPEG-format digital data for output to the bridge 159. The MPEG encoder 158 further converts scene switching images into still pictures for output to the bridge 159.

The bridge 159 outputs decompressed video and audio digital data from the digital selector 157 to the CRT 140 by way of the external bus 136 and interface 137 of the personal computer 9 to which the image processing board 144 is attached. The bridge 159 also outputs MPEG-format video and audio digital data from the MPEG encoder 158 to the hard disk drive 141 or to the CPU 131 via the external bus 136 of the personal computer 9 to which the image processing board 144 is attached. Furthermore, the bridge 159 receives MPEG-format video and audio digital data from the hard disk drive 141 of the personal computer 9 via the external bus 136 and outputs the received data to the MPEG decoder 160.

The MPEG decoder 160 converts the MPEG-format video and audio digital data from the bridge 159 into decompressed video and audio digital data. The decompressed data are output to the digital selector 157.

The D/A conversion circuit 161 converts video and audio digital data from the digital selector 157 into analog signals. The converted analog signals are output to the analog selector 155.

Alternatively, the above-described processes performed by the MPEG encoder 158 and MPEG decoder 160 may be taken over by the CPU 131 performing suitable programs.

Figure 9:
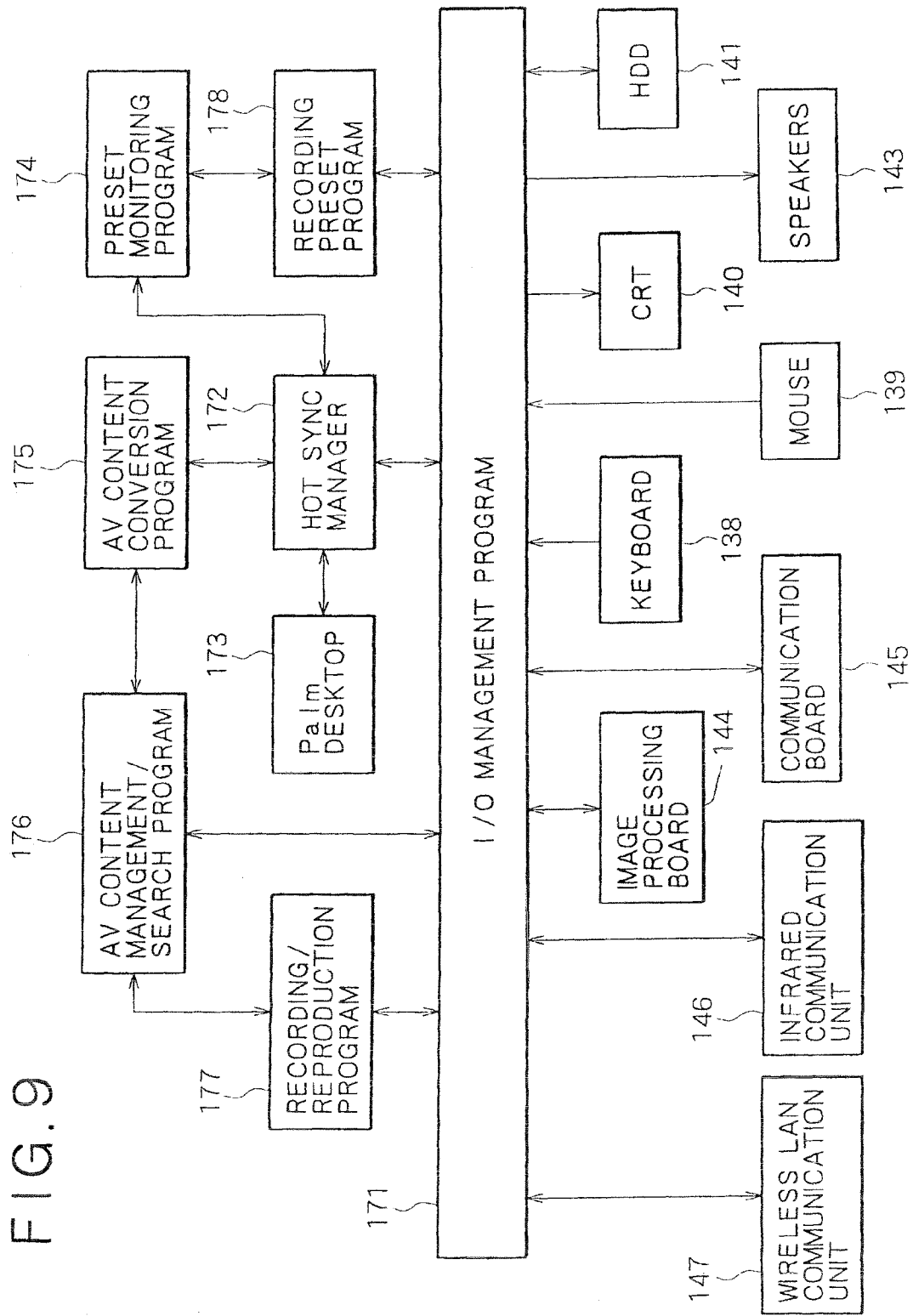
FIG. 9 is a function block diagram of the personal computer in FIG. 1.

FIG. 9 is a function block diagram of the personal computer 9.

In FIG. 9, an I/O management program 171 provides control on furnishing a given application with signals denoting the operations or commands input by the user operating the keyboard 138 or mouse 139. Using its control capability, the I/O management program 171 outputs to the infrared communication unit 146 the data derived from the processes performed by various applications so that the communication unit 146 may transmit infrared ray signals representing the derived data to other devices; the program 171 may alternatively output the relevant data to the wireless LAN communication unit 147 so that the latter may output radio waves carrying the data to other devices. The I/O management program 171 outputs video data to the image processing board 144 for image processing, sends audio data to the speakers 143 for audio reproduction, and feeds image data to the CRT 140 for image display. The management program 171 further controls supply of data to the hard disk drive (HDD) 141 to record the data thereto.

A hot sync manager 172 is a program that permits exchanges of information with the PDA 1 running on the Palm OS. The program is designed to synchronize files and data between two different computers, i.e., between the PDA running on the Palm OS and the personal computer 9. The synchronization is effected regardless of dissimilar computer models.

A Palm desktop 173 is a program that allows the personal computer 9 to share information with the PDA 1 running on the Palm OS, the information having been exchanged under control of the hot sync manager 172.

A preset monitoring program 174 monitors presetting of TV programs for unattended recording based on TV program information received from the PDA 1 by means of the hot sync manager 172, as will be described later with reference to FIG. 36, or on the basis of recording preset information established by a recording preset program 178, to be described later.

An AV content conversion program 175 is used to convert AV content (i.e., recorded TV program data) held on the HDD 141 in a common image format such as MPEG into data of a format compatible with a portable terminal apparatus with limited image processing capability, such as the PDA 1. The conversion is performed prior to transmission of the AV content to the PDA 1 through the processing by the hot sync manager 172, as will be described later with reference to FIG. 36.

An AV content management/search program 176 receives a signal representing the user's operation or a command from another device under control of the I/O management program 171, and searches the hard disk drive 141 for the applicable AV content based on the received signal. The program 176 then outputs the retrieved content to the AV content conversion program 175 that is requested for data conversion or to a recording/reproduction program 177 which is solicited to provide content reproduction.

The recording/reproduction program 177 is a program that reproduces the AV content searched for and retrieved by the AV content management/search program 176.

The recording preset program 178 is a program that receives a signal representing the user's operation or a command from another device under control of the I/O management program 171, and presets unattended recording of a desired TV program over a specific broadcast channel on the basis of the received signal.

Figure 10:
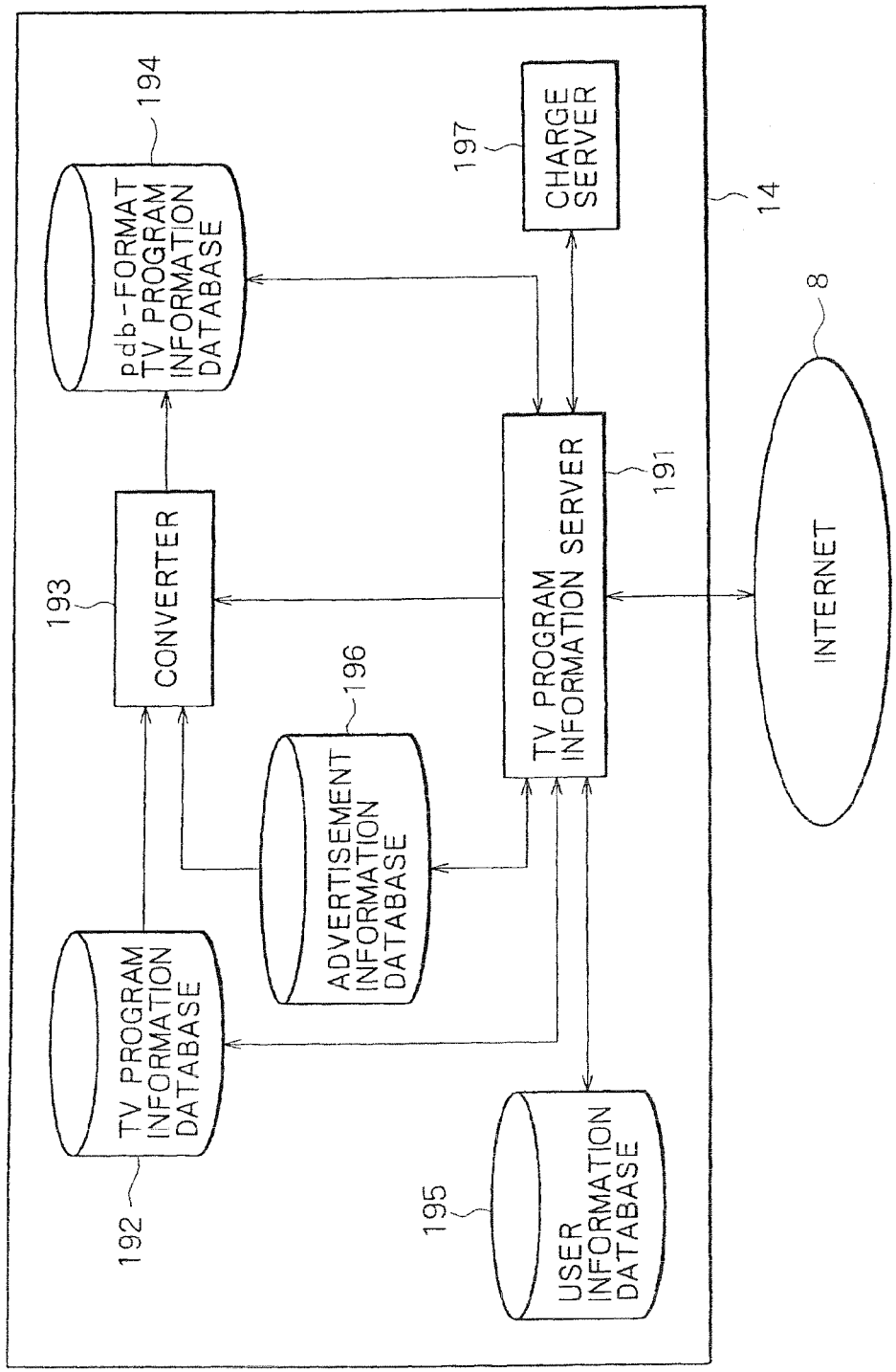
FIG. 10 is a block diagram depicting a typical structure of a TV program information service provider included in FIG. 1.

FIG. 10 is a block diagram indicating a typical structure of the TV program information service provider 14 included in FIG. 1. In FIG. 10, a TV program information server 191 controls a converter 193 and a charge server 197 based on information received over the Internet 8. The server 191 also stores information into a TV program information database 192, a pdb-format TV program information database 194, a user information database 195, and an advertisement information database 196. Furthermore, the TV program information server 191 searches for and retrieves specific pieces of information from the stored information as designated.

Stored in the TV program information database 192 in a suitable database format is EPG information for retrieving particular program information, as well as TV program information for use in presetting unattended recording of a desired TV program furnished by a specific TV broadcasting station. The TV program information comprises at least the TV channel of each TV program, the date of its broadcast, the name of the program, and the start and end times of the program broadcast, along with detailed information associated with the TV program in question. The detailed program information may include, as needed, a URL of the website run by the production company having produced each TV program and an e-mail address through which the company accepts inquiries from the public.

When users want to acquire detailed information regarding to a specific TV program, they gain access to the website run by the production company that produced the program in question and/or inquire about the program using the e-mail address. In such cases, the information involved is exchanged in accordance with TCP/IP commonly used on the Internet or by use of any other suitable protocol.

The advertisement information database 196 stores in a suitable database format information about advertisements sent from corporations 15. The advertisement information includes, as needed, a URL of the website run by the sponsor (e.g., corporation 15) of each advertisement and an e-mail address through which each sponsor accepts inquiries from the public. As with the TV program information database 192, the advertisement information database 196 has its advertisement information furnished with URLs and e-mail addresses. The information is sent and received in accordance with TCP/IP commonly used on the Internet or by use of any other suitable protocol.

The converter 193 under control of the TV program information server 191 reads TV program information from the TV program information database 192 and advertisement information from the advertisement information database 196, and converts the retrieved information into pdb-format data. Following the conversion, the pdb-format advertisement information is attached to the TV program information which is then stored into the pdb-format TV program information database 194.

The user information database 195 contains user-related information including user IDs and user-registered channels. Each user ID is associated with the channel information needed by the user identified by the user ID.

The charge server 197 is used to settle charges on the corporations 15 for advertisements they sponsor.

The TV program information server 191 receives a TV program information transmission request over the Internet 8. If the received transmission request is judged to be coming from the TV program data acquisition system embodying the invention, then the server 191 selectively retrieves from the pdb-format TV program information database 194 user-requested TV program information along with related advertisement information based on the information included in the transmission request, and sends the retrieved information to the user concerned.

If the received TV program information transmission request contains a user ID, then the TV program information server 191 retrieves registered information about the user identified by the user ID from the user information database 195 and, based on the registered information thus retrieved and on the date information included in the transmission request, selectively retrieves user-requested TV program information along with related advertisement information from the pdb-format TV program information database 194. The information retrieved by the server 191 is transmitted to the user in question.

The TV program information server 191 may alternatively carry out a related-art Web-based TV program information providing process. That is, if the received TV program information transmission request turns out to be a program information transmission request described in page description language such as HTML, then the TV program information server 191 retrieves user-requested TV program information from the TV program information database 192 on the basis of the information included in the request. The retrieved information is converted to data of a specific format such as HTML before being sent to the user involved.

That is, the TV program information service provider 14 may operate in one of two ways. The information service provider 14 may transmit pdb-format TV program information to users through the use of the TV program information server 191 offering the related-art Web-based program information feeding service; the service provider 14 may also provide the pdb-format TV program information alone to users as described.

The TV program information server 191 is connected via the Internet 8 to the personal computer 16 owned by each corporation 15. The connection allows the information server 191 to accept requests for carrying advertisements from the corporation 15 and to register advertisement information with the advertisement information database 196. When the charge server 197 has calculated charges on the corporations 15 for the advertisements they sponsor and has sent the results of the calculations to the TV program information server 191, the server 191 in turn transmits the calculated charges to the personal computers 16 of the corporations 15 for settlement.

Figure 11:
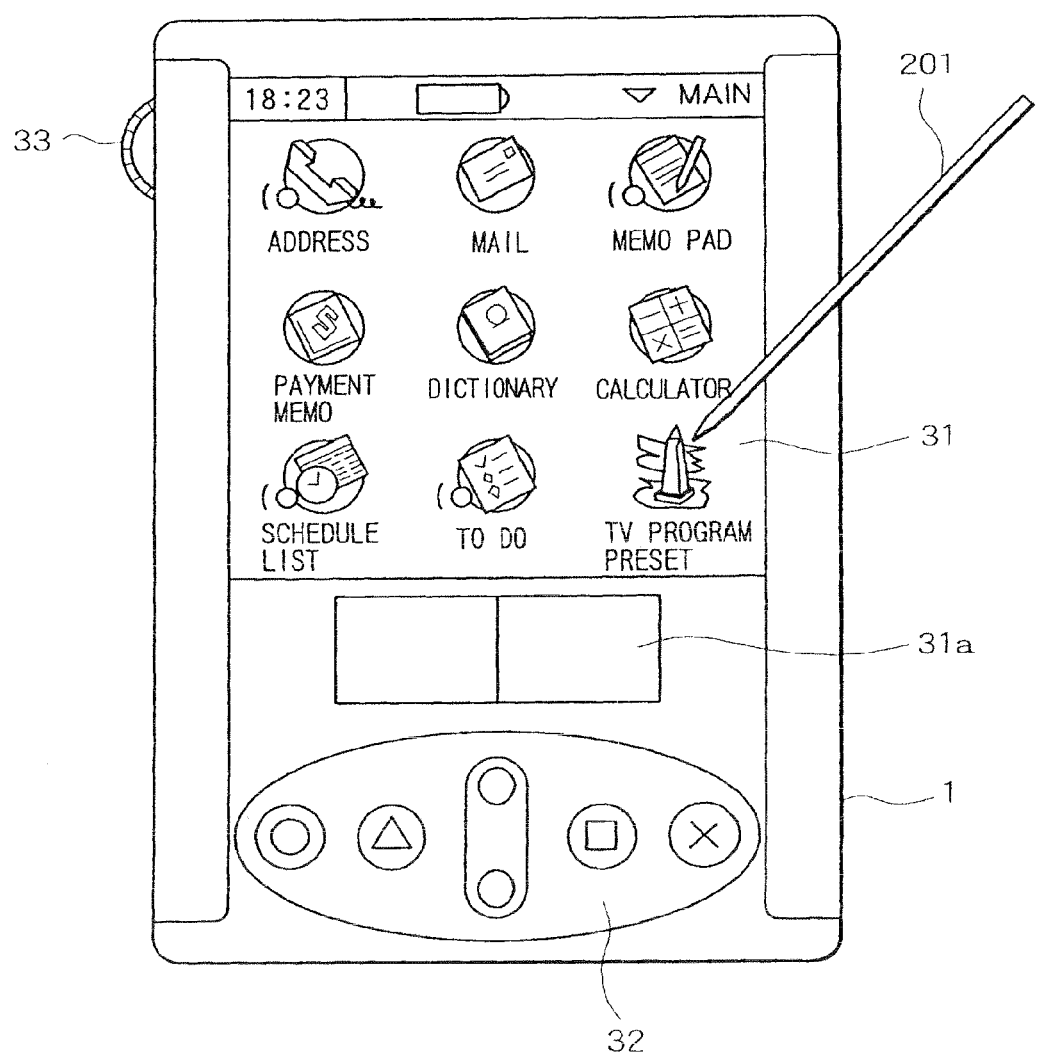
FIG. 11 is a schematic view of an initial screen that appears on the PDA.

FIG. 11 is a schematic view of an initial screen that appears on the PDA 1 when it is powered. The display unit 31 displays icons representing the programs described above with reference to FIG. 5. The user may select any one of the icons with a pen 201 to start the desired program.

Figure 12:
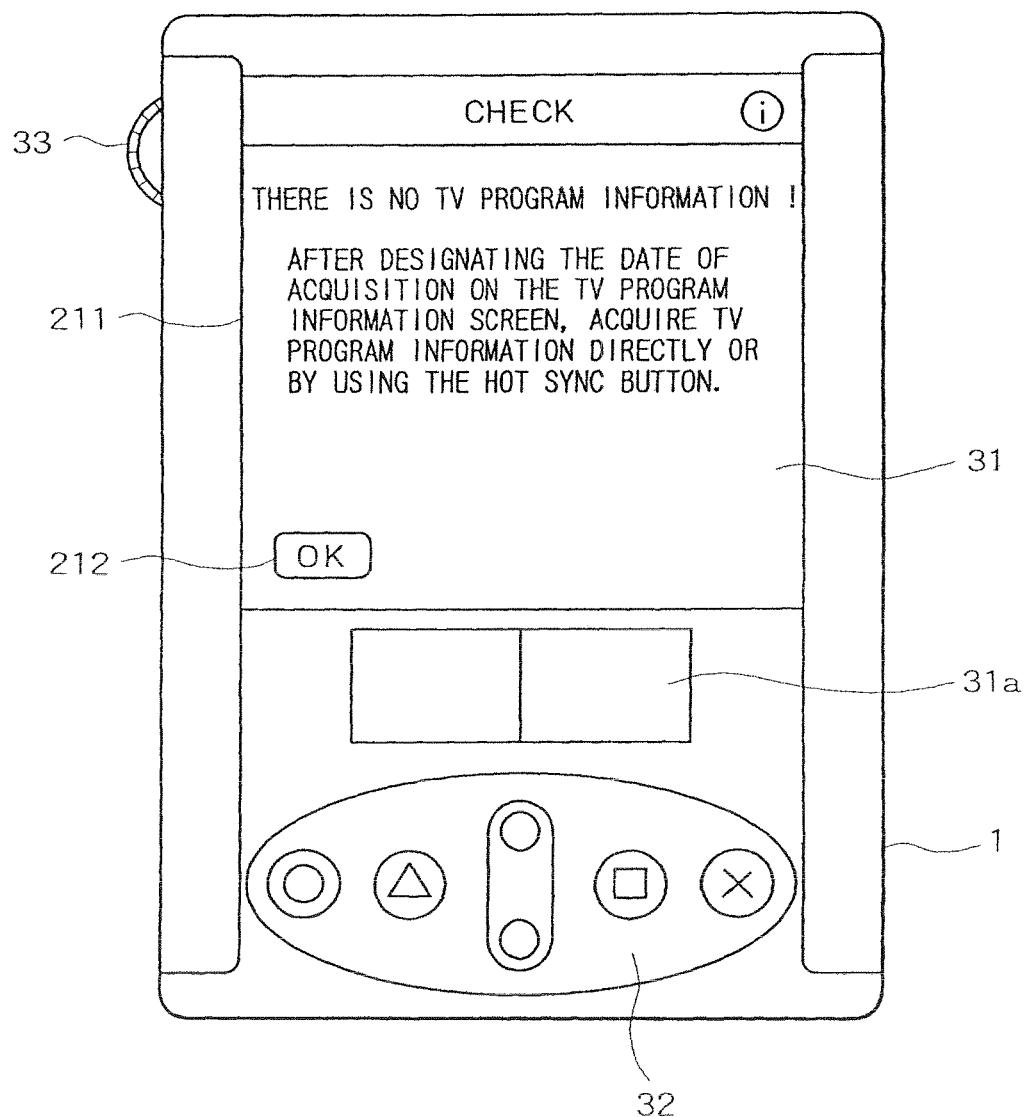
FIG. 12 is a schematic view of a typical display screen that appears on the PDA.

Suppose that with no TV program list 101 recorded in the TV program list memory 91, the TV program recording preset program 83 is now started (by the user selecting the icon marked "TV Program Preset"). In that case, as shown in FIG. 12, a window 211 appears carrying a message prompting the user to acquire TV program information. Viewing the window 211, the user selects an OK button 212 to proceed with operations to acquire TV program information.

The PDA 1 may acquire TV program information from the TV program information service provider 14 by one of two methods. By one method, the PDA 1 may connect directly with the TV program information service provider 14 via the digital portable telephone 2, base station 3, public communication network 4, access server 6, and the Internet 8. By another method, the PDA 1 may be connected to the personal computer 9 by means of the cradle 7. The personal computer 9 then connects with the TV program information service provider 14 through the public communication network 4, access server 6 and the Internet 8, and acquires TV program information from the service provider 14. The PDA in turn obtains the TV program information from the personal computer 9 through the cradle 7.

Figure 13:
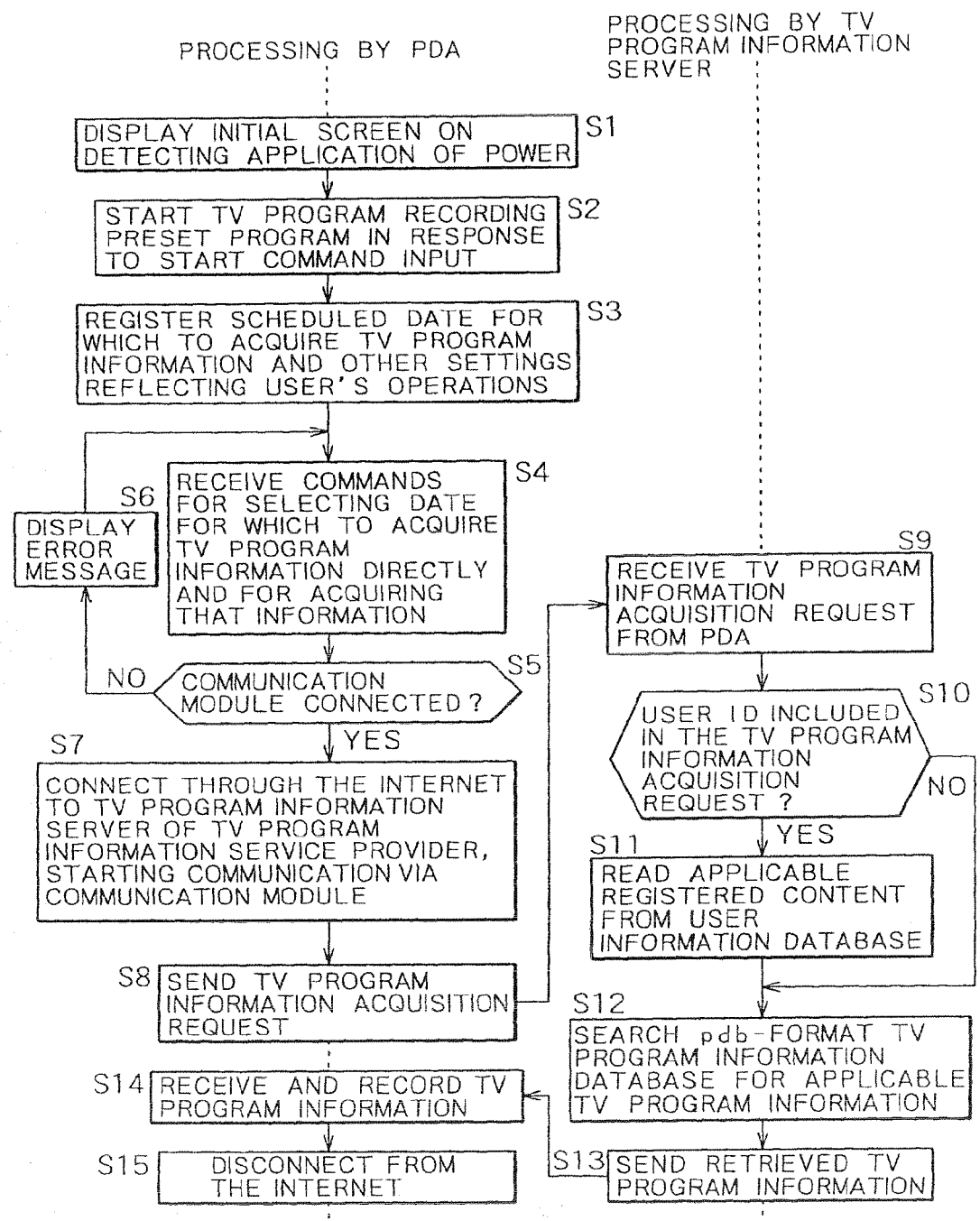
FIG. 13 is a flowchart of steps in which the PDA illustratively acquires TV program information from the TV program information service provider.

Described below with reference to the flowchart of FIG. 13 is how the FDA 1 acquires TV program information by directly connecting with the TV program information service provider 14 via the digital portable telephone 2, base station 3, public communication network 4, access server 6, and the Internet 8. The flowchart specifically outlines the workings of the PDA 1-1 and the TV program information server 191 in the TV program information service provider 14.

In step S1 of FIG. 13, the Palm OS run by the CPU 41 of the PDA 1-1 detects application of power, and accordingly displays on the display unit 31 the initial screen shown in FIG. 11.

In step S2, the Palm OS starts the TV program recording preset program 83 in response to a command input for program start-up (from the user selecting the icon marked "TV Program Preset" on the screen of FIG. 11). If no TV program list is currently held in the TV program list memory 91, the display screen of FIG. 12 appears.

In step S3, the TV program recording preset program 83 writes to the preset information memory 93 a scheduled date for which to acquire TV program information and other settings reflecting the user's operations under control of the I/O control program 82. The settings are made as described below with reference to FIGS. 14 through 19.

Figure 14:
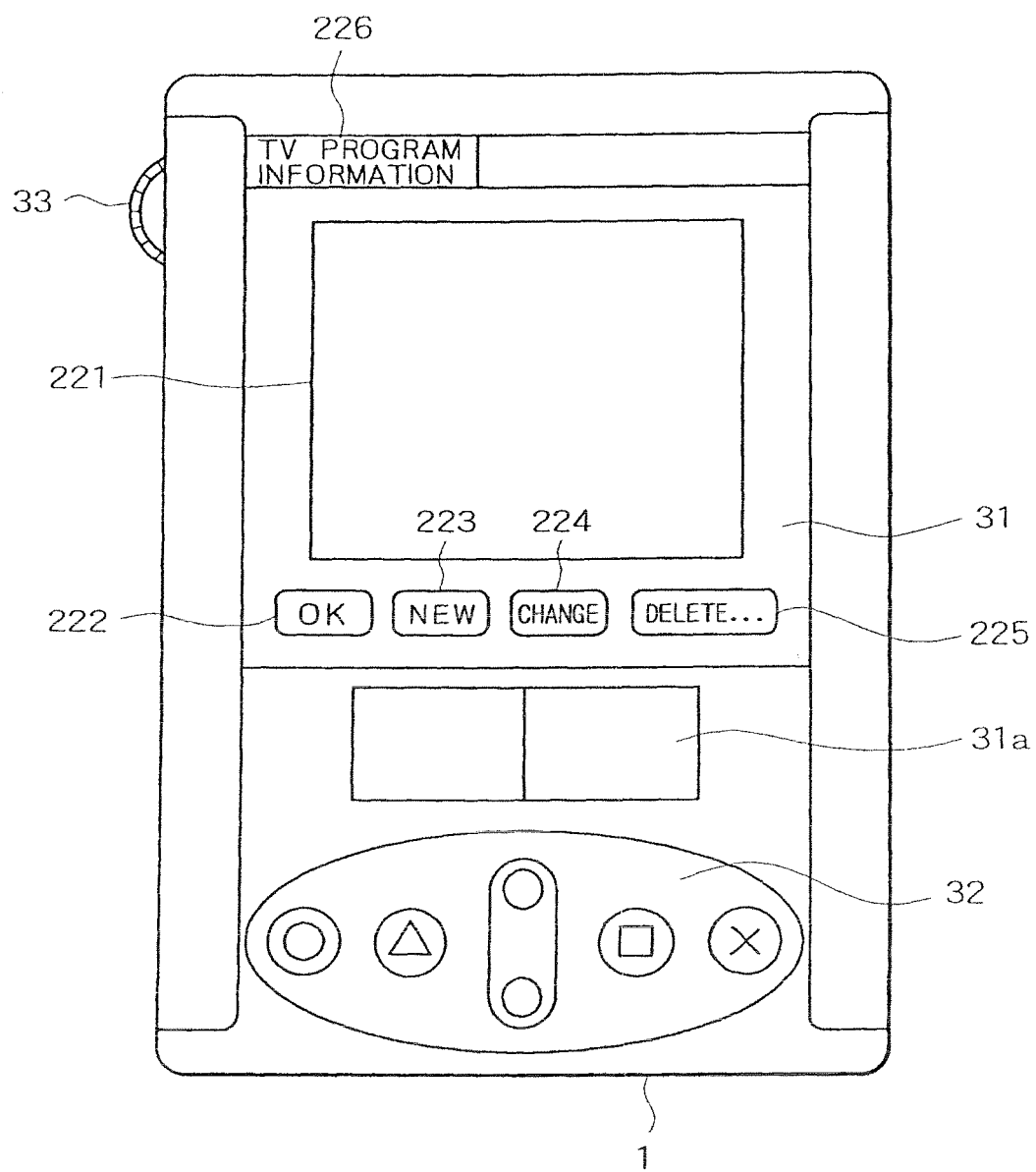
FIG. 14 is an explanatory view of a TV program information management screen.

Illustratively, pushing the OK button 212 on the screen of FIG. 12 causes a TV program information management screen to appear as shown in FIG. 14. This management screen contains a display area 221 in which the scheduled date for which to acquire TV program information is displayed, an OK button 222, a NEW button (for new registration), a CHANGE button 224, a DELETE button 225, and a tag 226 to be selected for calling up a menu.

The OK button 222 is selected when what has been established on the screen is judged correct. Selecting the OK button causes the display screen preceding the TV program information management screen to reappear on the display unit 31. The NEW button 223 is selected to register a newly scheduled date for which to acquire TV program information. The CHANGE button 224 is selected when any established date for which to acquire TV program information needs to be changed. The DELETE button 225 is selected to delete any such established date for TV program information acquisition. Where scheduled dates for which to acquire TV program information are displayed in the display area 221, selecting any one of the dates and activating the DELETE button 225 deletes the information about the selected date.

Figure 15:
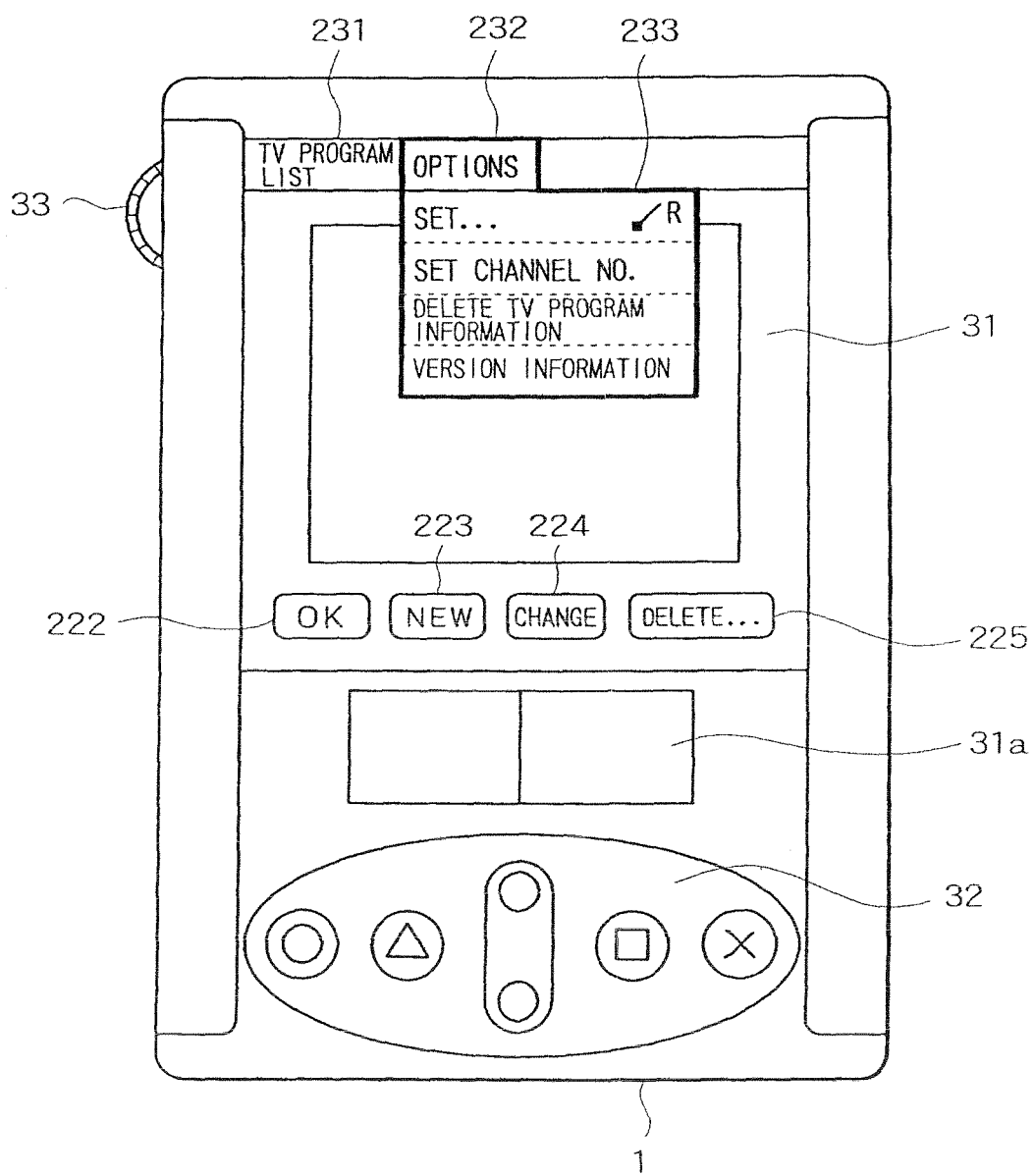
FIG. 15 is an explanatory view of menu indications on the TV program information management screen.

Selecting the tag 226 causes a TV program list tag 231 and an option tag 232 to appear as shown in FIG. 15. If the option tag 232 is selected, a drop-down list box 233 is displayed.

Figure 16:
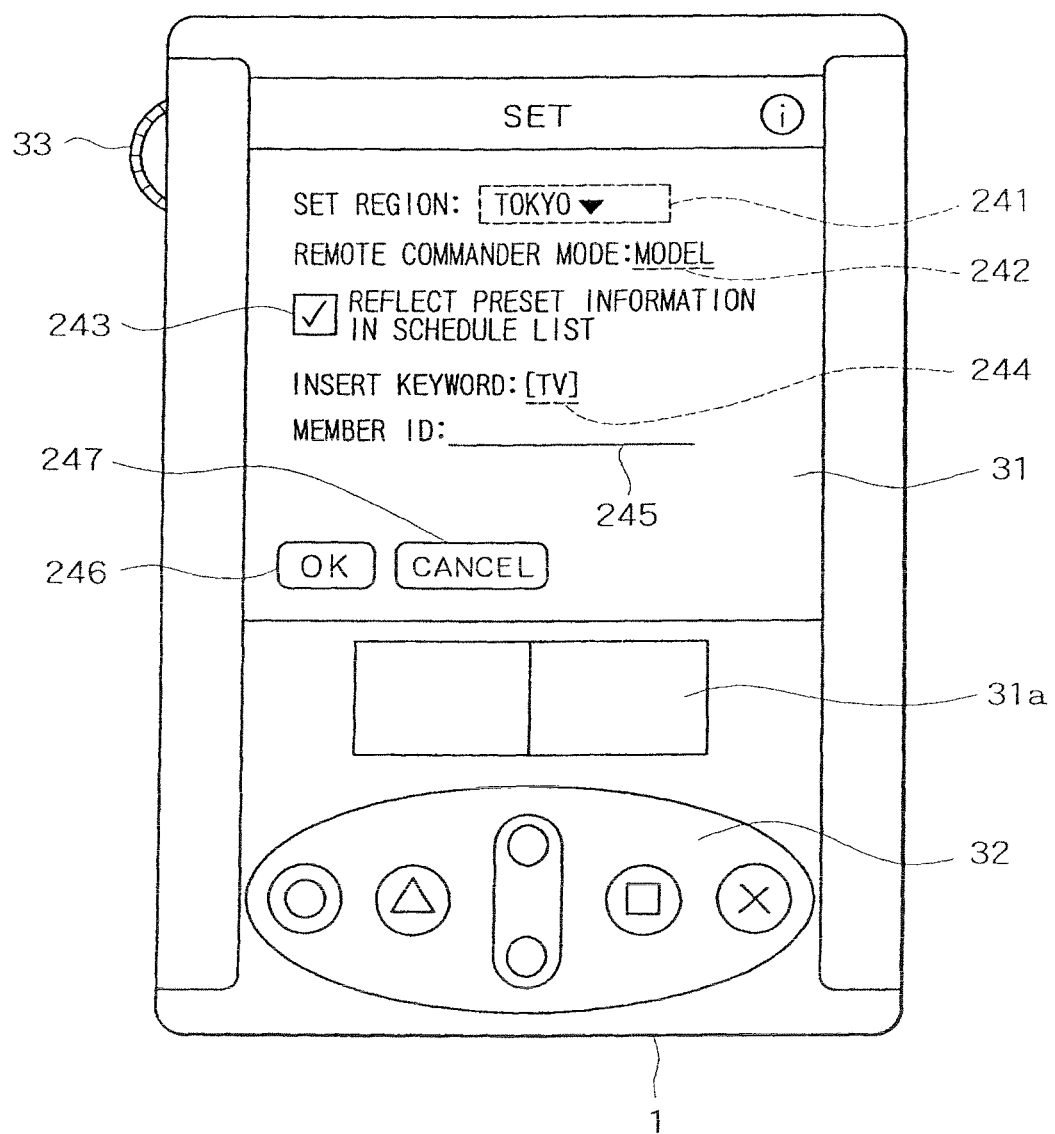
FIG. 16 is an explanatory view of a setting screen.

Selecting a "Set" item in the drop-down list box 233 causes a setting screen to appear as shown in FIG. 16. The setting screen includes a region setting list box 241, a remote commander mode setting box 242, a check box 243, a text box 244, another text box 245, an OK button 246, and a CANCEL button 247.

The region setting list box 241 is used to set the region for which to acquire TV program information. The remote commander mode setting box 242 is used to set remote commander mode. The check box 243 is either checked or left unchecked to determine whether or not to reflect preset information in the schedule list 94 that is established under control of the schedule list program 84. The text box 244 is used to set an inserted keyword by which to distinguish a program recording preset schedule from other schedules when the preset information is to be reflected in the schedule list 94.

The text box 245 is used to establish a member ID granted beforehand to each user who registered with the TV program information service provider 14. The OK button 246 is selected when the settings in the boxes ranging from the region setting list box 241 to the text box 245 are judged correct. The CANCEL button 247 is selected if it is desired to cancel the settings made so far.

Figure 17:
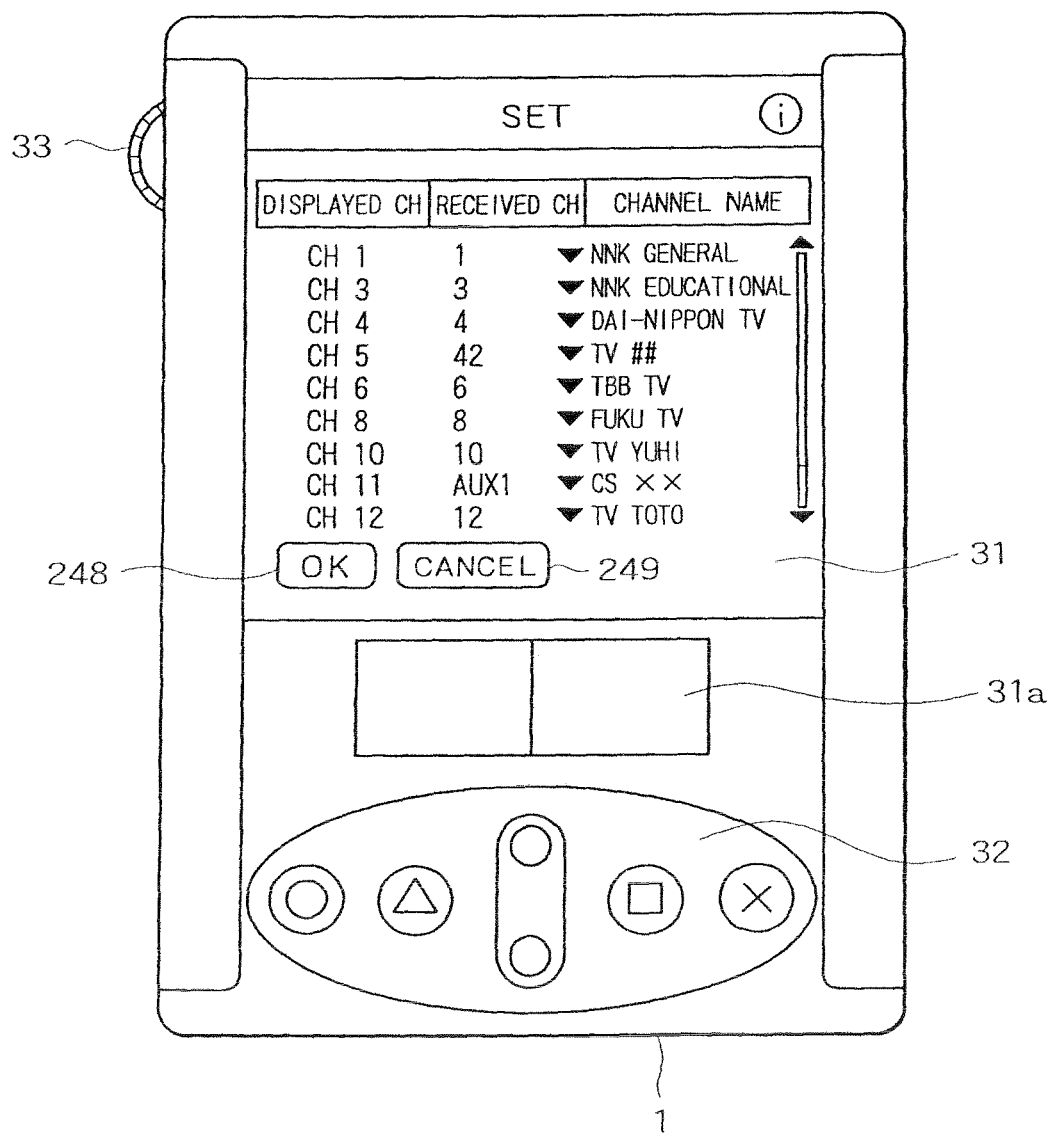
FIG. 17 is an explanatory view of a channel setting screen.

Selecting a "Set channel No." item in the drop-down list box 233 causes a channel setting screen to appear as shown in FIG. 17. The channel setting screen indicates in tabular form displayed channels (CHs), received channels, and channel names (i.e., station names). Details of these indications may be changed as needed depending on the selected region. The channel setting screen further includes an OK button 248 and a CANCEL button 249. The OK button 248 is selected when the channel settings are judged correct, and the CANCEL button 249 is selected to cancel the channel settings made so far.

Figure 18:
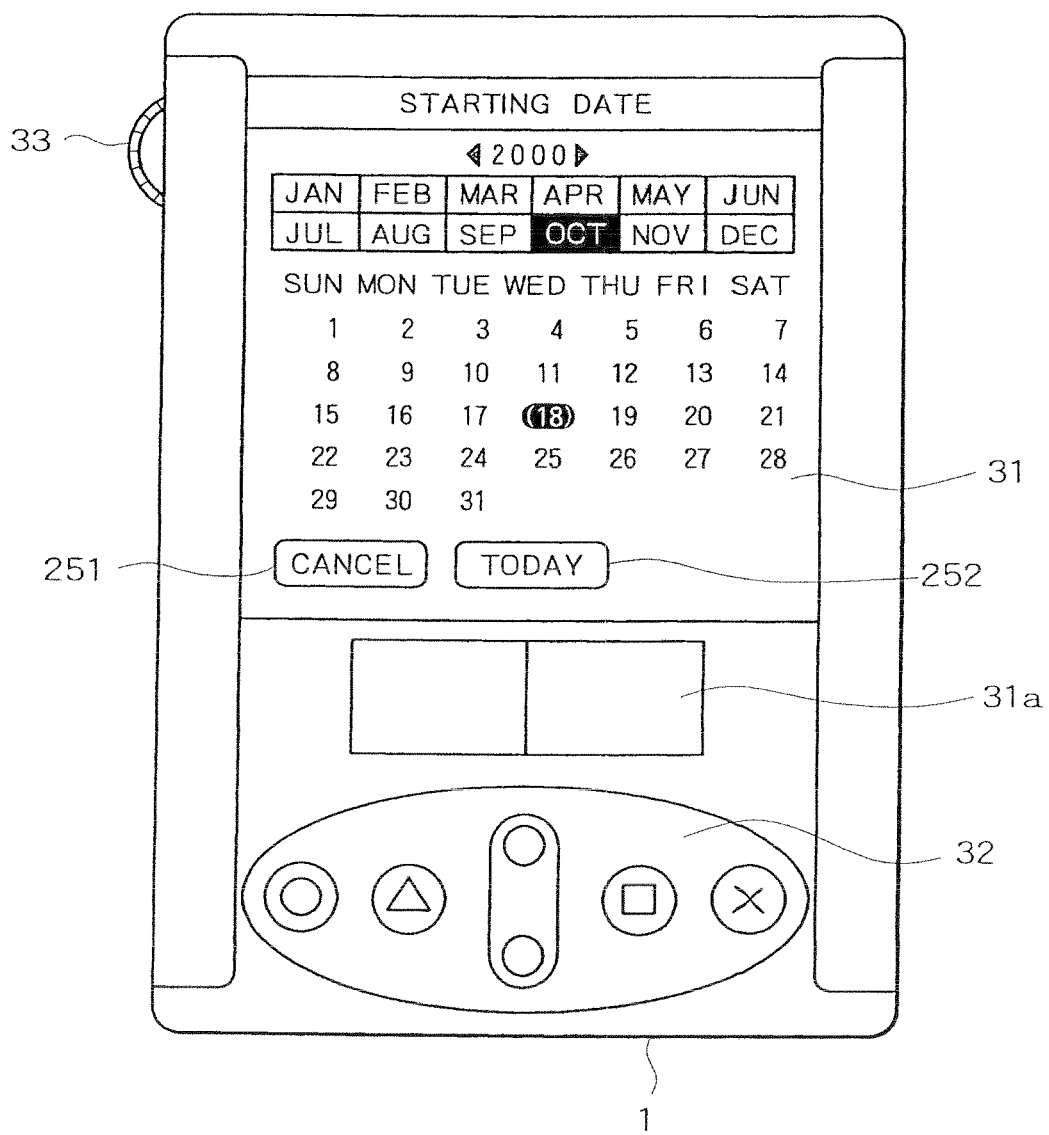
FIG. 18 is an explanatory view of a scheduled date setting screen for TV program information acquisition.

If the NEW button 223 is selected on the TV program information management screen of FIG. 14, then a scheduled date setting screen for TV program information acquisition of FIG. 18 is displayed for the user to make a new registration. On the screen, the user first calls up a calendar of a desired month by selecting the month and the year. In the calendar, the user chooses a desired date for which to acquire TV program information. If the user wants to obtain today's TV program information, selecting a TODAY button 252 generates a command designating this day as the date for which TV program information needs to be acquired. Selecting a CANCEL button 251 terminates the operation.

Figure 19:
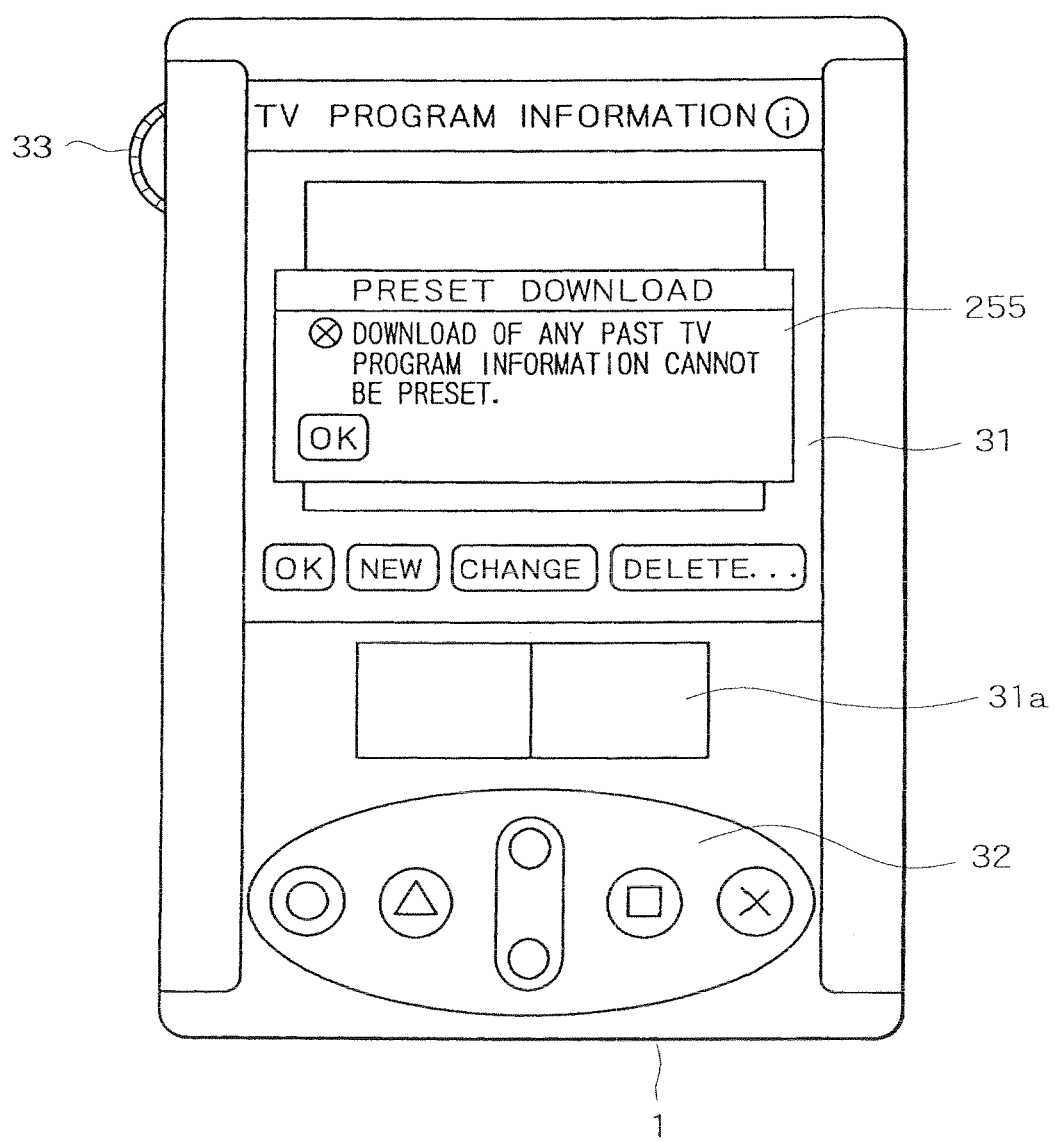
FIG. 19 is a schematic view of a typical message window.

If the user selects any past date, a window 255 appears carrying a message such as "Download of any past TV program information cannot be preset," as shown in FIG. 19.

Figure 20:
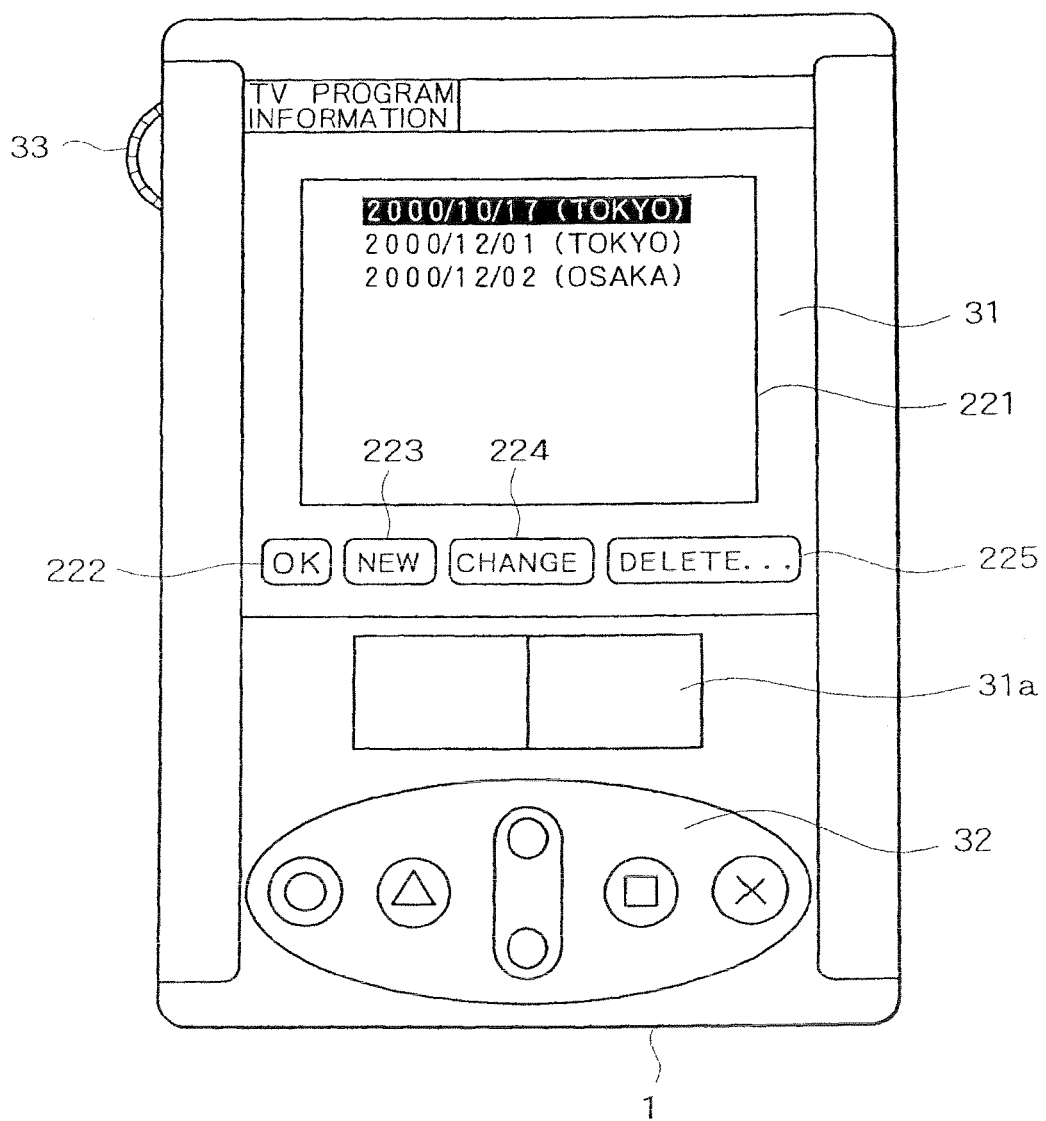
FIG. 20 is a schematic view of a typical TV program information management screen.

On the scheduled date setting screen for TV program information acquisition of FIG. 18, the dates selected by the user are indicated in the display area 221 as shown in FIG. 20 and are stored into the preset information memory 93. In the state of FIG. 20, only the dates are set for TV program information acquisition; the program information has yet to be obtained.

Figure 21:
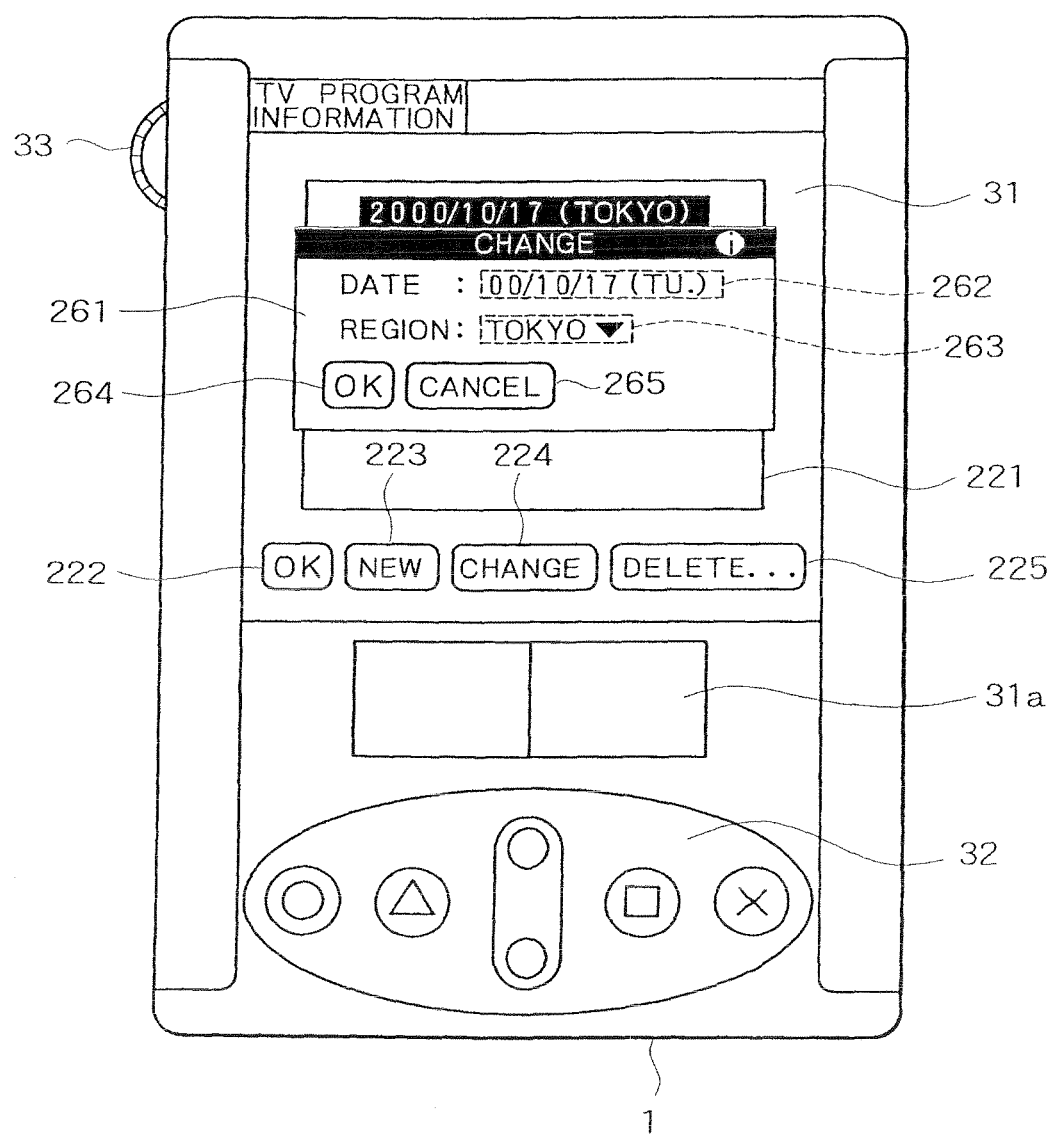
FIG. 21 is a schematic view of a typical change window.

If the user wants to change any date scheduled for TV program information acquisition, the date in question is selected from the scheduled date list in the display area 221, and the CHANGE button 224 is selected. This causes a change window 261 of FIG. 21 to appear.

The change window 261 includes a date setting box 262 in which to change the scheduled date, a region setting list box 263 in which to change the established region, an OK button 264 that is selected when the changes made are judged correct, and a CANCEL button 265 selected when it is desired to abandon the changes. When the user selects the OK button 264 in the change window 261, the date and the region established in the window are stored into the preset information memory 93.

From among the scheduled dates for TV program information acquisition displayed on the TV program information management screen in FIG. 20, the user may select a date or dates for which TV program information is desired to be obtained directly. In that case, the TV program information about the selected date or dates is acquired by connecting with the TV program information service provider 14 directly through the digital portable telephone 2, base station 3, public communication network 4, access server 6, and the Internet 8.

Referring again to the flowchart of FIG. 13, the TV program recording preset program 83 now goes to step S4. In step S4, the recording preset program 83 receives commands for selecting dates for which to acquire TV program information directly and for acquiring that information on the basis of the user's operations.

Figure 22:
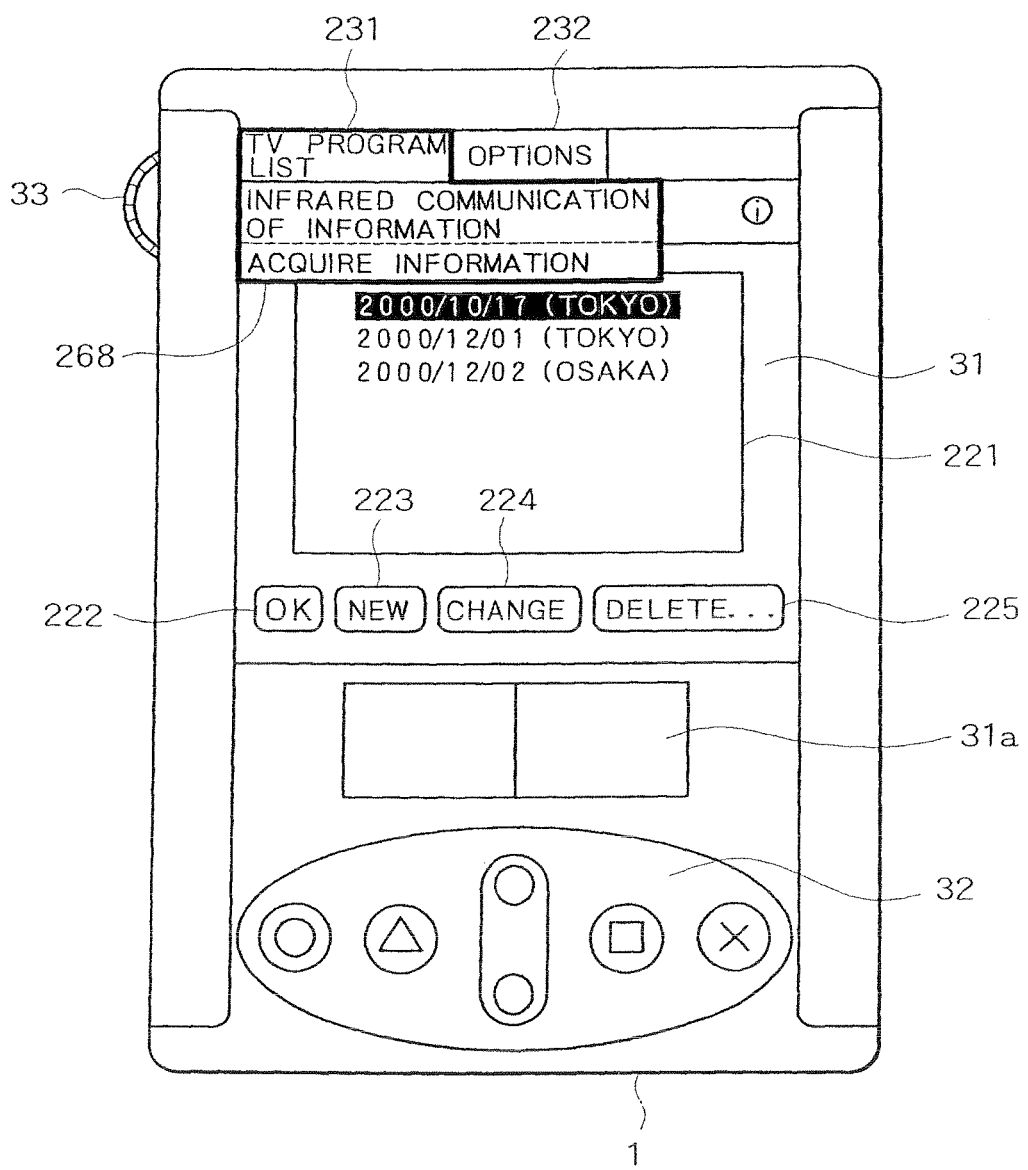
FIG. 22 is an explanatory view of other menu indications on the TV program information management screen.

More specifically, when acquiring TV program information directly, the user first selects a date or a plurality of dates from among the scheduled dates for TV program information acquisition displayed on the TV program information management screen in FIG. 20. The user then selects the tag 226 to get the TV program list tag 231 and option tag 232 displayed, and selects the TV program list tag 231. In response to the user's operations, the TV program recording preset program 83 displays a drop-down list box 268 shown in FIG. 22. It is assumed here that the user will select an "Acquire information" item in the box 268 to acquire TV program information for a desired date, by connecting with the TV program information service provider 14 through the digital portable telephone 2, base station 3, public communication network 4, access server 6, and the Internet 8. The connection will be established and the information obtained illustratively as described below.

In step S5 of FIG. 13, the TV program recording preset program 83 checks to see whether a communication module is attached to establish a link between the PDA 1-1 on the one hand, and the digital portable telephone 2, a PHS, a data card type PHS, or like connective device on the other hand for connection with the public communication network 4. The check is made based on the information entered under control of the data communication program 81.

If in step S5 the communication module is not judged connected, then step S6 is reached in which the TV program recording preset program 83 generates an error message informing the user of the absence of the module. The message is output to the I/O control program 82 which in turn forwards the message to the display unit 31 for display. Control is then returned to step S4 and subsequent steps are repeated.

If in step S5 the communication module is judged connected, step S7 is reached. In step S7, the TV program recording preset program 83 starts connecting with the TV program information server 191 of the TV program information service provider 14 through the digital portable telephone 2, base station 3, public communication network 4, access server 6, and the Internet 8 under control of the data communication program 81.

In step S8, the TV program recording preset program 83 transmits a user-entered TV program information acquisition request (including the region and the date(s) for which to obtain the program information, or the date(s) and the user ID registered beforehand with the TV program information service provider 14) to the TV program information server 191 of the TV program information service provider 14.

In step S9, the TV program information server 191 receives the TV program information acquisition request from the PDA 1-1. In step S10, the server 191 checks to see whether any user ID is included in the received request.

If in step S10 a user ID is judged included in the received TV program information acquisition request, step S11 is reached. In step S11, the TV program information server 191 reads from the user information database 195 the registered content corresponding to the date(s) and the user ID included in the received request.

Step S12 is reached either at the end of step S11, or if in step S10 the user ID is not judged included in the received TV program information acquisition request. In step S12, the TV program information server 191 retrieves the TV program information corresponding to the input TV program information acquisition request (including the region and the date(s) for which to obtain the program information, or the date(s) and the user ID registered beforehand with the TV program information service provider 14) from the pdb-format TV program information database 194. In step S13, the server 191 transmits the retrieved TV program information to the PDA 1-1 that sent the information acquisition request earlier.

In step S14, the TV program recording preset program 83 of the PDA 1 receives the TV program information sent from the TV program information server 191 in step S13 under control of the data communication program 81. The received information is stored into the TV program list memory 91. In step S15, the TV program recording preset program 83 severs the connection with the Internet 8 and terminates the processing.

Figure 23:
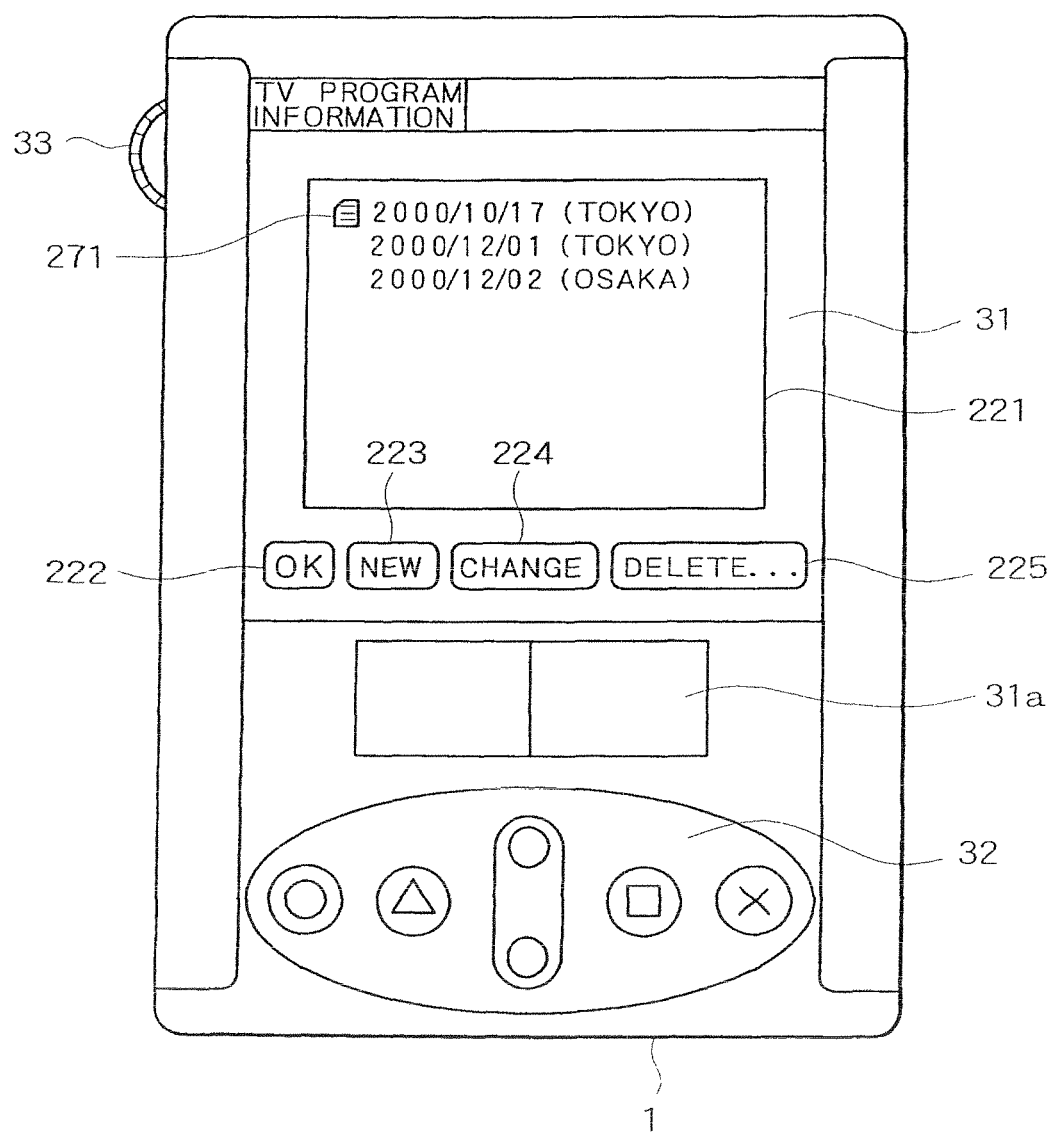
FIG. 23 is an explanatory view of icons displayed after acquisition of TV program information.

The processing described in reference to the flowchart of FIG. 13 stores the TV program information for the date desired by the user into the TV program list memory 91 in the PDA 1-1, of the scheduled dates for which to acquire TV program information displayed on the program information management screen of FIG. 20, the date whose TV program information has been recorded to the TV program list memory 91 is furnished with an icon 271 indicating that the information has been obtained already, as shown in FIG. 23.

Figure 24:
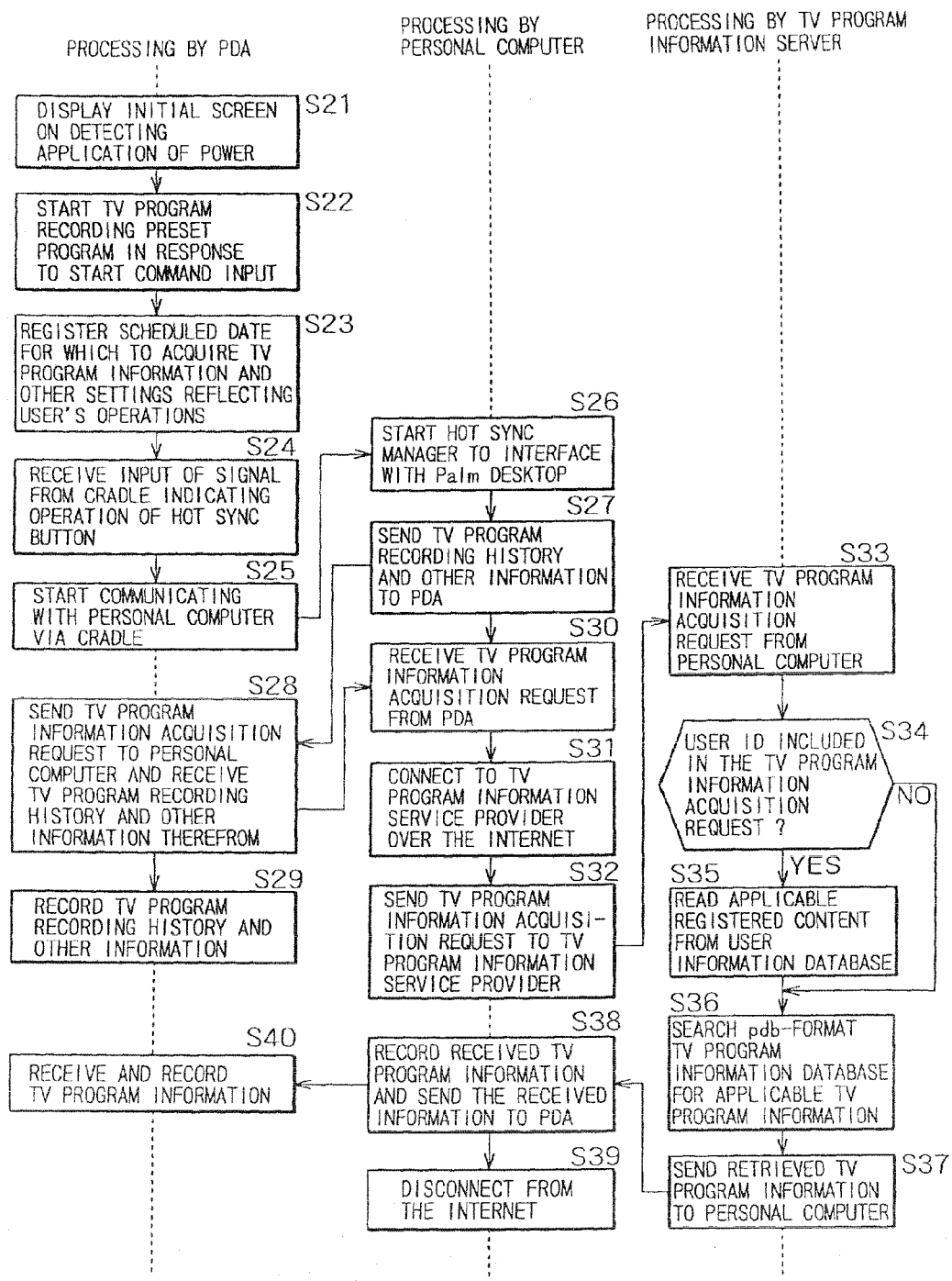
FIG. 24 is a flowchart of steps in which the PDA illustratively acquires TV program information from the TV program information service provider via the personal computer.

Described below with reference to the flowchart of FIG. 24 is what takes place in a setup where the PDA 1-2 connects with the personal computer 9 via the cradle 7; where the personal computer 9 gains access to the TV program information service provider 14 through the public communication network 4, access server 6, and the Internet 8 in order to acquire TV program information from the service provider; and where the PDA 1-2 obtains the TV program information from the personal computer 9. The flowchart outlines the workings of the PDA 1-2, the personal computer 9, and the TV program information server 191 of the TV program information service provider 14.

Steps S21 through S23 of FIG. 24 are equivalent to steps S1 through S3 in FIG. 13.

In step S24 of FIG. 24, the TV program recording preset program 83 under control of the data communication program 81 receives through the communication unit 53 the input of a signal indicating that the hot sync button 35 is pushed on the cradle 7. In step S25, the TV program recording preset program 83 starts communicating with the personal computer 9 via the cradle 7.

In step S26, the CPU 131 of the personal computer 9 activates the hot sync manager 172 to interface with the Palm desktop 173. In step S27, the hot sync manager 172 illustratively transmits a TV program recording history and other information to the PDA 1.

The hot sync process is a process that synchronizes files and data between two different computers, i.e., between the PDA running on the Palm OS and the personal computer 9. The synchronization is effected regardless of dissimilar computer models.

In step S28, the TV program recording preset program 83 of the PDA 1-2 transmits a TV program information acquisition request to the personal computer 9, and receives a TV program recording history and other information therefrom in return. In step S29, the recording preset program 83 writes to the schedule list 94 the TV program recording history and other information sent from the personal computer 9 in step S27.

In step S30, the hot sync manager 172 receives the TV program information acquisition request from the PDA 1-2 through the cradle 7. In step S31, the hot sync manager 172 under control of the I/O management program 171 connects with the TV program information service provider 14 over the Internet 8. In step S32, the hot sync manager 172 sends to the TV program information service provider 14 the TV program information acquisition request received in step S30.

In step S33, the TV program information server 191 of the TV program information service provider 14 receives the TV program information acquisition request from the personal computer 9 over the Internet 8. In step S34, the server 191 checks to see whether the received request contains any user ID.

The user ID is unique identification information granted to each user of the PDA 1-2 who in advance registered detailed information such as desired TV channels for program information acquisition with the TV program information service provider 14 (i.e., the ID is given to the user whose detailed information about desired TV programs is stored in the user information database 195 described above with reference to FIG. 10). The user ID is established on the setting screen discussed above by referring to FIG. 16.

If in step S34 the TV program information server 191 judges that a user ID is included in the received TV program information acquisition request, then step S35 is reached. In step S35, the server 191 reads the registered content corresponding to the user ID from the user information database 195.

Step S36 is reached either at the end of step 935, or if in step S34 the TV program information server 191 judges that no user ID is contained in the received TV program information acquisition request. In step S36, the TV program information server 191 searches for and retrieves the TV program information specified by the user-requested date, region, channel, etc., from the pdb-format TV program information database 194.

In step S37, the TV program information server 191 transmits the TV program information retrieved in step S36 to the personal computer 9 over the Internet 8.

In step S38, the I/O management program 171 of the personal computer 9 receives the TV program information from the TV program information service provider 14 via the Internet 8. The hot sync manager 172 sends the received TV program information to the PDA 1-2 through the cradle 7 under control of the I/O management program 171.

In step S39, the I/O management program 171 of the personal computer 9 disconnects from the Internet 8.

In step S40, the TV program recording preset program 83 of the PDA 1-2 receives the TV program information from the personal computer 9 through the cradle 7, writes the received information to the TV program list memory 91, and terminates the processing.

By resorting to the processing discussed above in reference to FIG. 24, any user who does not possess the digital portable telephone 2 can still acquire TV program information through the use of the personal computer 9. The personal computer 9 allows the user to acquire TV program information by connecting with the TV program information service provider 14 that may offer a flat-rate communication service at a particular telephone number during a specific time period (e.g., 23:00 to 8:00).

In the processing of FIG. 13 or that of FIG. 24, the TV program list 101 is recorded into the TV program list memory 91 of the PDA 1. With the program list 101 held in the TV program list memory 91, the user may select with the pen 201 the icon designating the TV program recording preset program 83 on the initial screen of FIG. 11. In that case, the activated TV program recording preset program 83 causes the display unit 31 to display a TV program list screen shown in FIG. 25.

The TV program list screen displayed on the display unit 31 includes a TV program list 281, an advertisement banner 283, and a tag 282. The TV program list 281 includes a channel name 284, a date 285, and a time 286. The advertisement banner 283 illustratively changes its indication automatically in accordance with display time information contained in the advertisement data. The tag 282 indicates the current time (21:22 in this example).

Figure 26:
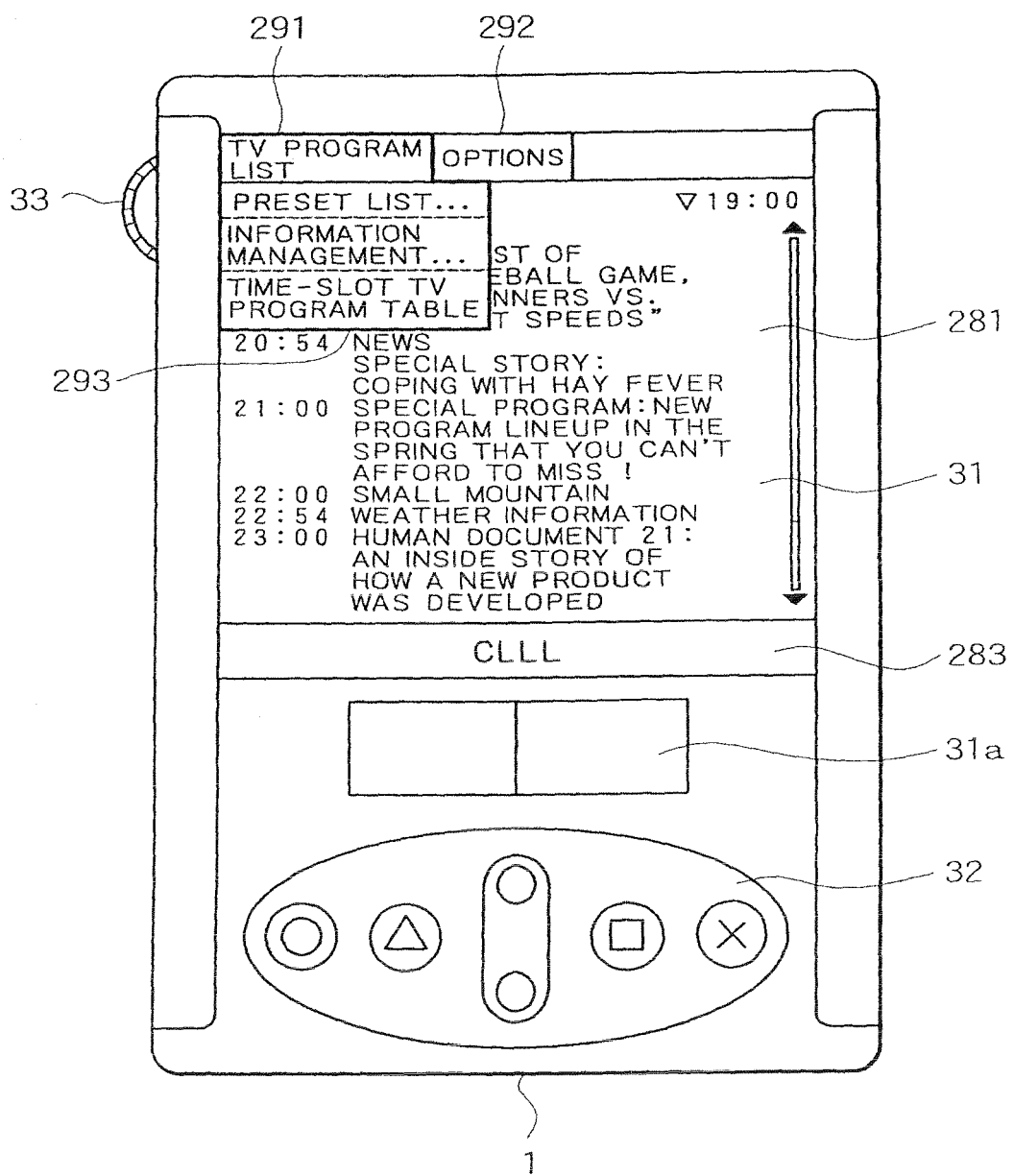
FIG. 26 is an explanatory view of menu indications on the TV program list screen.

When the tag 282 is selected, the display unit 31 displays a TV program list tag 291 and an option tag 292 as shown in FIG. 26. If the user then selects the TV program list tag 291, then a drop-down list box 293 appears. When a "Preset list" item is selected in the drop-down list box 293, there appears a preset screen, to be described later by referring to FIG. 38. If an "Information management" item is selected in the drop-down list box 293, the information management screen of FIG. 23 is displayed. If the start time of a desired TV program shown in the TV program list 281 is first chosen followed by selection of a "Time-slot TV program table" item, then there appears a table of TV program in the designated time slot, to be described later with reference to FIG. 35.

Figure 27:
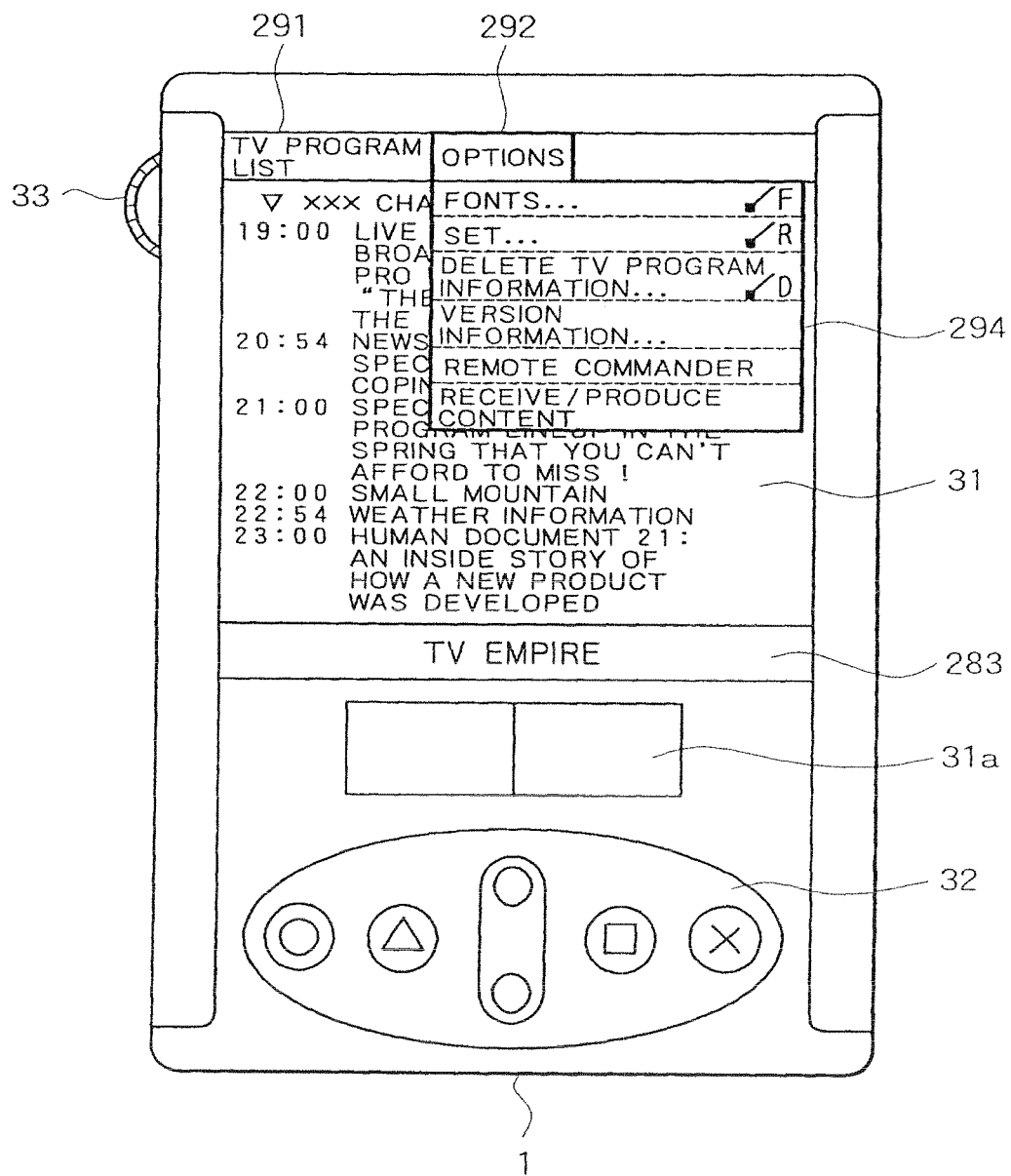
FIG. 27 is an explanatory view of other menu indications on the TV program list screen.

If the user selects the option tag 292, then a drop-down list box 294 appears as shown in FIG. 27. Selecting a "Fonts" item in the drop-down list box 294 displays a setting screen that permits setting of a font in which to give displays on the display unit 31. Selecting a "Set" item in the drop-down list box 294 causes the setting screen of FIG. 16 to appear.

Figure 28:
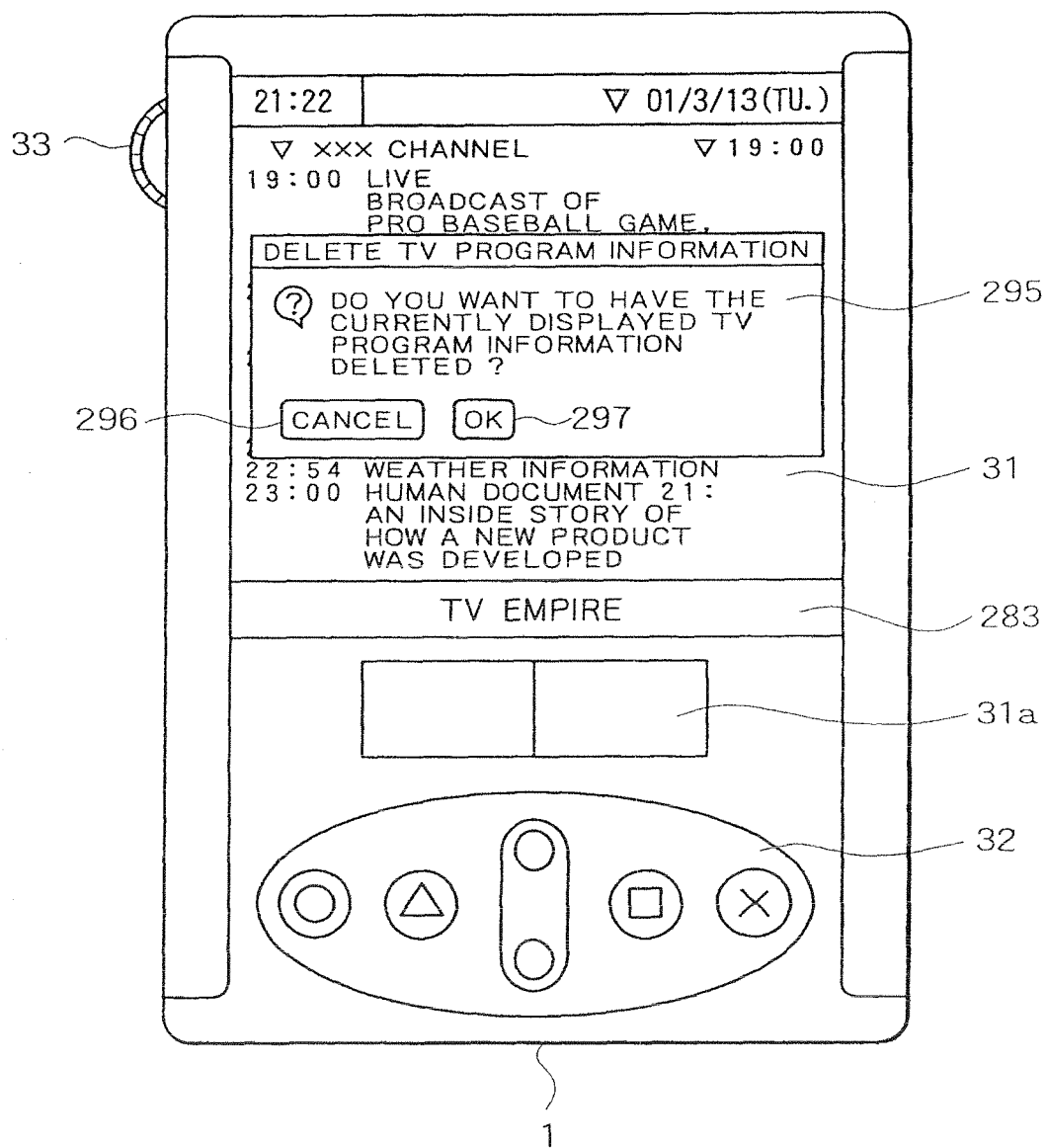
FIG. 28 is a schematic view of another typical message window.

If a "Delete TV program information" item is selected in the drop-down list box 294, a window 295 appears carrying a message prompting the user to confirm the ensuing erasure of TV program information, as shown in FIG. 28. The user selects a CANCEL button 296 if not wishing to erase the TV program information; the user selects an OK button 297 when deleting the information. This arrangement is intended to prevent inadvertent erasure of TV program information if the user has made an erroneous operation.

If a "Version information" item is selected in the drop-down list box 294, then version information about the TV program recording preset program 83 is displayed.

When a "Remote commander" item is selected in the drop-down list box 294, the display unit 31 displays a remote commander display screen, to be described later with reference to FIG. 48. The remote commander display screen provides remote control processes that will be described later by referring to FIGS. 47 through 50.

Figure 29:
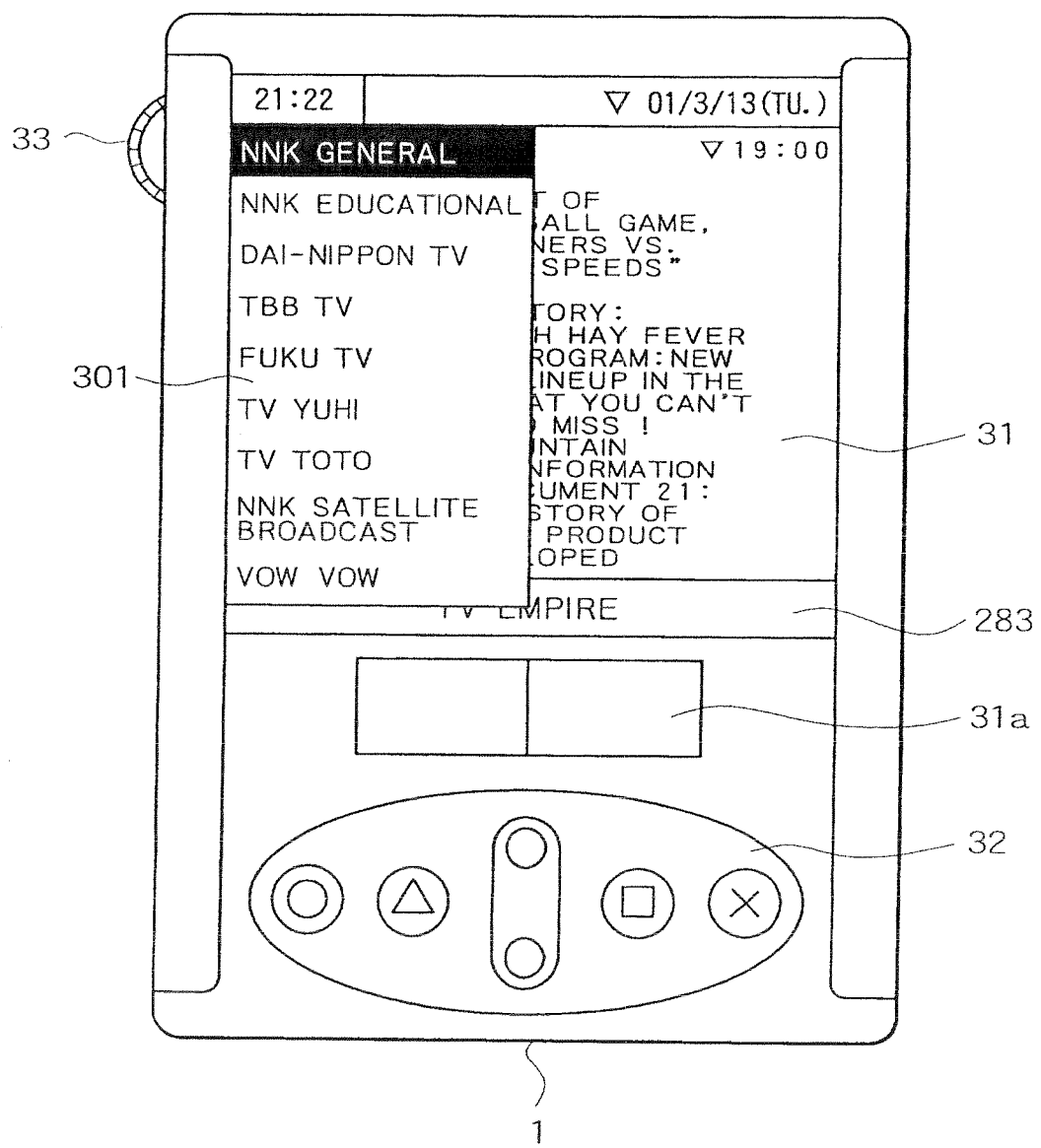
FIG. 29 is a schematic view of a typical channel table display.

When the channel 284 is selected in the TV program list 281 displayed on the display unit 31, a channel list 301 appears as shown in FIG. 29. In the channel list 301 thus displayed, the user selects the desired channel for display on the display unit 31.

Figure 30:
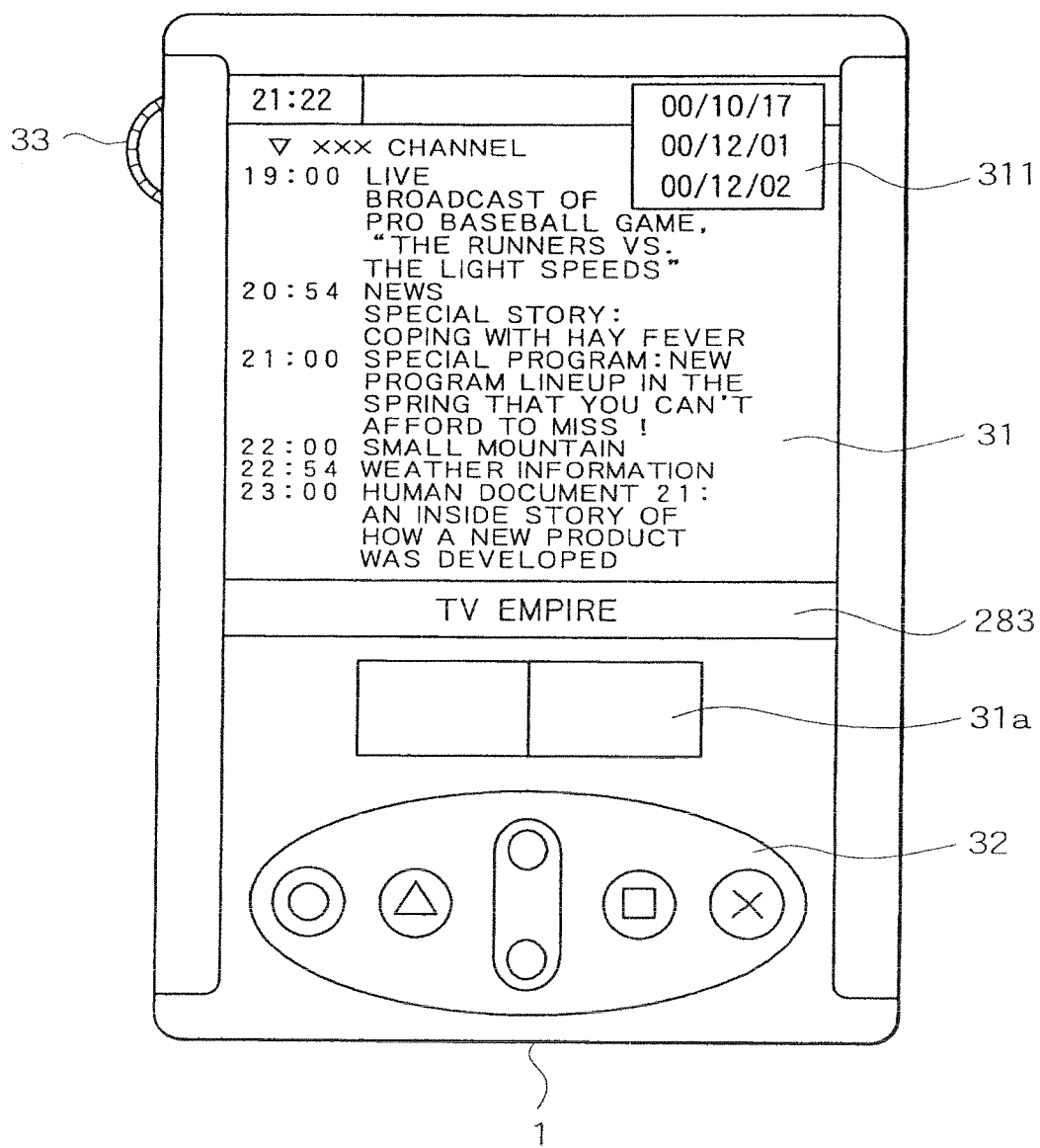
FIG. 30 is a schematic view of a typical date table display.

When the date 285 is selected in the TV program list 281 on the display unit 31, a date list 311 made up of the dates in the TV program list 101 currently held in the TV program list memory 91 appears as shown in FIG. 30. From among the listed dates 311, the user selects the desired date for which to display the TV program list on the display unit 31.

Figure 31:
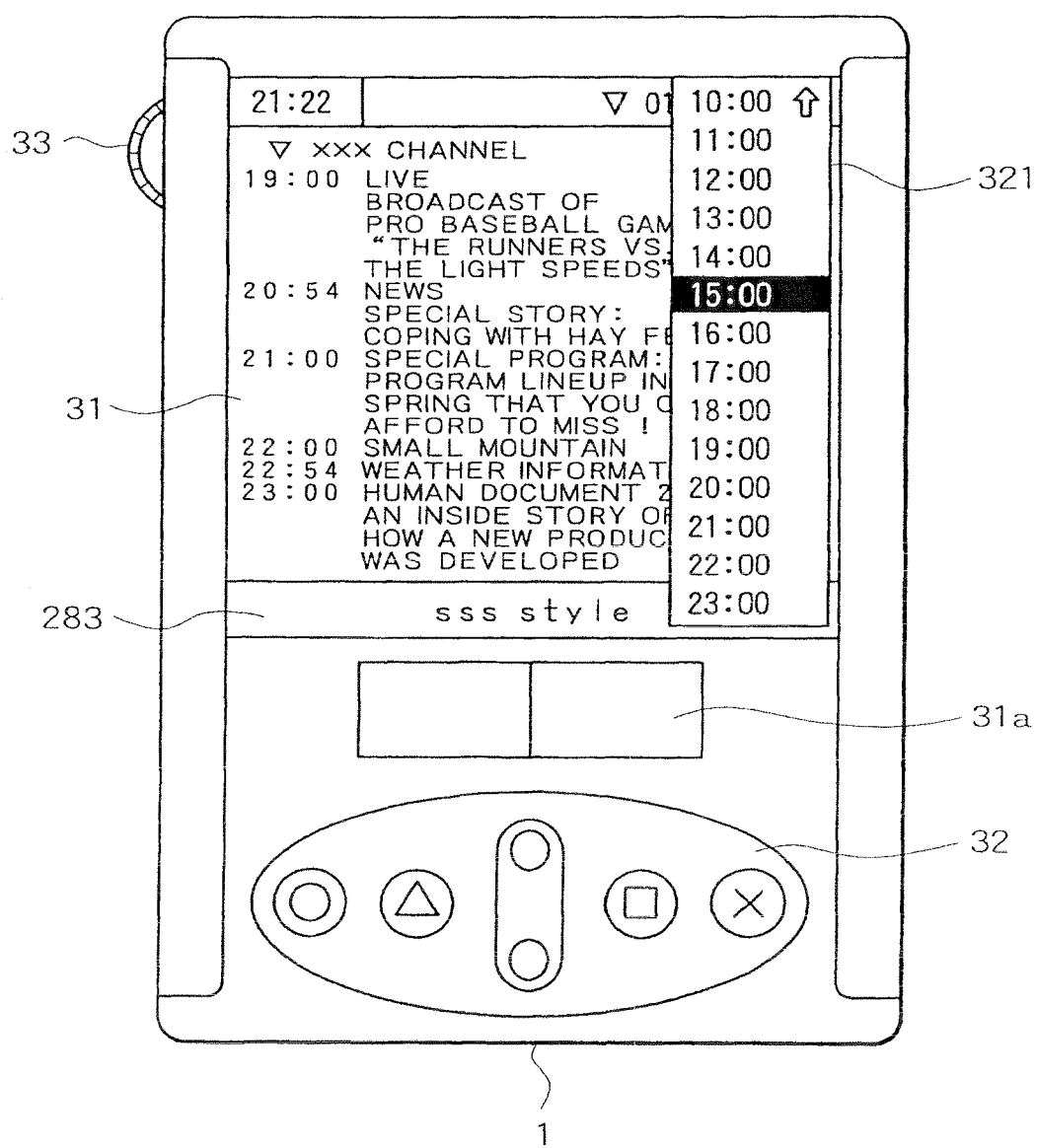
FIG. 31 is a schematic view of a typical list box in which to establish TV program list display start times.

When the time 286 is selected in the TV program list 281 on the display unit 31, a list box 321 appears in which to set a time-of-day at which to start displaying the TV program list on the display unit 31, as shown in FIG. 31. The user then selects the desired start time from the time settings in the list box 321.

Figure 32:
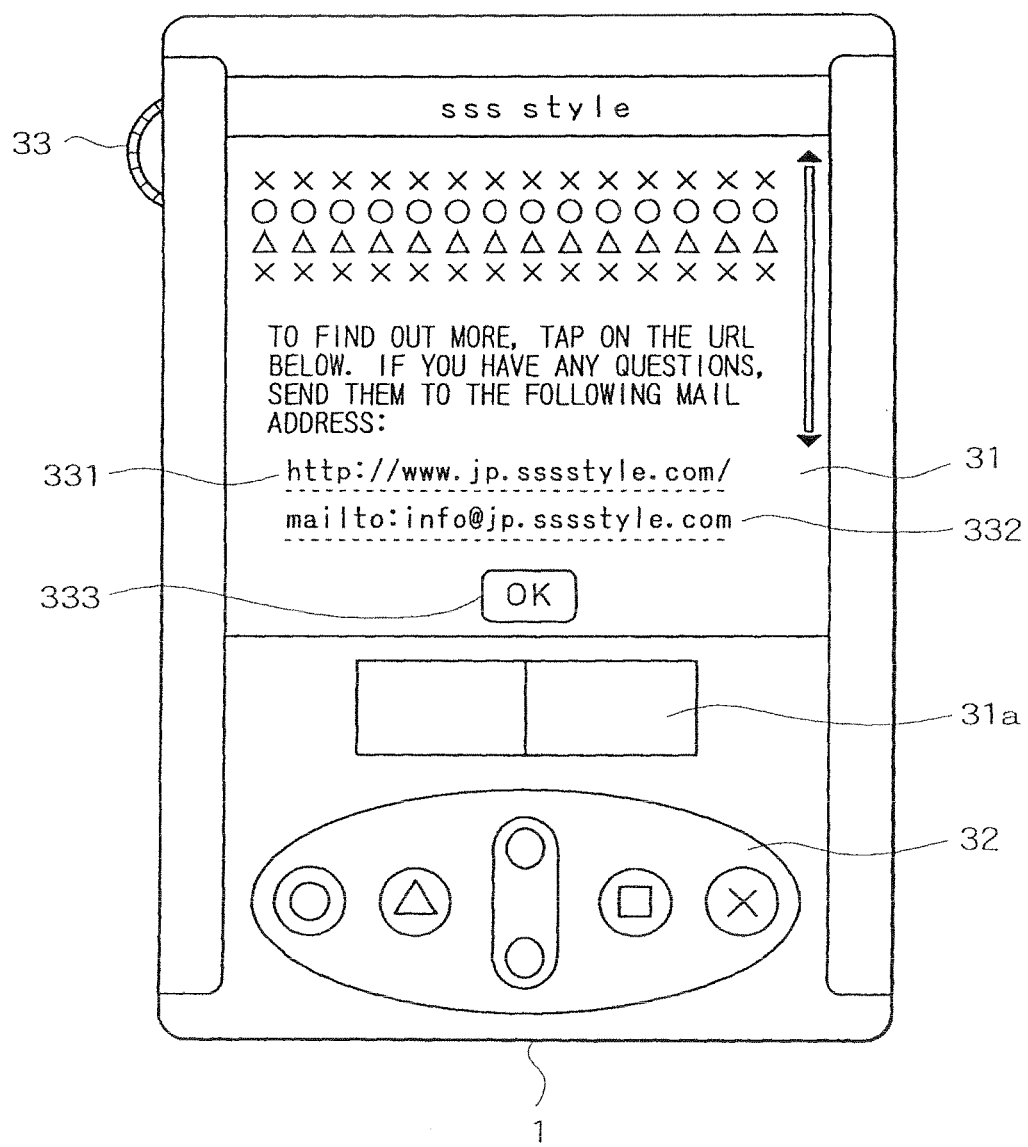
FIG. 32 is a schematic view of a typical detailed advertisement screen.

The advertisement banner 283 changes its indication automatically at predetermined intervals as mentioned above. A click on the advertisement banner 283 by the user displays a detailed advertisement screen as shown in FIG. 32. Where necessary, the detailed advertisement screen may include a link text 331 carrying a URL and/or a mail-to text 332 containing a mail address, as well as an OK button 333 by which to go back to the preceding display screen.

Figure 33:
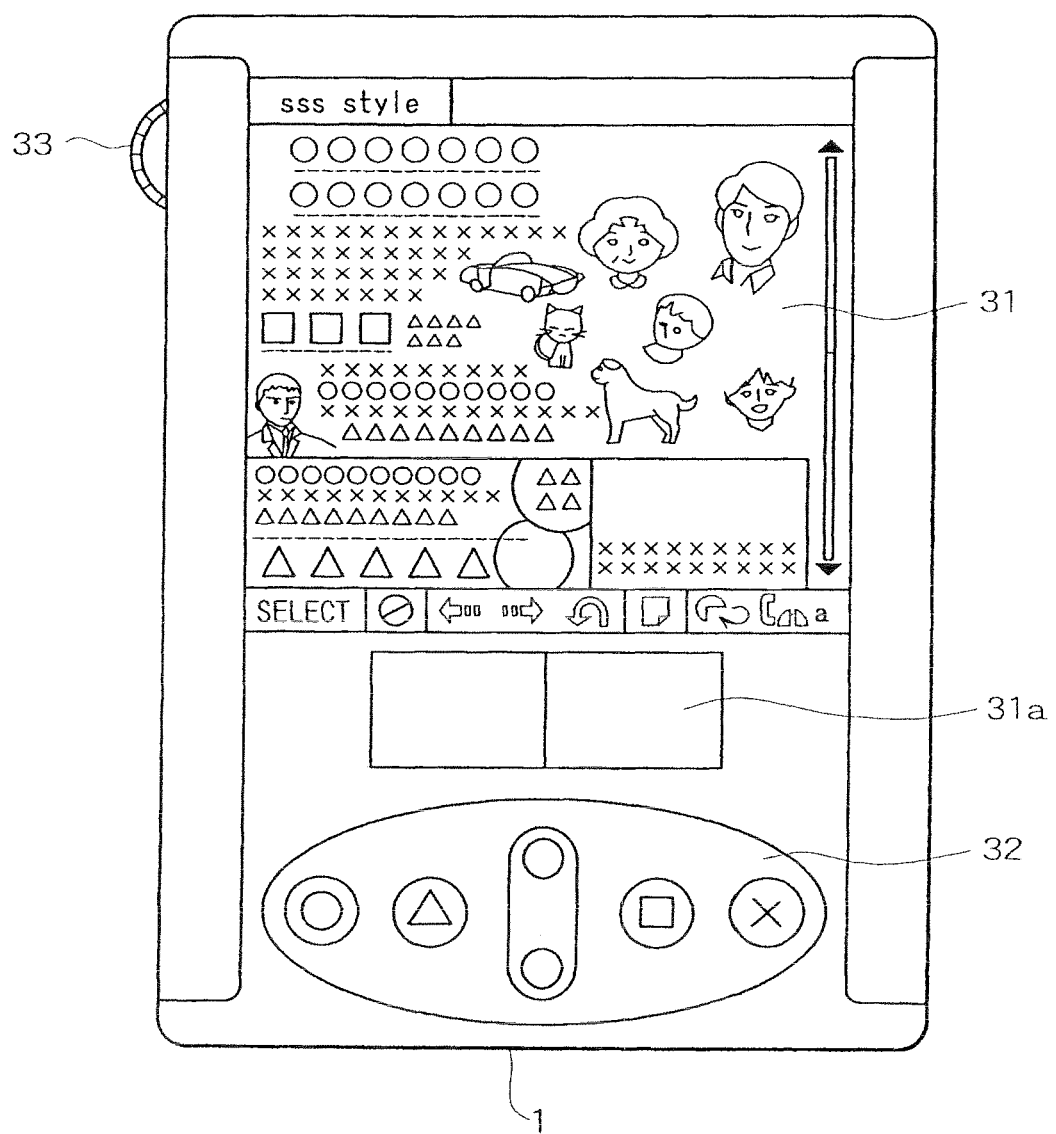
FIG. 33 is a schematic view of a typical display screen in effect when a Web browser is started.

If the user selects the link text 331, the Web browser 86 is activated as shown in FIG. 33. In turn, the Web browser 86 starts the data communication program 81 executing necessary steps to connect with a WWW server, not shown, over the Internet 8. A website page designated by the URL of the link text 331 then appears.

Figure 34:
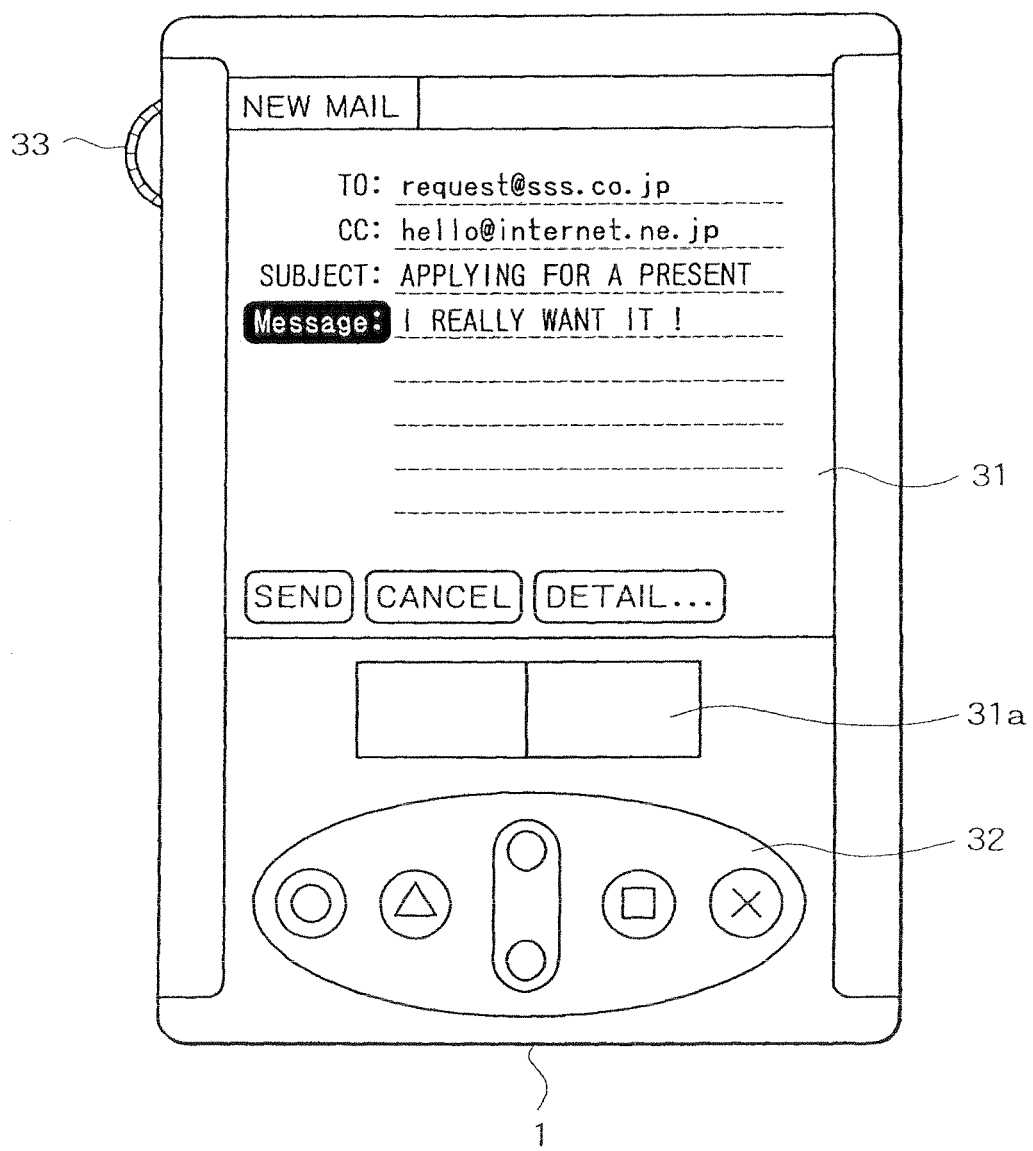
FIG. 34 is a schematic view of a typical display screen in effect when an e-mail program is started.

If the user selects the mail-to text 332, the e-mail program 85 is activated as shown in FIG. 34. The e-mail program 85 displays a mail preparation screen on which to prepare a mail message destined for the address designated by the mail-to text 332. The user's command to transmit the prepared mail causes the e-mail program 85 to start the data communication program 81 which in turn executes necessary steps to connect with a mail server, not shown, in the access server 6. The connection permits transmission of the e-mail to the designated address over the Internet 8.

Before actually presetting the most desired TV program for unattended recording, the user may wish to know what TV programs are available on various channels in the same time slot. In that case, the user may first select the start time of the currently chosen program in the TV program list of FIG. 25, get the drop-down list box 293 of FIG. 26 displayed, and select the "Time-slot TV program table" item. This will cause a table 335 of TV programs in the designated time slot to appear as shown in FIG. 35.

The TV program recording preset program 83 under control of the I/O control program 82 accepts input of the user-selected start time of the desired TV program. Whereas the user selects a TV program start time, the TV program recording preset program 83 extracts the start and end times, not the user-selected time, of the TV program in question from the TV program list memory 91 and retrieves accordingly the information about all TV programs to be broadcast between the extracted start and end times in order to create the table 335 of TV programs in the designated time slot shown in FIG. 35. The TV program table thus created is output under control of the I/O control program 82 to the display unit 31 for display.

Figure 25:
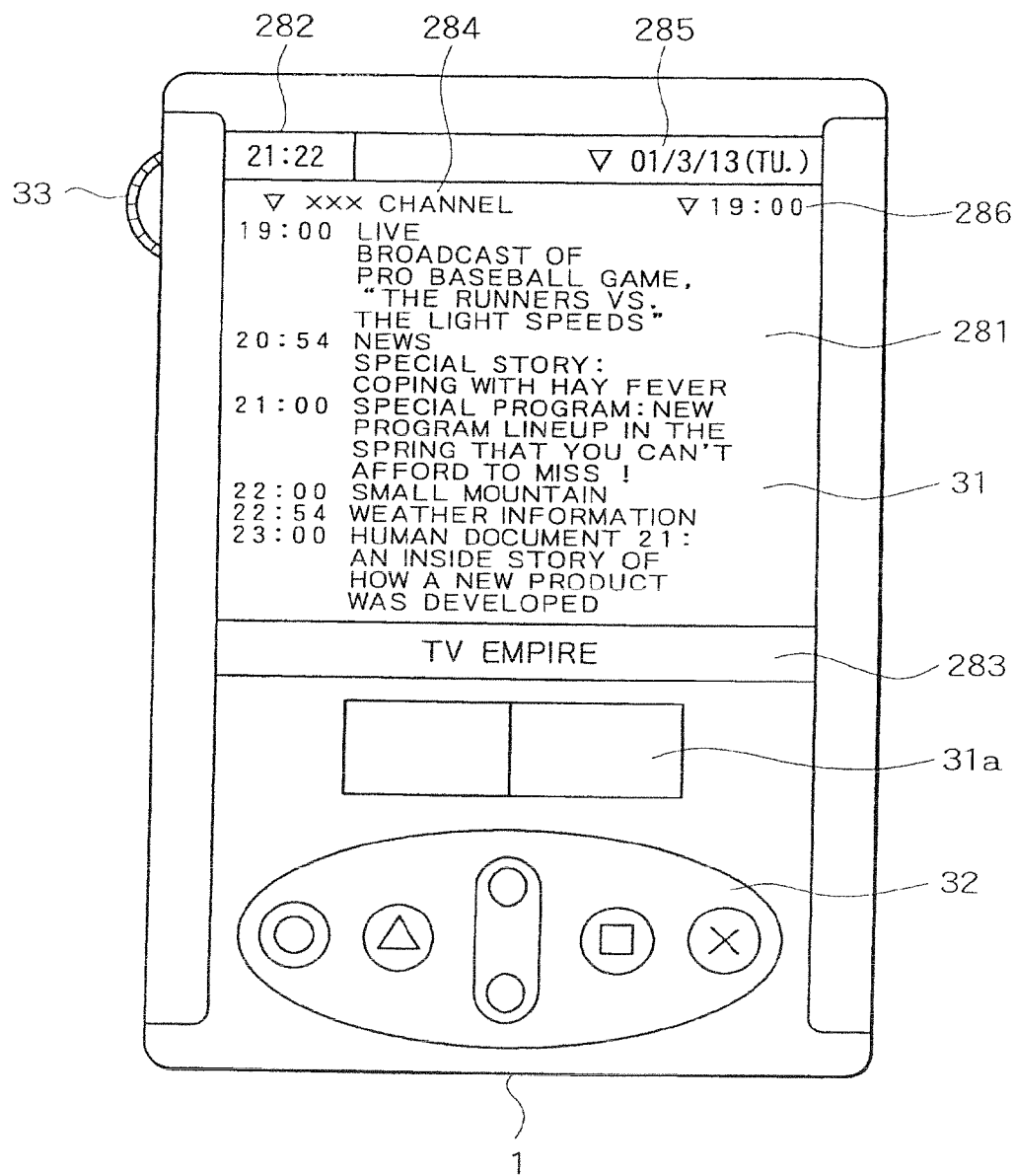
FIG. 25 is a schematic view of a typical TV program list screen.
Figure 35:
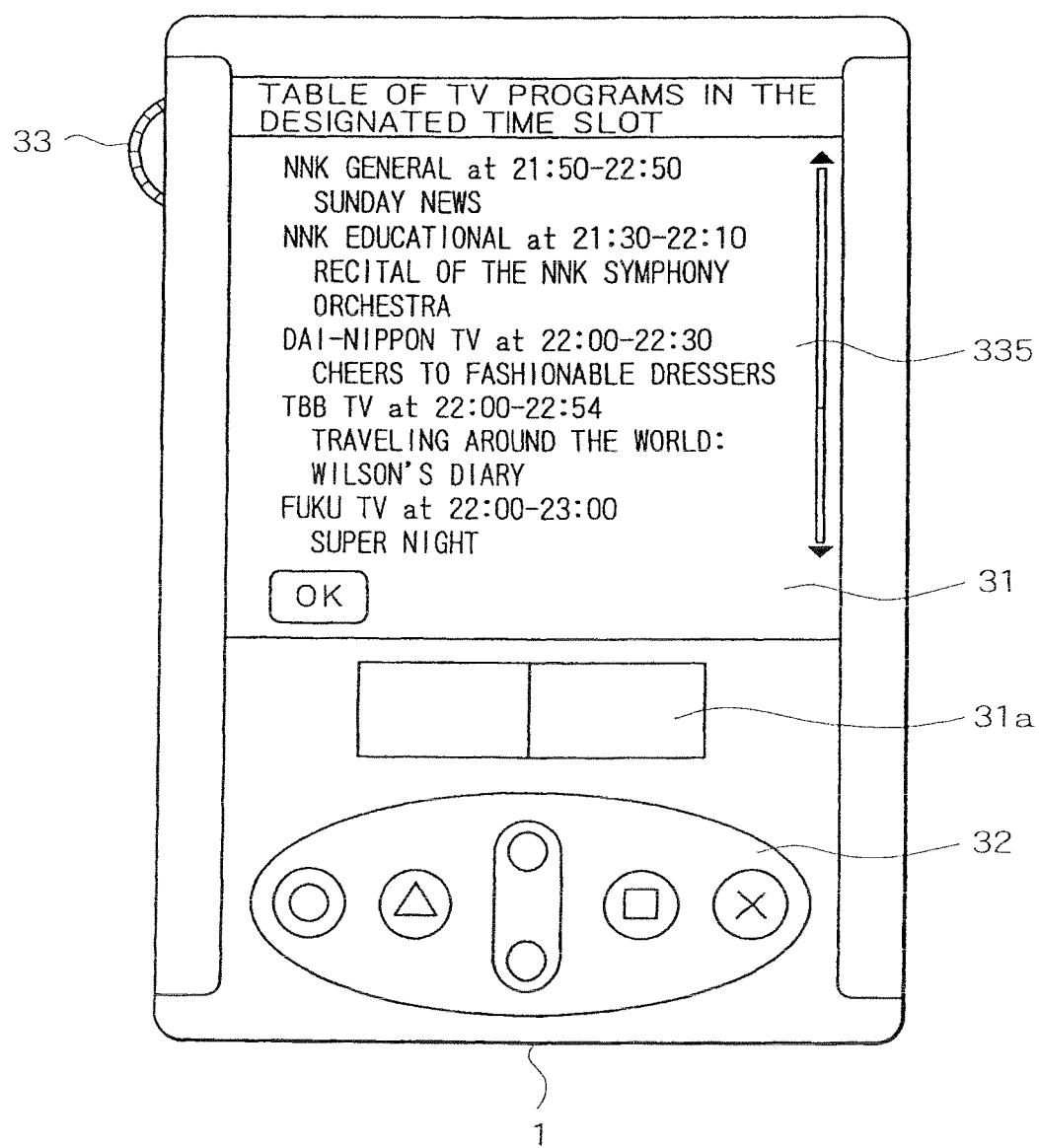
FIG. 35 is a schematic view of a typical table of TV programs in a designated time slot.

In the TV program list of FIG. 25 or in the table 335 of TV programs in the specified time slot in FIG. 35, the user can select the desired TV program and preset its unattended recording using the personal computer 9.

Figure 36:
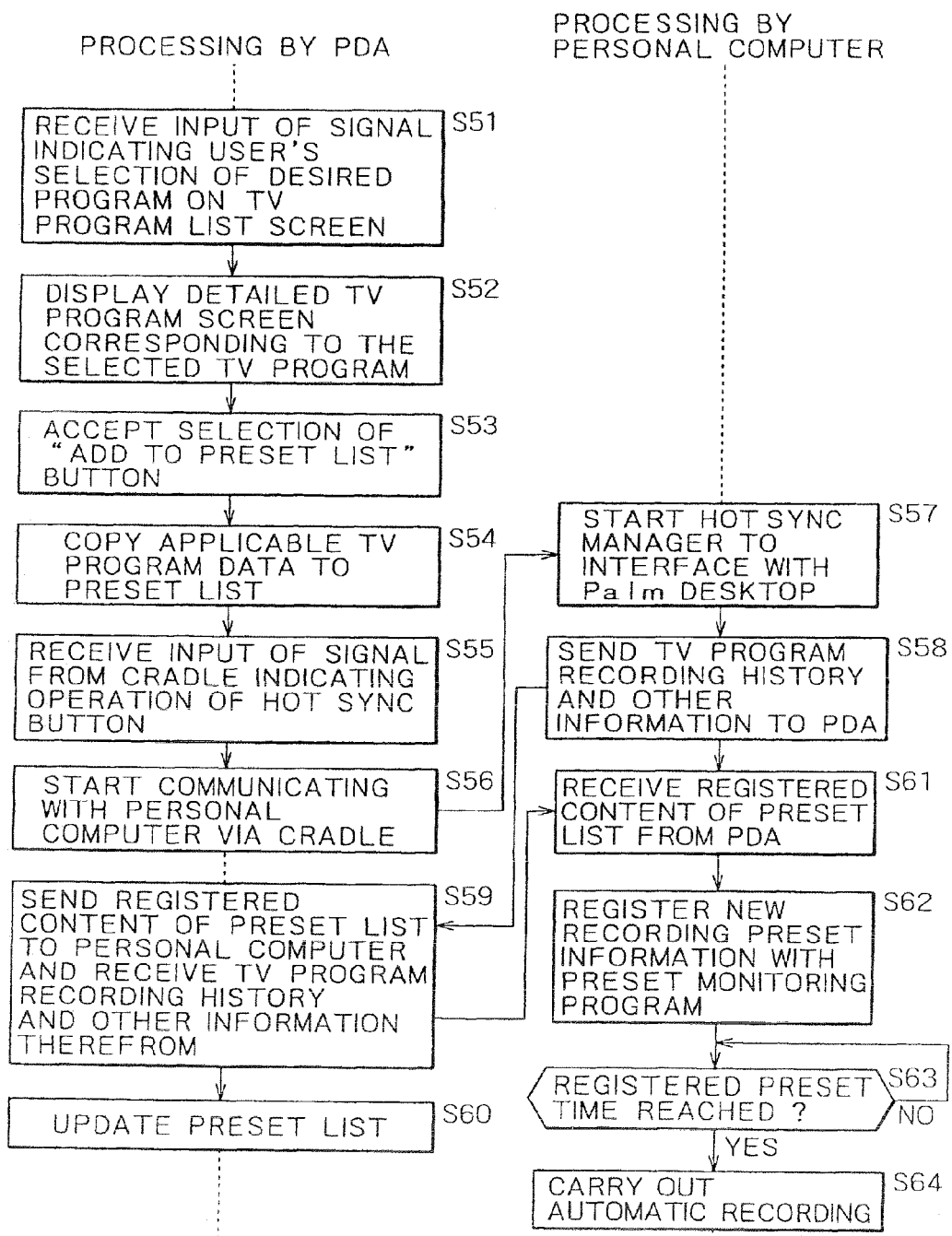
FIG. 36 is a flowchart of steps constituting a recording preset process.

Described below with reference to the flowchart of FIG. 36 is what takes place when unattended recording of a given TV program is preset by use of the personal computer 9.

Figure 37:
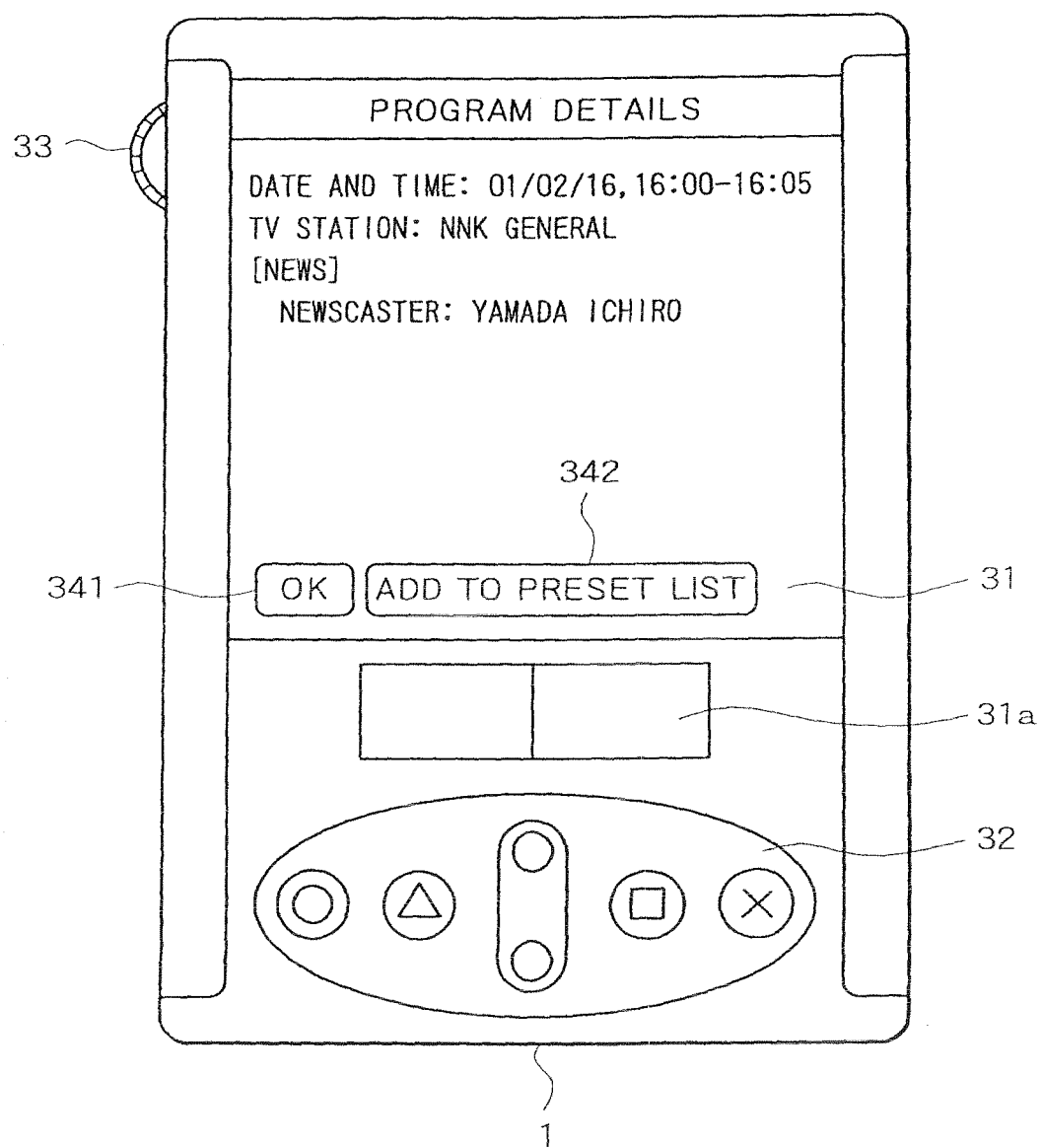
FIG. 37 is a schematic view of a typical detailed TV program screen.

In step S51 of FIG. 36, the TV program recording preset program 83 of the PDA 1 under control of the I/O control program 82 receives input of a signal representing the selection of a desired TV program by the user in the TV program list 281. In step S52, the recording preset program 83 displays a detailed TV program screen corresponding to the selected TV program as shown in FIG. 37.

More specifically, the user first selects the desired TV program in the TV program list 281 (or from the table 335 of TV programs in the designated time slot in FIG. 35). The user's selecting action causes the detailed TV program screen to appear as depicted in FIG. 37.

The detailed TV program screen includes detailed information about the TV program of interest (detailed information is part of the TV program data in the TV program list 101 described with reference to FIG. 6), an OK button 341 that is pushed to go back to the preceding display screen (TV program list 281 or table 335 of TV programs in the designated time slot), and an "ADD TO PRESET LIST" button 342 that is operated to add this TV program to the preset list 92. The detailed TV program screen may alternatively indicate the URL of a website administered by the TV broadcasting station in question, or the URL of a website from which the information about the TV program in question is made available.

In step S53, the TV program recording preset program 83 of the PDA 1 under control of the I/O control program 82 accepts selection of the "ADD TO PRESET LIST" button 342. In step S54, the recording preset program 83 retrieves the corresponding TV program list 101 from the TV program list memory 91 and copies the TV program data in the retrieved TV program list 101 to the preset list 92.

Figure 38:
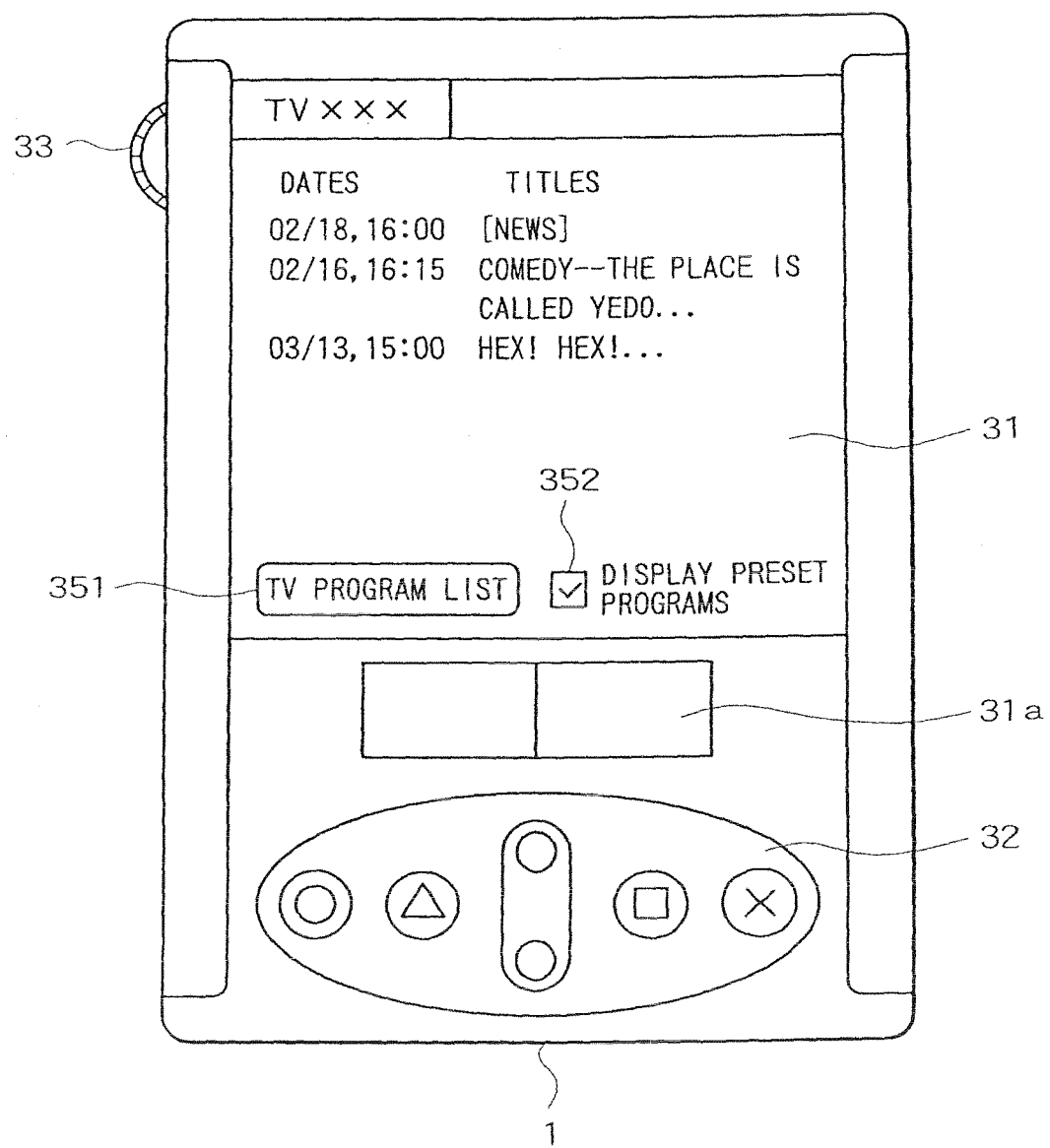
FIG. 38 is a schematic view of a typical preset list screen.

Suppose that on the detailed TV program screen of FIG. 37, the "ADD TO PRESET LIST" button 342 is selected to copy the relevant TV program data to the preset list 92. In that case, a preset list screen appears as shown in FIG. 38. This preset list screen displays the dates, times and titles constituting the TV program data copied into the preset list 92, as well as a "TV PROGRAM LIST" button 351 and a check box 352. The "TV PROGRAM LIST" button 351 is used to go back to the TV program list 281. The check box 352 is checked or left unchecked to determine whether or not to display the past data yet to be deleted from the preset list 92.

Figure 39:
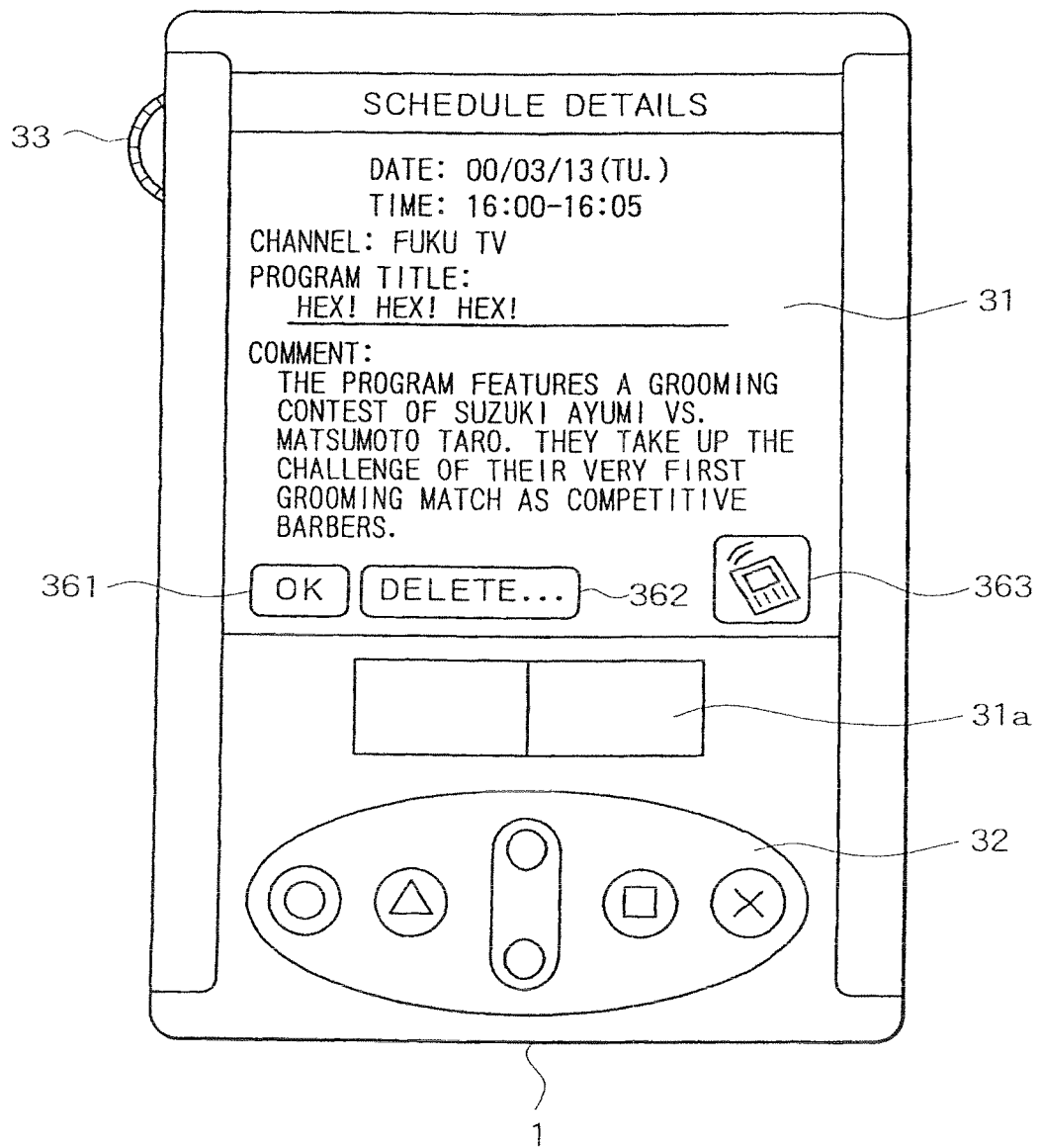
FIG. 39 is a schematic view of a typical schedule detail screen.

When the user selects a given TV program name in the preset list screen, a schedule detail screen appears as depicted in FIG. 39. The schedule detail screen displays detailed information about the selected TV program such as the scheduled date and time for the program broadcast, the channel of the broadcast, the title of the program, and a comment. The schedule detail screen also includes an OK button 351, a DELETE button 362, and a SEND button 363. The OK button 351 is operated to go back to the preceding display screen, i.e., the preset list screen of FIG. 38. The DELETE button 362 is selected when what is preset for this TV program needs to be erased. The SEND button 363 is used to transmit an unattended recording preset command regarding the TV program of interest to the personal computer 9 (or to the VCR 13) in a command transmission process that will be described later in more detail with reference to FIG. 46.

Figure 40:
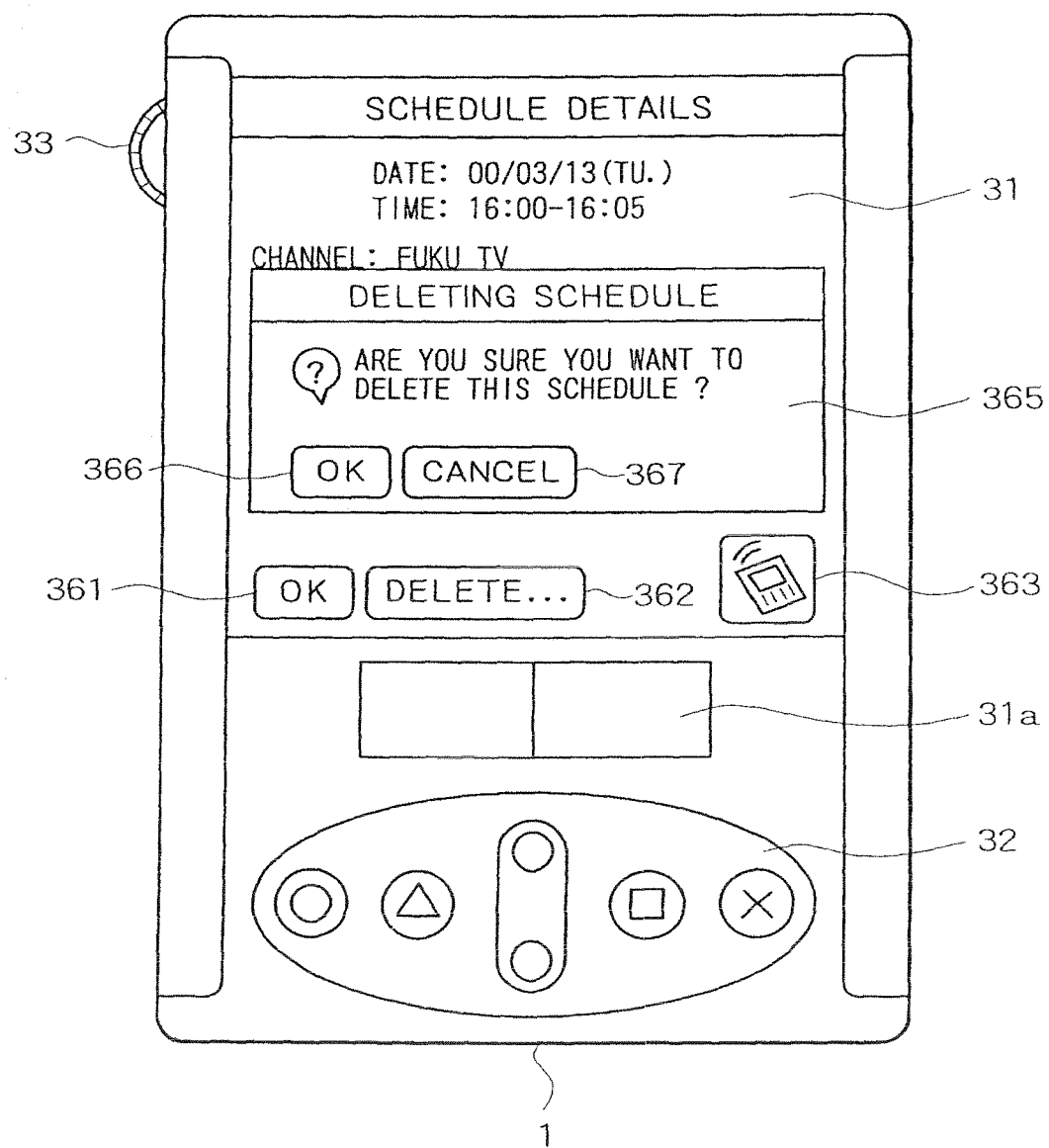
FIG. 40 is a schematic view of another typical message window.

Selecting the DELETE button 362 displays a confirmation window 365 carrying a message such as "Are you sure you want to delete this schedule?" as shown in FIG. 40. The window 365 also includes an OK button 366 that is pushed to delete the selected schedule, and a CANCEL button 367 that is activated to cancel the subsequent erasure.

In step S55 of FIG. 36, the TV program recording preset program 83 of the PDA 1 under control of the data communication program 81 receives a signal from the cradle 7 through the communication unit 53, the signal indicating that the hot sync button 35 is pushed. In step S56, the data communication program 81 starts communicating with the personal computer 9 via the communication unit 53 and cradle 7.

In step S57, the CPU 131 of the personal computer 9 starts the hot sync manager 172 (discussed earlier in reference to FIG. 9) in response to a communication start signal sent from the cradle 7 via the communication board 145, external bus 136, bridge 135, and host bus 134. Upon activating the hot sync manager 172, the CPU 131 interfaces with the Palm desktop 173. In step S58, the CPU 131 under control of the I/O management program 171 transmits a history of TV program recordings made after the preceding hot sync process and other information to the PDA 1 through the communication board 145 and cradle 7.

In step S59, the TV program recording preset program 83 of the PDA 1 under control of the data communication program 81 transmits the registered content of the preset list 92 to the personal computer 9 through the cradle 7, and receives the TV program recording history and other information from the personal computer 9 (i.e., the information sent by the personal computer 9 in step S58). In step S60, the TV program recording preset program 83 updates the preset list 92 based on the received TV program recording history.

Figure 41:
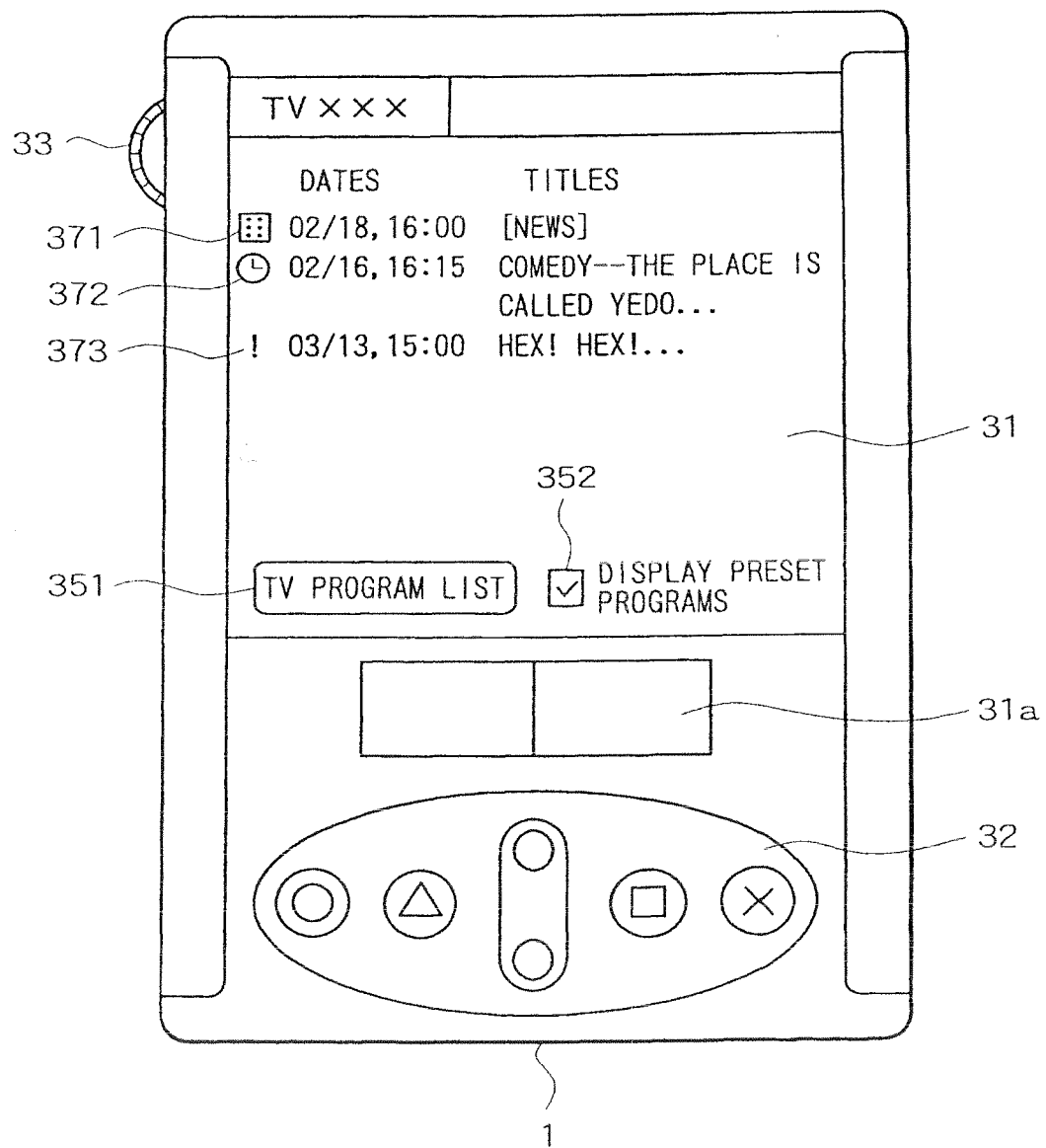
FIG. 41 is a schematic view of icons displayed illustratively to indicate the current recording status.

Illustratively, the TV program data currently recorded in the preset list 92 include the TV program recording history sent by the personal computer 9 in step S58, the history containing information about the status of previously established unattended recordings monitored by the preset monitoring program 174 of the personal computer 9. After the TV program recording preset program 83 has updated the preset list 92 based on the received information, the preset list screen subsequently displayed by the user may indicate any or all of icons 371, 372 and 373 reflecting the content of the preset list 92, as shown in FIG. 41. The icon 371 indicates that the icon-marked TV program has been recorded. The icon 372 shows that the corresponding TV program is currently preset for unattended recording. The icon 373 warns of an error such as double booking. These icons let the user of the PDA 1 know the current status of the selected TV programs being preset for unattended recording or having been recorded already by the personal computer 9.

In step S61, the hot sync manager 172 of the personal computer 9 under control of the I/O management program 171 receives the registered content of the preset list 92 from the PDA 1 via the cradle 7 and communication board 145. In step S62, the hot sync manager 172 registers new recording preset information with the preset monitoring program 174.

In step S63, the preset monitoring program 174 checks whether any of the start times preset for unattended TV program recording is reached. If in step S63 none of the start times preset for unattended recording is judged reached, step S63 is repeated until one of the start times is judged reached.

If in step S63 one of the preset start times is judged reached, then step S64 is reached. In step S64, the preset monitoring program 174 carries out an automatic recording process. After the recording, the processing is terminated.

The above-described processing first causes the preset recording information registered in the preset list 92 on the PDA 1 to be sent to the personal computer 9. The personal computer 9 in turn takes over the automatic recording process of the TV program or programs as desired by the user.

The PDA 1 has the schedule list program 84 installed therein in a readily executable manner, as described above with reference to FIG. 5. The schedule list program 84 is a program that manages the user's schedule.

Sometimes the user may wish to include in his or her schedule the presetting of a desired TV program or programs for unattended recording. In such a case, the user need only check the check box 243 on the setting screen of FIG. 16 in order to reflect the registered content of the preset list 92 in the schedule list 94.

Figure 42:
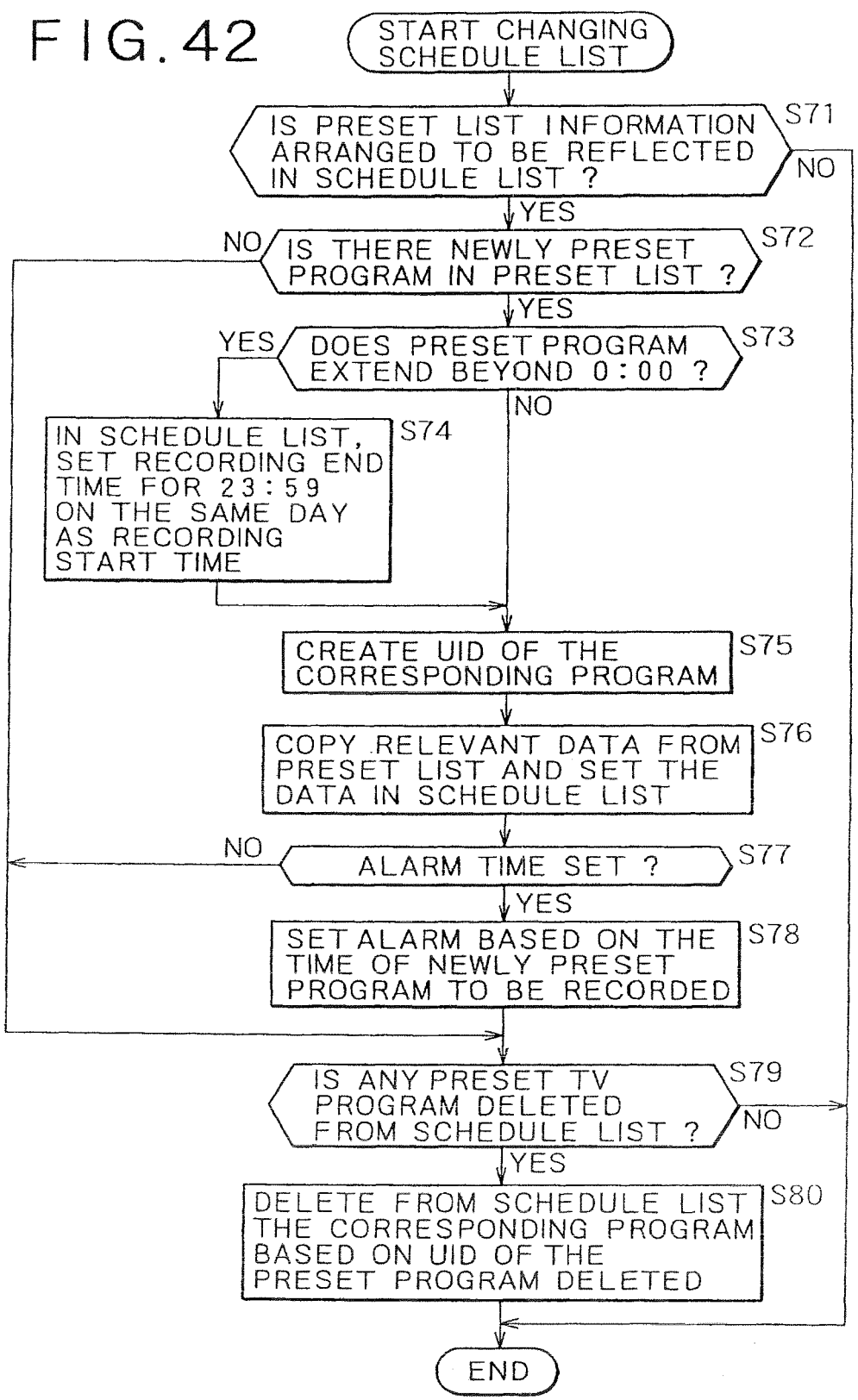
FIG. 42 is a flowchart of steps constituting a preset list changing process.
Figure 43:
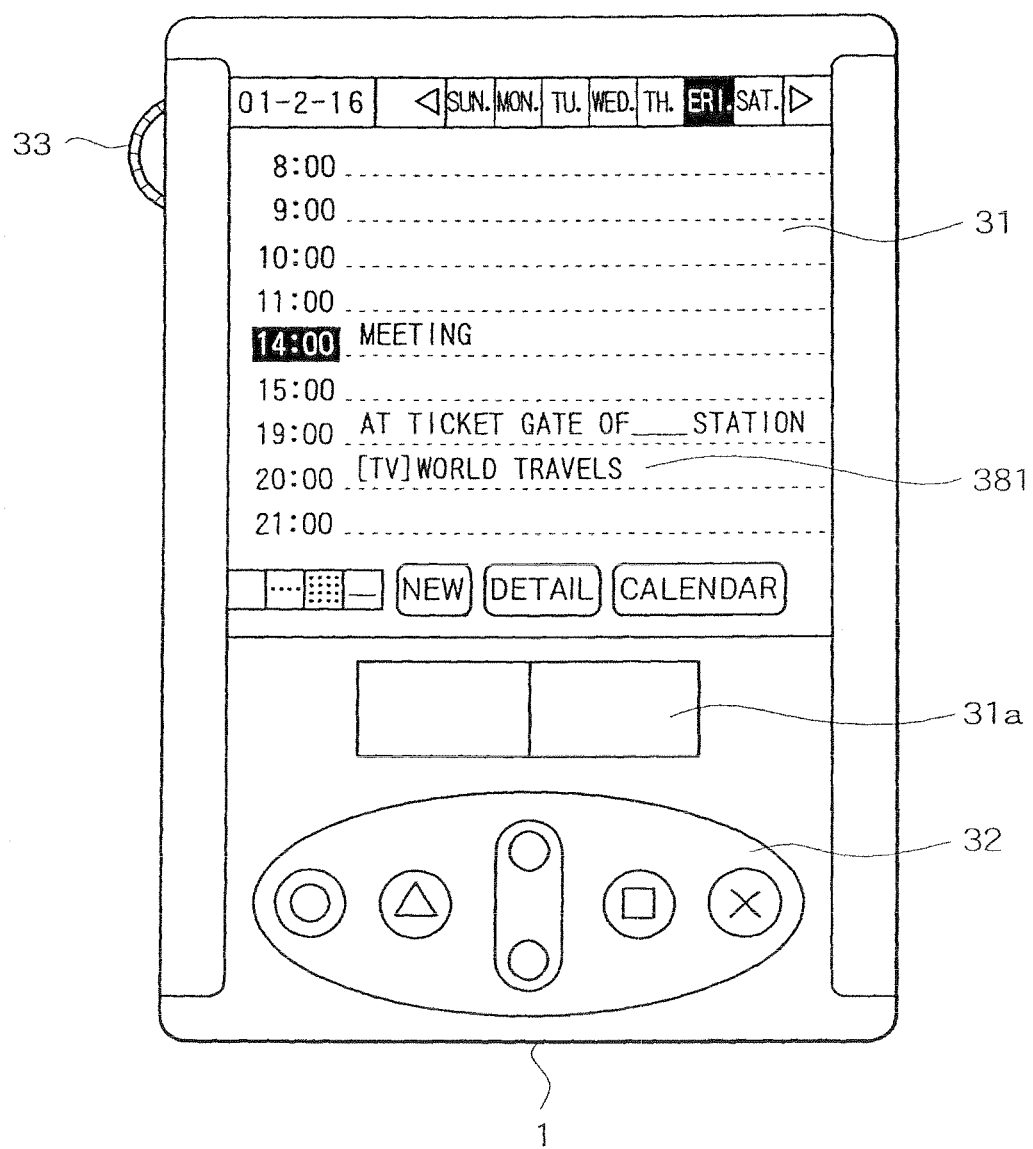
FIG. 43 is a schematic view of a typical schedule list display reflecting a preset TV program schedule.

How to change the schedule list 94 on the PDA 1 will now be described by referring to the flowchart of FIG. 42.

In step S71, the TV program recording preset Program 83 of the PDA 1 determines whether or not the check box 243 is checked, i.e., whether the preset information in the preset list 92 is set to be reflected in the schedule list 94 of the schedule list program 84, based on the content set in the preset information memory 93.

If in step S71 the TV program recording preset program 83 judges that the preset information in the preset list 92 is set to be reflected in the schedule list 94, then step S72 is reached. In step S72, the TV program recording preset program 83 checks to see if unattended recording of any TV program is newly preset in the preset list 92. If in step S71 the TV program recording preset program 83 judges the preset information in the preset list 92 is not set to be reflected in the schedule list 94, then the processing is brought to an end.

If in step S72 the TV program recording preset program 83 judges that unattended recording of a TV program is newly preset in the preset list 92, then step S73 is reached. In step S73, the TV program recording preset program 83 determines whether the newly preset TV program extends beyond the time 0:00 (i.e., goes into the next day) if recorded. If in step S72 the TV program recording preset program 83 judges that unattended recording of any TV program is not newly preset in the preset list 92, then step S79 is reached.

If in step S73 the TV program recording preset program 83 judges that the newly preset TV program will extend beyond the time 0:00 if recorded, then step S74 is reached. In step S74, the TV program recording preset program 83 sets the recording end time of the TV program in question for 23:59 of the same day as the recording start time in the schedule list 94.

Step S75 is reached either at the end of step S74, or if in step S73 the TV program recording preset program 83 judges that the newly preset TV program will not extend beyond the time 0:00 if recorded. In step S75, the TV program recording preset program 83 creates a DID assigned uniquely to each newly preset TV program to be recorded unattended. In step S76, the TV program recording preset program 83 copies the corresponding data from the preset list 92 and stores the copied data along with the DID to the schedule list 94 of the schedule list program 84.

In step S77, the schedule list program 84 determines whether an alarm has been set to go off a certain time period before a scheduled start time.

If in step S77 the schedule list program 84 judges that the alarm is set, then step S78 is reached. In step S78, the schedule list program 84 sets the alarm based on the preset recording start time of the newly booked TV program. For example, if the alarm has been set to go off 10 minutes before the start time of a certain event, then the schedule list program 84 sets the alarm to go off 10 minutes before the start time of the newly preset TV program for unattended recording. If in step S77 the schedule list program 84 judges that the alarm is not set, then step S79 is reached In step S79, the TV program recording preset program 83 checks to see whether any preset TV program has been deleted from the preset list 92 since the last change made in the preset list 92.

If in step S79 the TV program recording preset program 83 judges that a preset TV program is deleted from the preset list 92, then step S80 is reached. In step S80, the TV program recording preset program 83 supplies the schedule list program 84 with the UID of the preset TV program that has been deleted. In response, the schedule list program 84 deletes from the schedule list 94 the information about the TV program corresponding to the supplied UID.

The processing is terminated either at the end of step S80, of if in step S79 the TV program recording preset program 83 judges that no preset TV program has been deleted from the preset list 92.

The processing described above with reference to the flowchart of FIG. 42 causes the data in the preset list 92 to be reflected in the data held in the schedule list 94. In turn, on the initial screen of FIG. 11, selecting the icon for activating the schedule list program 84 displays a schedule list screen that contains the added schedule of the preset TV program for unattended recording.

On that schedule list screen an inserted keyword 244 appears, followed by the name of the preset TV program to be recorded unattended. The keyword 244, described earlier with reference to FIG. 16, is indicated to distinguish the scheduled TV program recording from the rest of the schedule. The distinction may alternatively be made by suitably changing the colors of display on the screen.

The data communication program 81 of the PDA 1 may also communicate with other devices by either using infrared rays through the infrared communication unit 22 or by utilizing radio waves via the wireless LAN communication unit 64.

What follows is a description of how the PDA 1-1 sends the information established by the TV program recording preset program 83 illustratively to the FDA 1-2.

The user first displays the information management screen described above by referring to FIG. 20, and selects on the screen the date corresponding to the acquired TV program information or the preset content of any unattended TV program recording to be transmitted. A plurality of dates may be selected. The user then causes the drop-down list box 268 shown in FIG. 22 to appear and selects an "Infrared communication of information" item in the box. Through infrared ray communication, the TV program recording preset program 83 transmits the acquired TV program information along with advertisement information or the preset content of the unattended TV program recording corresponding to the selected date or dates. At this point, the advertisement information is sent first so as to circumvent attempts to transmit only the information excluding the advertisement.

Figure 44:
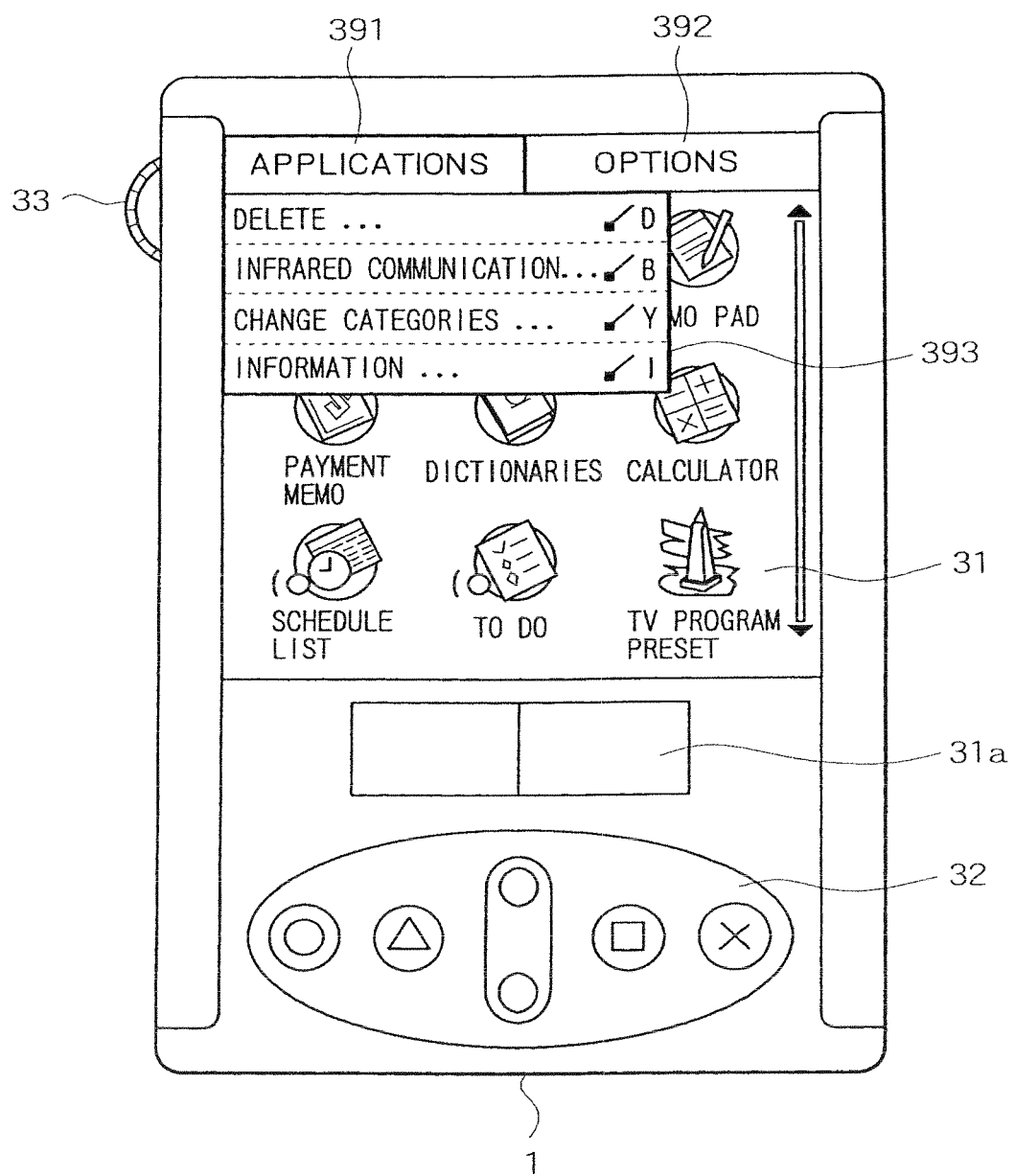
FIG. 44 is an explanatory view of other menu indications.

On the initial screen of FIG. 11, the user may alternatively get menu items displayed including an application tag 391 and an option tag 392, as shown in FIG. 44. The user then selects the application tag 391.

Figure 45:
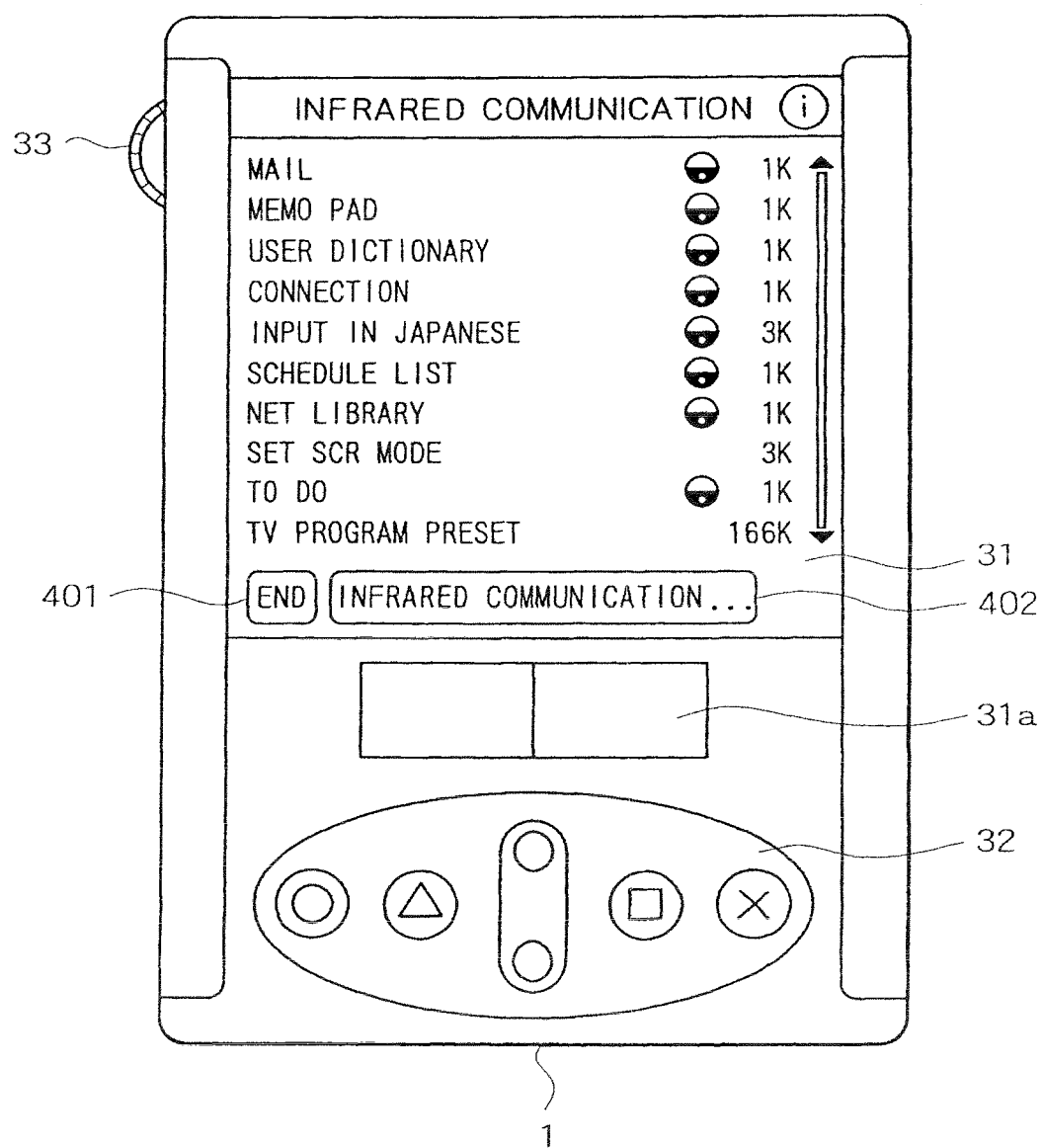
FIG. 45 is a schematic view of a typical infrared communication screen.

In response to the user's input operation, the Palm OS of the PDA 1-1 displays a drop-down list box 393. In the drop-down list box 393, the user selects an "Infrared communication" item to get an infrared communication screen displayed as depicted in FIG. 45.

The infrared communication screen displays a table of applications possessed by the PDA 1-1. The screen also includes an END button 401 for terminating infrared communication mode, and an INFRARED COMMUNICATION button 402 by which to send the data of the selected application through infrared communication.

In the application table, the user selects a "TV Program Preset" application and operates the INFRARED COMMUNICATION button 402. Given the user's input operation, the Palm OS of the PDA 1-1 searches for the destination device for infrared communication (PDA 1-2 in this example). When the destination device is found, the information held by the TV program recording preset program 83 (such as the downloaded TV program list 101 in the TV program list memory 91 or the scheduled TV programs for unattended recording in the preset list 92) is transmitted to that device through infrared communication. In this case, as in the previous example, advertisement information is sent first.

Explained in the above example was how to send the downloaded TV program list 101 from the TV program list memory 91 or the preset TV program schedule from the preset list 92 by means of infrared communication. Needless to say, the same transmission process can be executed alternatively by resorting to wireless communication.

Because the TV program recording preset program 83 of the PDA 1-1 is capable of sending to the PDA 1-2 the data representing the preset TV programs from the preset list 92 by means of infrared or wireless communication, there can be an advantageous situation like this: one user possessing the PDA 1-1 may download beforehand TV program information to prepare a list of preset TV programs on behalf of another user who owns the PDA 1-2. The preset list 92 thus prepared may be transmitted to the PDA 1-2. In turn, the user of the PDA 1-2 may preset unattended recording of the TV programs in question on the personal computer 9 or on the VCR 13 in the manner described above with reference to FIG. 36.

The TV program recording preset program 83 is also capable of transmitting a preset TV program recording command to the personal computer 9 or to the VCR 13 using the infrared communication function of the PDA 1. A push on the SEND button 363 by the user on the schedule detail screen of FIG. 39 causes the TV program recording preset program 83 to generate a command for recording the currently displayed TV program. The recording command is output through the infrared communication unit 22 (or wireless LAN communication unit 64) under control of the data communication program 81.

How the recording command is transmitted to the personal computer 9 through infrared communication will now be described by referring to the flowchart of FIG. 46. Command transmission to the VCR 13 instead of to the personal computer 9 also takes place in like manner and thus will not be described further below.

Figure 46:
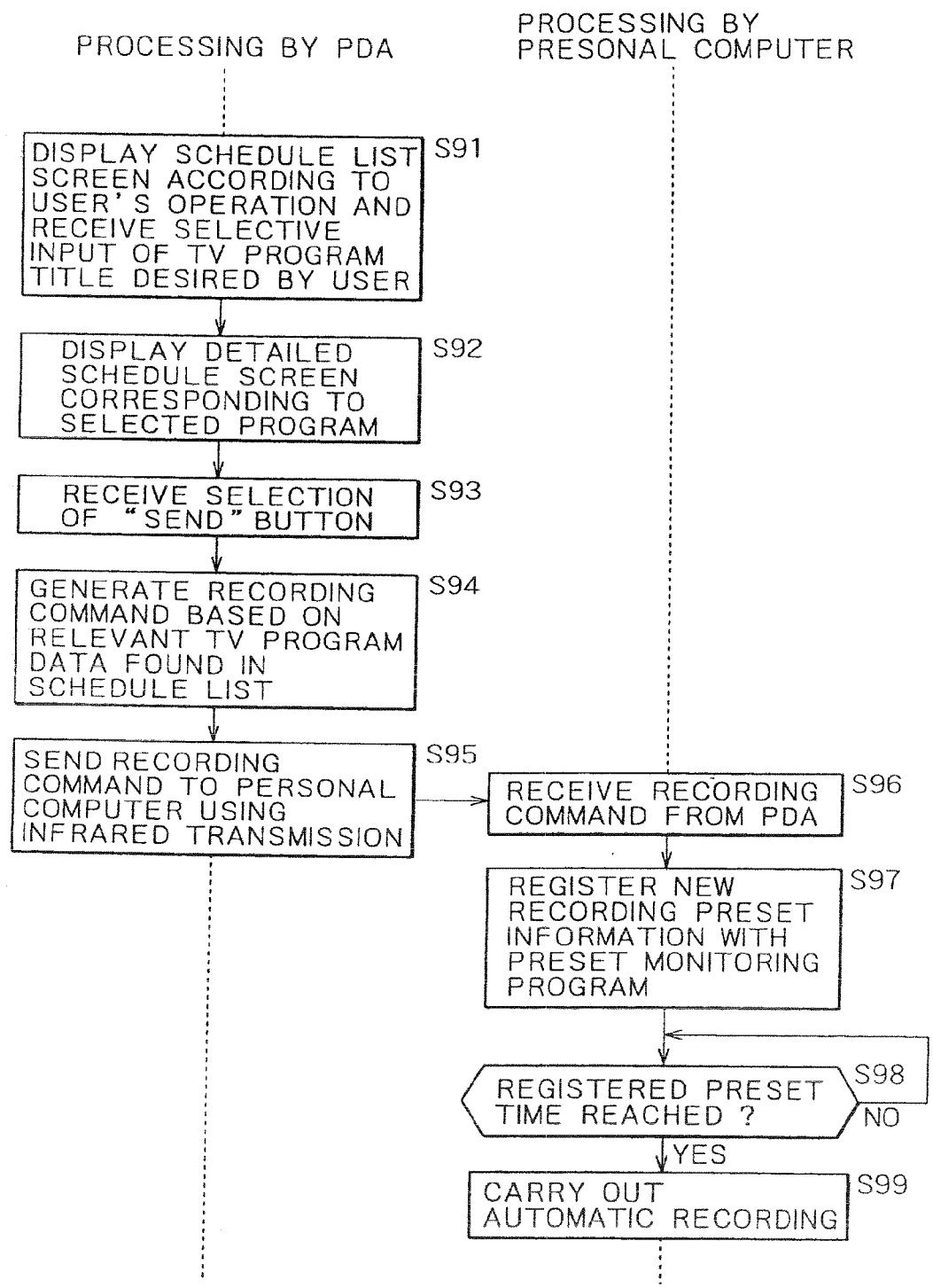
FIG. 46 is a flowchart of steps in which the PDA illustratively transmits a recording command to the personal computer through infrared communication.

In step S91 of FIG. 46, the TV program recording preset program 83 under control of the I/O control program 82 displays on the display unit 31 the preset list screen of FIG. 38 in response to the user's operation input from the touch pad control unit 48, jog dial 33, or keys 32. The TV program recording preset program 83 receives the selective input of the user's desired TV program from the touch pad control unit 48, jog dial 33, or keys 32 under control of the I/O control program 82.

In step S92, the TV program recording preset program 83 generates the schedule detail screen of FIG. 39 with regard to the selected TV program. Under control of the I/O control program 82, the generated screen is output to the display unit 31 for display.

In step S93, the TV program recording preset program 83 under control of the I/O control program 82 receives input of a signal representing the selection of the SEND button 363 from the touch pad control unit 48.

In step S94, the TV program recording preset program 83 generates a recording command based on the TV program data held in the preset list 92, and feeds the generated command to the data communication program 81. The recording command illustratively includes the channel on which the desired TV program is to be broadcast, as well as the start and end times of the broadcast.

In step S95, the data communication program 81 transmits the recording command generated in step S94 to the personal computer 9 through infrared communication.

In step S96, the recording preset program 178 of the personal computer 9 under control of the I/O management program 171 receives the recording command from the PDA 1 via the infrared communication unit 146 for wireless LAN communication unit 147). At this point, the recording preset program 178 may generate an acknowledge command acknowledging the receipt of the recording command from the PDA 1 and send the acknowledge command back to the PDA 1 through the infrared communication unit 146 (or wireless LAN communication unit 147) under control of the I/O management program 171.

After steps S97 through S99 which are equivalent to steps S62 through S64 of FIG. 36, the processing is terminated.

The processing above allows the user simply to preset the personal computer 9 or VCR 13 for unattended recording of desired TV programs, without recourse to such tedious steps as entering a 0 code number.

Using the infrared communication function of the PDA 1, the TV program recording preset program 83 may also allow the user to make entries on a remote-controlled basis into programs run by the personal computer 9. The remote control procedure eliminates the need for the user to manipulate the keyboard 138 or mouse 139 of the personal computer 9.

Figure 47:
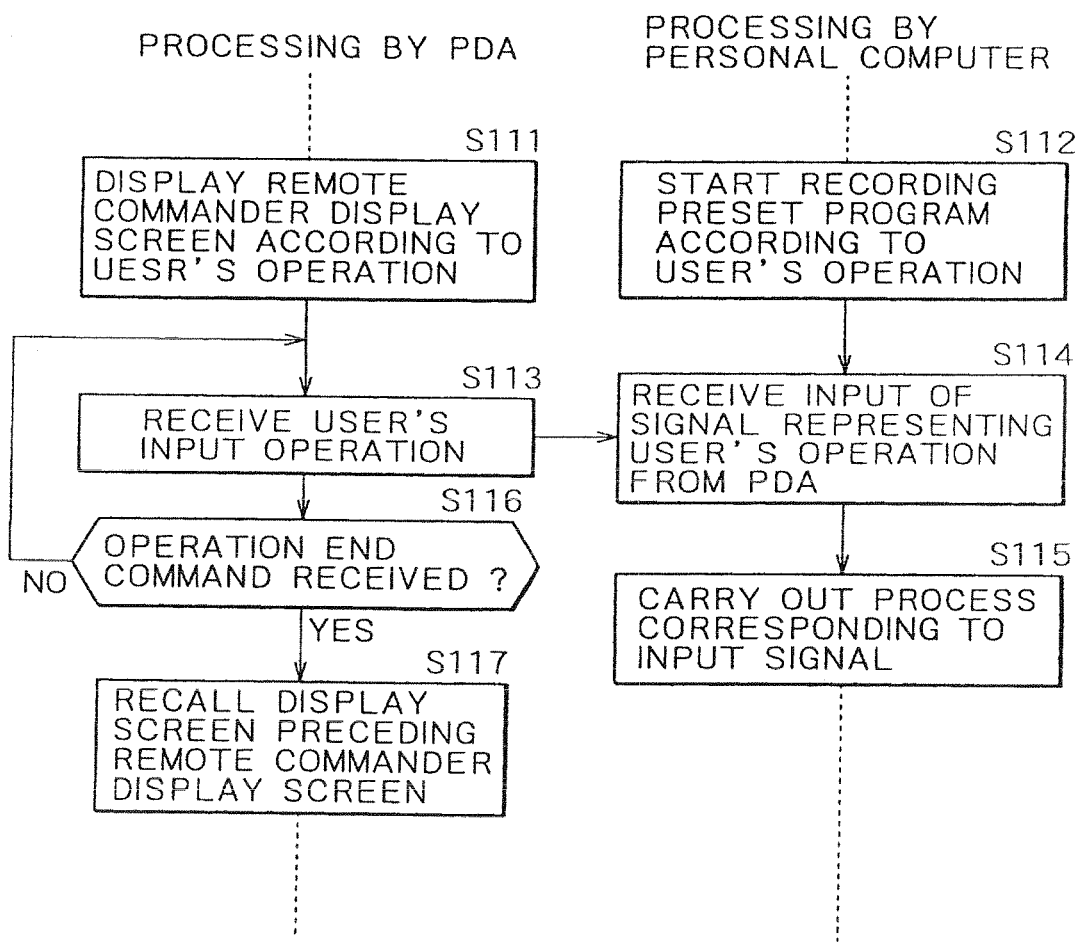
FIG. 47 is a flowchart of steps in which the PDA illustratively carries out a remote control process.

Described below with reference to the flowchart of FIG. 47 is a typical process of such remote control on the recording preset program 178 of the personal computer 9. In this example, the recording preset program 178 is started in the personal computer 9 and operated by the FDA 1 on a remote-controlled basis.

In step S111 of FIG. 47, the TV program recording preset program 83 under control of the I/O control program 82 displays a remote commander display screen in response to the user's operation input from the touch pad control unit 48, jog dial 33, or keys 32.

Figure 48:
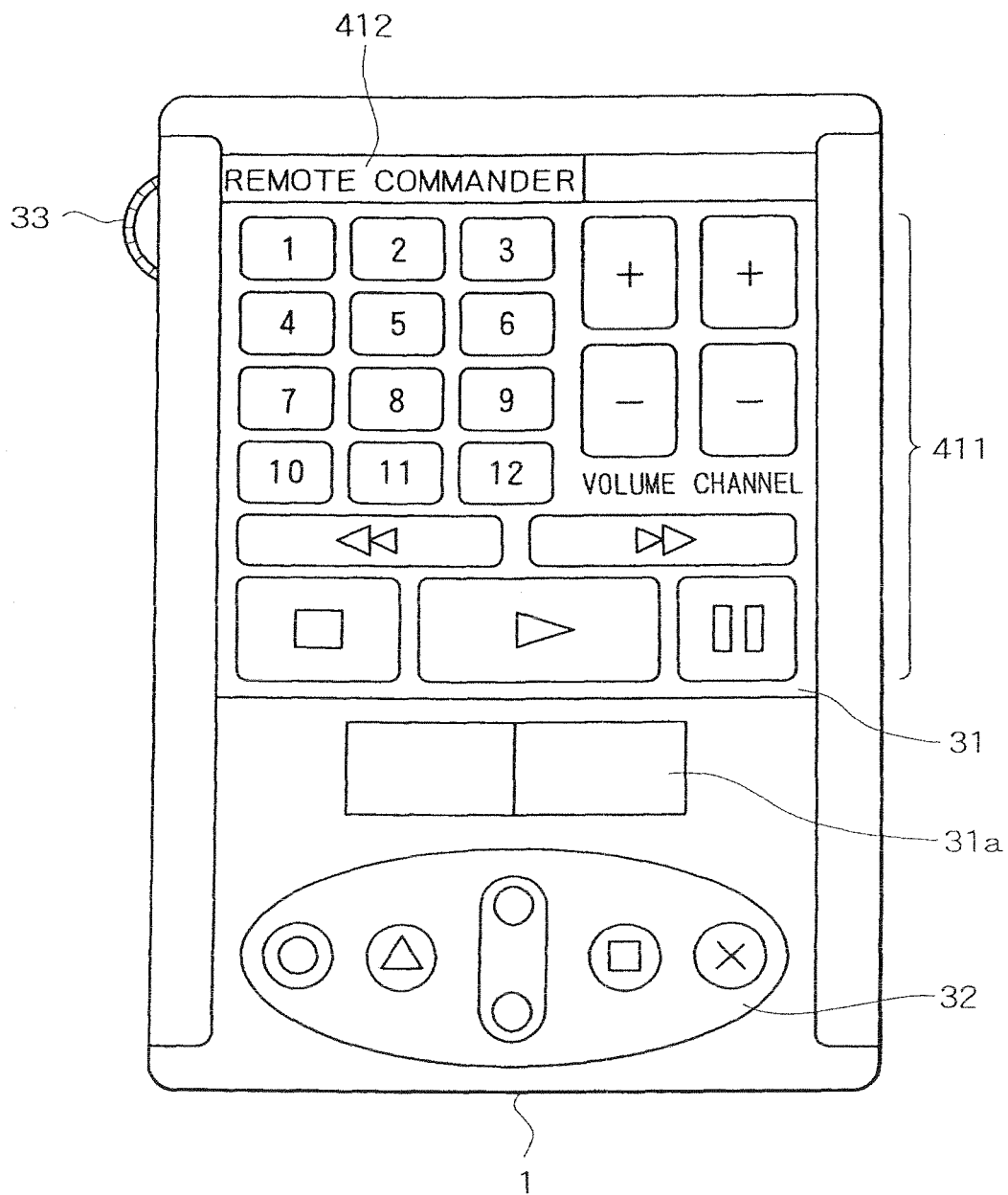
FIG. 48 is a schematic view of a typical remote commander display screen.
Figure 49:
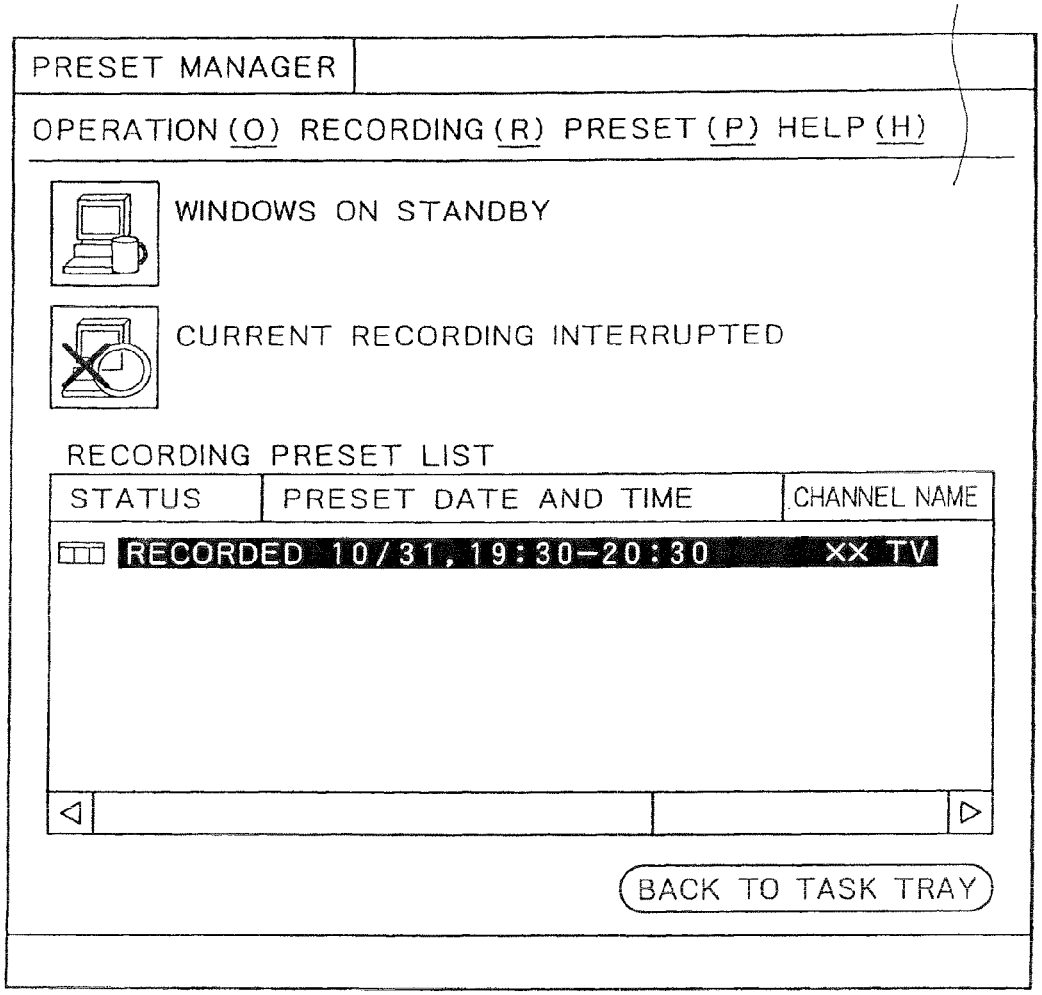
FIG. 49 is a schematic view of a typical recording preset screen displayed on the personal computer.

FIG. 48 shows a typical remote commander display screen. This display screen includes a group of keys 411 through which to enter various commands, and a tag 412 for calling up menu items. Selecting the tag 412 displays a drop-down list box, not shown, in which the user may designate the end of the remote commander display screen. In addition to the screen end menu item, the drop-down list box includes a plurality of commands such as the command for effecting transition to a display font setting screen.

In step S112, the CPU 131 of the personal computer 9 starts the recording preset program 178 in response to the user's operation. Under control of the I/O management program 171, the CPU 131 displays on the CRT 140 a recording preset screen 415 shown in FIG. 49.

In step S113, the TV program recording preset program 83 under control of the I/O control program 82 receives the user's operation input from the touch pad control unit 48, jog dial 33, or keys 32.

In step S114, the recording preset program 178 of the personal computer 9 under control of the I/O management program 171 receives input of a signal representing the user's operation from the PDA 1 through the infrared communication unit 146 (or wireless LAN communication unit 147). At this point, the recording preset program 178 may generate an acknowledge command acknowledging the receipt of the signal from the PDA 1 and send the acknowledge command back to the PDA 1 through the infrared communication unit 146 (or wireless LAN communication unit 147) under control of the I/O management program 171.

In step S115, the recording preset program 178 of the personal computer 9 carries out the process corresponding to the input signal. All signals representative of the user's operations input from the PDA 1 are arranged to correspond with commands ordering the recording preset program 178 to act accordingly. For example, if the user has rotated the jog dial 33, the selected tag on the menu bar or the location of the selected button is changed correspondingly on the recording preset screen displayed in step S112.

In step S116, the TV program recording preset program 83 under control of the I/O control program 82 checks to see whether an operation end command is received. If in step S116 the TV program recording preset program 83 judges that the operation end command has yet to be received, then step S113 is reached again and subsequent steps are repeated.

If in step S116 the TV program recording preset program 83 judges that the operation end command is received, then step S117 is reached. In step S117, the TV program recording preset program 83 under control of the I/O control program 82 calls up the display screen preceding the remote commander display screen of FIG. 48. This terminates the processing.

The steps in FIG. 47 allow the user simply to operate the PDA 1 in presetting the personal computer 9 for unattended recording of desired TV programs. In that case, the user need not be familiar with the handling of the keyboard 138 or mouse 139 in making the presetting.

Described below is another example in which the PDA 1 is used to execute a remote-controlled process, with the recording/reproduction program 177 performing a content reproduction process causing a display screen shown in FIG. 50 to appear on the CRT 140.

Figure 50:
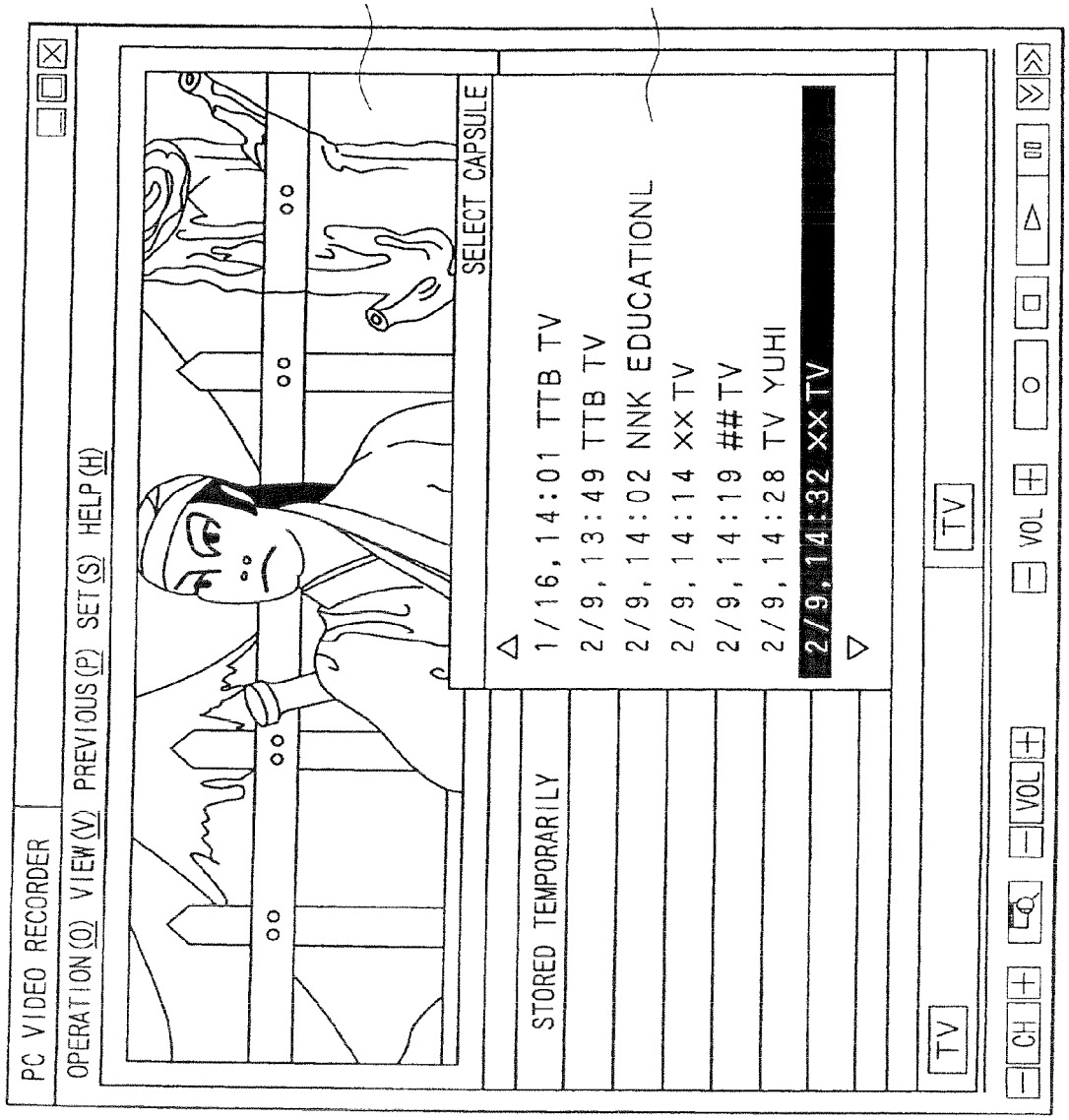
FIG. 50 is a schematic view of a typical video recorder window displayed on the personal computer.

A video recorder window 422 shown in FIG. 50 illustratively displays either moving picture data selected by the user or a currently broadcast TV program. The user may select and reproduce one of a plurality of program contents listed in a content capsule selection window 423 within the video recorder window 422. When selectively reproducing the desired content, the user may either push a suitable cursor key (i.e., a key with a directional arrow) among the group of keys 411 in FIG. 48, or rotate the jog dial 33.

Based on the signal representative of the user's operation input through the infrared communication unit 146 (or wireless LAN communication unit 147), the I/O management program 171 of the personal computer 9 controls the content name display in the content capsule selection window 423 in such a manner that each text displayed in reverse may be selected by turns.

In response to a signal that is input through the infrared communication unit 146 (or wireless LAN communication unit 147) denoting either a playback key being pushed within the group of keys 411 in FIG. 48 or the jog dial 33 being pushed into the enclosure of the device, the I/O management program 171 supplies the recording/reproduction program 177 with a signal indicating that the selection has been finalized. Given the input signal, the recording/reproduction program 177 reproduces the selected content accordingly.

Whereas the processing described above applies to the example of FIG. 50 in which the recording/reproduction program 171 is being active in the personal computer 9, the same processing basically applies when any other program is being activated in the personal computer 9. The correspondence above between the operation of the jog dial 33 and the resulting indication on the display screen of the personal computer 9 is only an example and is not limitative of the invention.

Using the infrared communication function of the PDA 1, the TV program recording preset program 83 may function as a remote controller of the VCR 13 in the same manner as described above.

Furthermore, the TV program recording preset program 83 may retrieve content data from the HDD 141 of the personal computer 9 by use of the infrared communication function of the PDA 1 and may reproduce the retrieved content data.

The HDD 141 of the personal computer 9 accommodates a plurality of content data items. The content data thus stored are managed and retrieved by the AV content management/search program 176.

Figure 51:
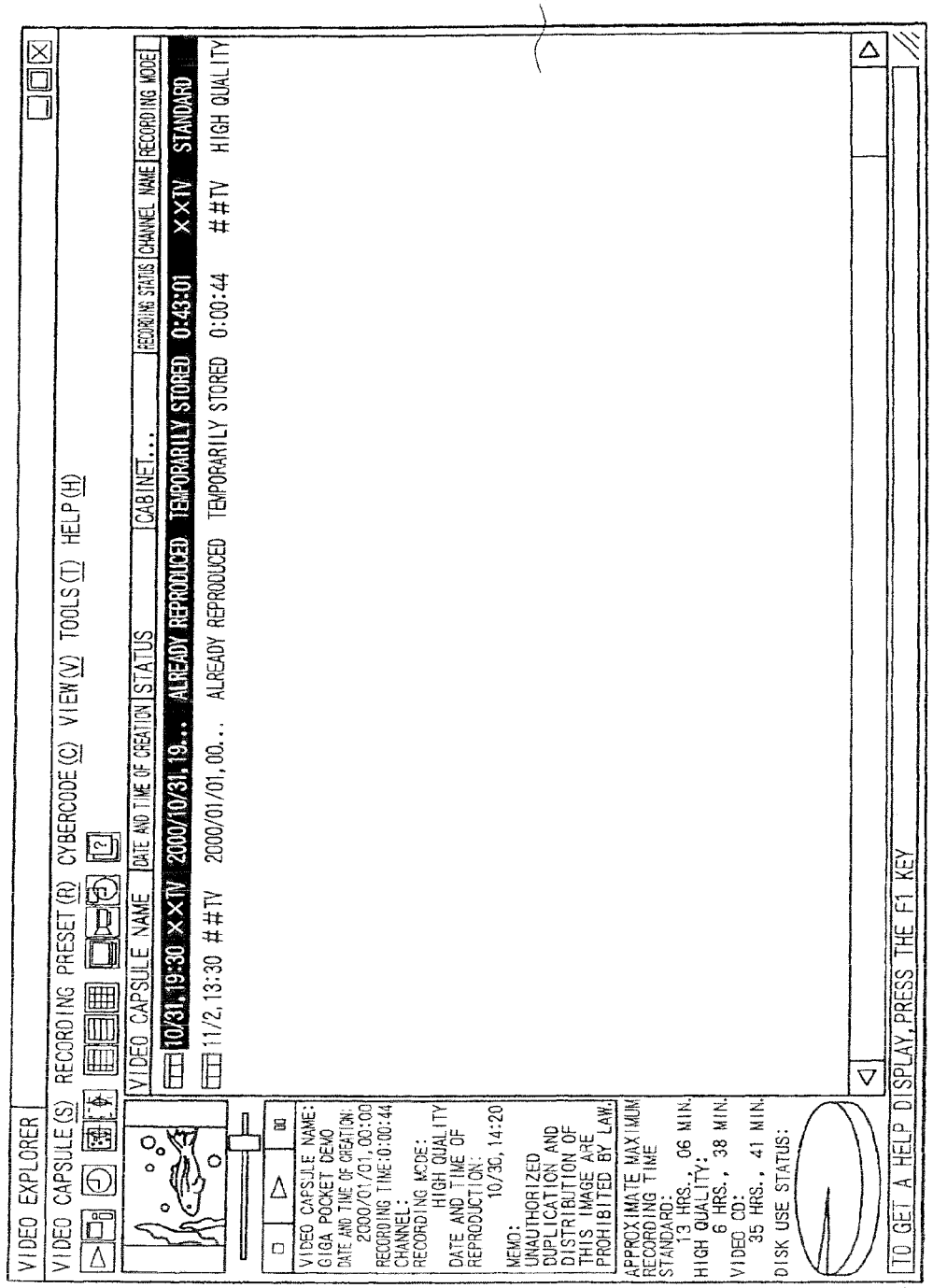
FIG. 51 is a schematic view of a typical AV content management/search screen displayed on the personal computer.

FIG. 51 shows an AV content management/search screen 431 displayed on the CRT 140 under control of the AV content management/search program 176. The AV content management/search screen 431 displays a table of content data held on the HDD 141. The content table shows content names illustratively along with the corresponding dates and times of creation (recording), content status information (reproduced or not reproduced), recorded content lengths, channel names, and recording modes used.

The PDA 1 has a smaller data storage capacity and a lower level of performance in displaying moving pictures than the personal computer 9. To make up for such limitations, the AV content conversion program 175 of the personal computer 9 converts stored content data to a suitable format that allows the PDA 1 to give adequate displays when supplied with limited amounts of content data. The converted content data are transmitted through the infrared communication unit 146 (or wireless LAN communication unit 147) to the PDA 1 under control of the I/O management program 171.

The TV program recording preset program 83 of the PDA 1 under control of the data communication program 81 supplies the moving picture display program 87 with the moving picture data from among the content data received from the infrared communication unit 22 (or wireless LAN communication unit 64). In turn, the moving picture display program 87 displays the corresponding moving pictures on the display unit 31 in keeping with the user's operation. At the same time, the audio data out of the content data are transferred to the audio reproduction unit 51 through the buffer 50 for audio playback.

Figure 52:
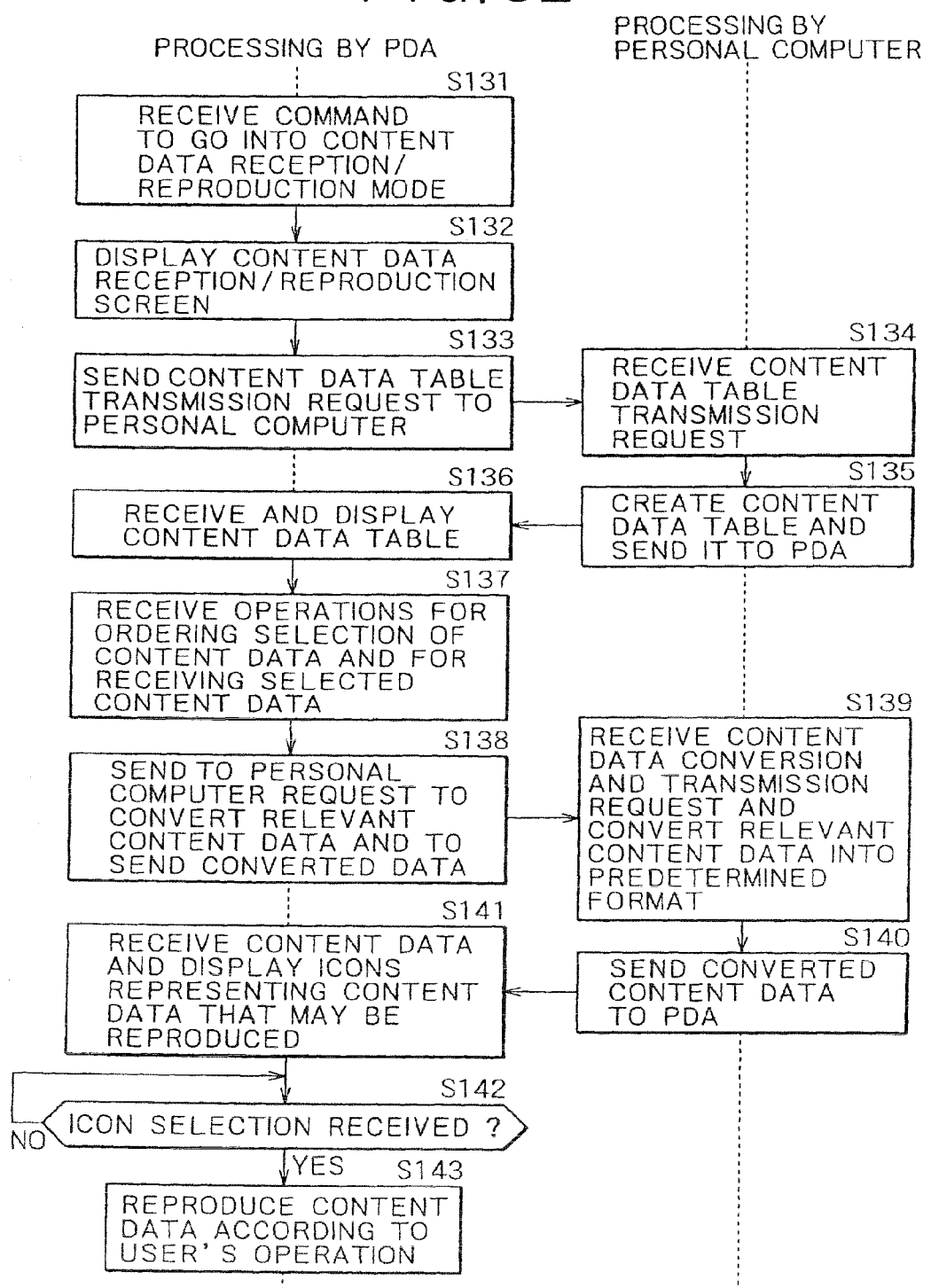
FIG. 52 is a flowchart of steps in which the personal computer illustratively transmits content data to the PDA.

Described below with reference to the flowchart of FIG. 52 is an example in which content data held in the personal computer 9 are transmitted to the PDA 1 through infrared communication for content data reproduction by the PDA 1.

Figure 53:
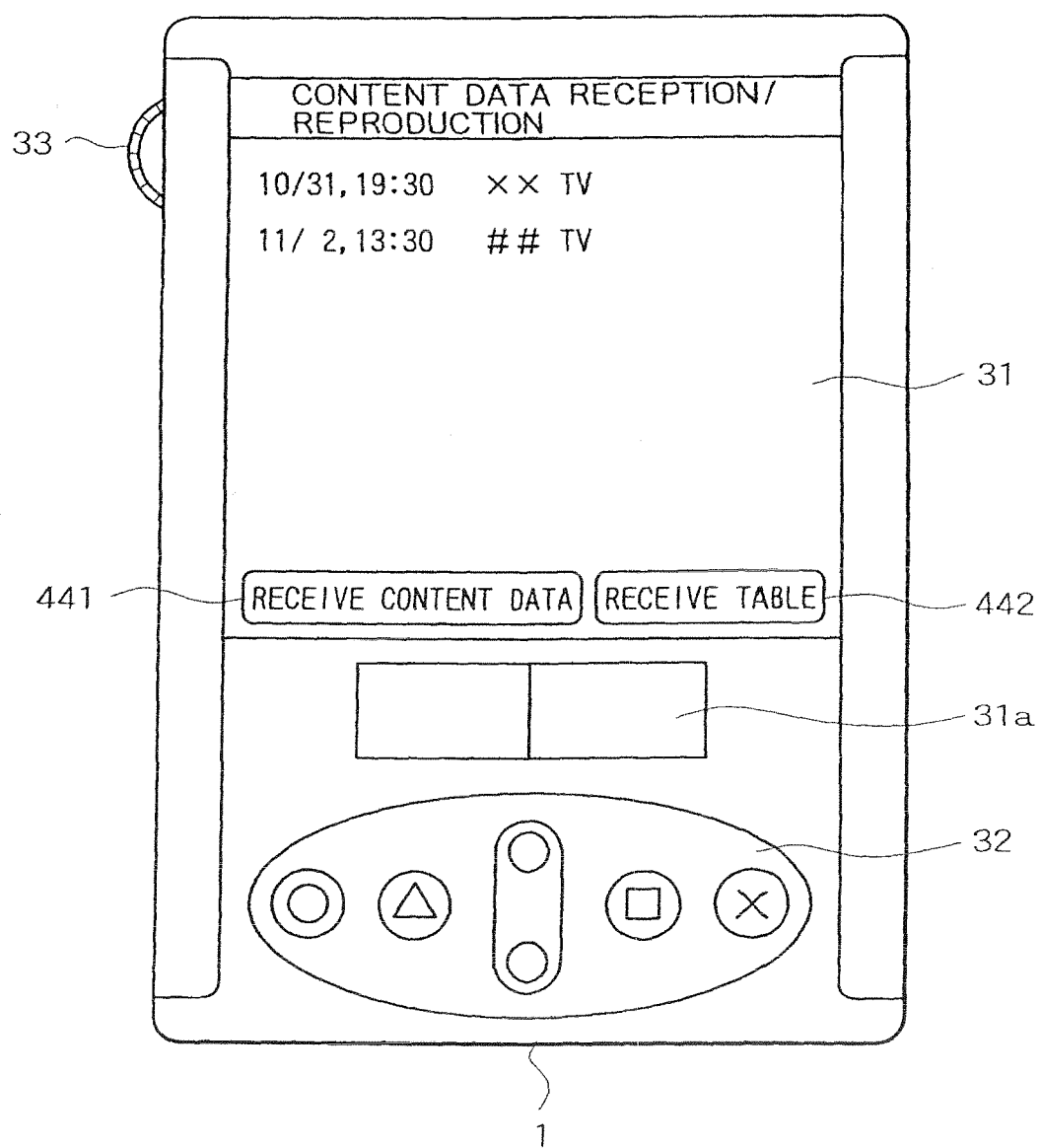
FIG. 53 is a schematic view of a typical content data reception/reproduction screen.

In step S131, the TV program recording preset program 83 of the PDA 1 under control of the I/O control program 82 receives from the touch pad control unit 48, jog dial 33, or keys 32 a command for transition to content data reception/reproduction mode. In step S132, the TV program recording preset program 83 displays a content data reception/reproduction screen as shown in FIG. 53. At this point, no content name is displayed on the screen because any content list has not been received from the personal computer 9 in step S132.

The content data reception/reproduction screen of FIG. 53 includes a "RECEIVE CONTENT DATA" button 441 and a "RECEIVE TABLE" button 442. The "RECEIVE CONTENT DATA" button 441 is pushed to receive desired content data from the personal computer 9. The "RECEIVE TABLE" button 442 is operated to receive a table of content data from the personal computer 9.

In step S133, the TV program recording preset program 83 of the PDA 1 under control of the data communication program 81 transmits a content data table transmission request to the personal computer 9 through the infrared communication unit 22 (or wireless LAN communication unit 64).

In step S134, the AV content management/search program 176 of the personal computer 9 under control of the I/O management program 171 receives the content data table transmission request via the infrared communication unit 146 (or wireless LAN communication unit 147).

In step S135, the AV content management/search program 176 creates a content data table and sends the table to the PDA 1 via the infrared communication unit 146 (or wireless LAN communication unit 147) under control of the I/O management program 171.

In step S136, the TV program recording preset program 83 of the PDA 1 under control of the data communication program 81 receives the content data table through the infrared communication unit 22 (or wireless LAN communication unit 64), generates display screen data making up a content data table screen, and outputs the generated data to the display unit 31 for display under control of the I/O control program 82.

Step S136, when carried out, displays on the content data reception/reproduction screen the content data table shown in FIG. 53, the table having been retrieved from within the personal computer 9.

From the displayed table of content data, the user selects the desired content and pushes the "RECEIVE CONTENT DATA" button 441. In step S137, the TV program recording preset program 83 under control of the I/O control program 82 receives from the touch pad control unit 48, jog dial 33, or keys 32 the input of both the selection of the content name and a signal representing the user's operation ordering the reception of the selected content data (i.e., the signal indicating that the "RECEIVE CONTENT DATA" button 441 is pushed).

In step S138, the TV program recording preset Program 83 generates a request to convert the relevant content data and to send the converted data. Under control of the data communication program 81, the TV program recording preset program 83 transmits the request to the personal computer 9 via the infrared communication unit 22 (or wireless LAN communication unit 64).

In step S139, the I/O management program 171 of the personal computer 9 receives the content data conversion and transmission request through the infrared communication unit 146 (or wireless LAN communication unit 147), and supplies the received request to the AV content management/search program 176. In turn, the AV content management/search program 176 searches for and retrieves the corresponding content data and feeds the retrieved data to the AV content conversion program 175. The AV content conversion program 175 converts the supplied content data into a format that allows the moving picture display program 87 of the PDA 1 to effect content displays on the display unit 31. The converted content data are sent to the I/O management program 171.

In step S140, the I/O management program 171 transmits the converted content data to the PDA 1 through the infrared communication unit 146 (or wireless LAN communication unit 147).

In step S141, the TV program recording preset program 83 of the PDA 1 under control of the data communication program 81 receives the content data through the infrared communication unit 22 (or wireless LAN communication unit 64), generates icons representing the content data that are available for reproduction, and outputs the generated icons to the display unit 31 for display under control of the I/O control program 82.

Figure 54:
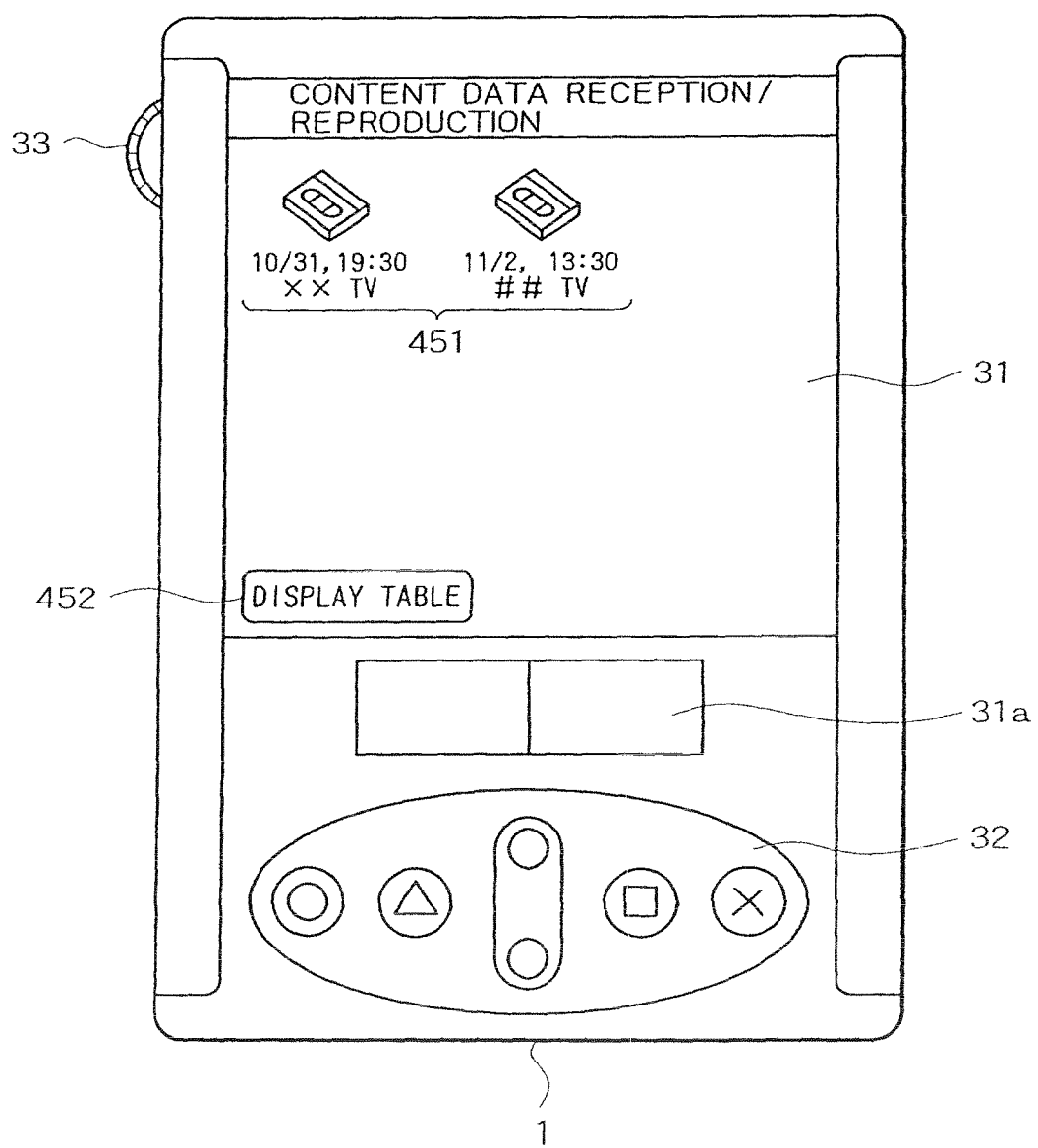
FIG. 54 is a schematic view of a reproduction command screen displaying icons denoting reproducible content data.

FIG. 54 shows a typical reproduction command screen indicating the icons representing the content data that can be reproduced. That is, the reproduction command screen shows a group of icons 451 corresponding to the reproducible content data, and a "DISPLAY TABLE" button 452 that is operated to go back to the table of content data in the content data reception/reproduction screen of FIG. 53.

In step S142, the TV program recording preset program 83 under control of the I/O control program 82 checks to see whether the selection of an icon is received on the basis of the signal input from the touch pad control unit 48, jog dial 33, or keys 32. If in step S142 the TV program recording preset program 83 judges that no icon selection has been received, then step S142 is repeated until selection of any icon is judged received.

If in step S142 the selection of an icon is judged received, then step S143 is reached. In step S143, the TV program recording preset program 83 supplies the content data selected in step S142 to the moving picture display program 87. In turn, the moving picture display program 87 under control of the I/O control program 82 outputs the supplied content data to the display unit 31 for playback in response to the user's operation. The processing is then terminated.

Figure 55:
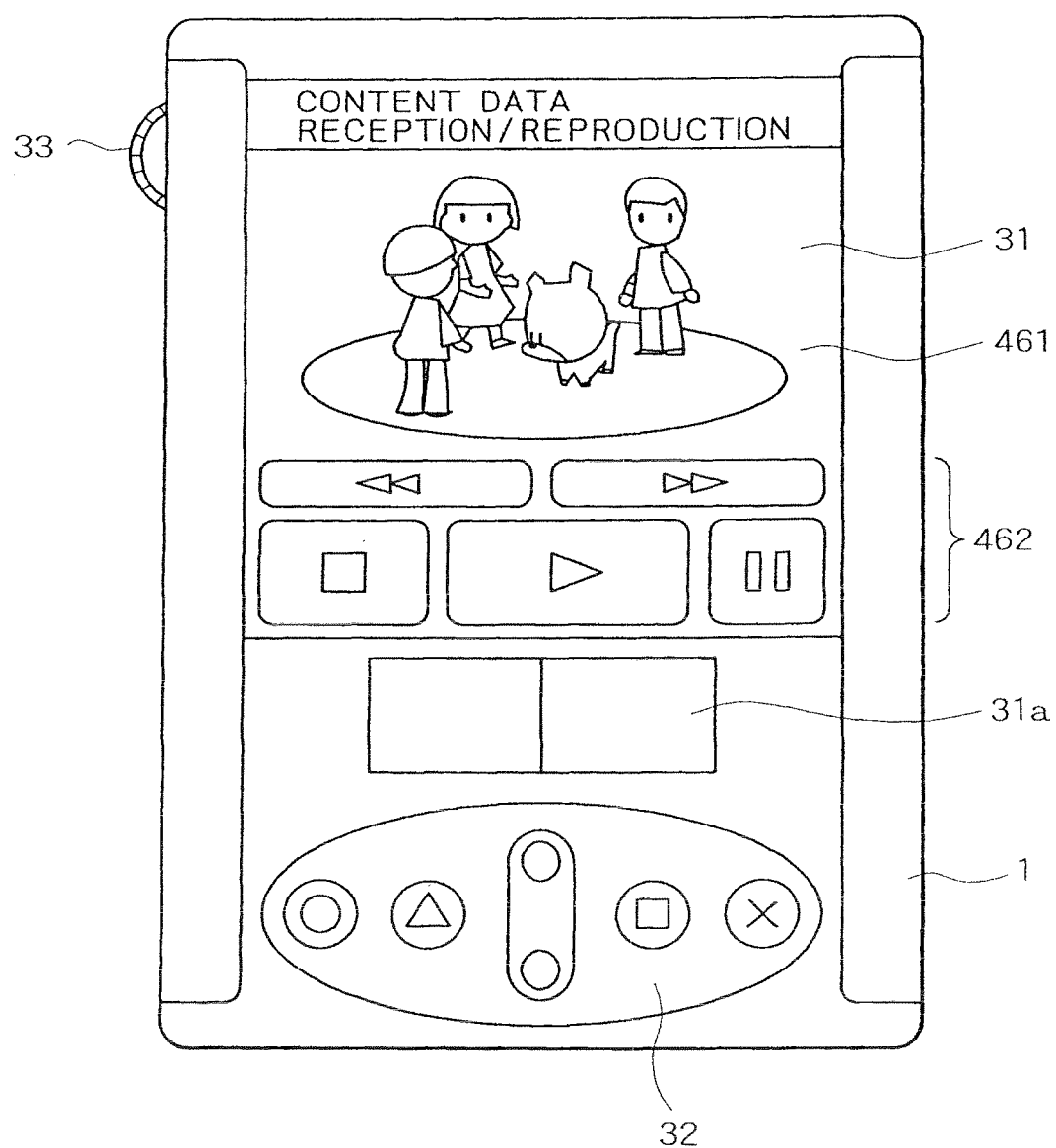
FIG. 55 is a schematic view of a typical display screen displaying content data.

FIG. 55 shows a typical display screen 31 displaying content data. In addition to a display area 461 displaying the content as moving pictures, the display screen 31 may include a group of buttons 462 that may be easily operated by the user.

The processing of FIG. 52 makes it possible for the PDA 1 to retrieve content data from the personal computer 9 and to reproduce the retrieved data. In a typical application, the user may enjoy watching content being reproduced on his or her PDA while moving in a train.

Without receiving the input of any operation from the PDA 1, the personal computer 9 can start the AV content conversion program 175 and thereby convert content data into a predetermined format. Illustratively, with the AV content management/search screen 431 displayed as shown in FIG. 51, activation of the AV content conversion program 175 causes a content conversion window 471 to appear as indicated in FIG. 56.

In that state, the user may drag the icon representing the desired content from the AV content management/search screen 431 into the content conversion window 471 and drop the icon there; the user may alternatively copy the icon of interest from the screen 431 into the window 471. In either case, the AV content conversion program 175 converts the content data corresponding to the user-selected icon into the predetermined format in the same manner as in step S139 above.

After their conversion to the suitable format, the AV data appear represented by icons 472 in the content conversion window 471.

In another example, the content conversion window 471 may include a menu screen allowing the user to operate the personal computer 9 so as to transmit the format-converted content data to the PDA 1 through infrared or wireless communication.

The series of steps described above may be executed either by hardware or by software. For software-based processing to take place, programs constituting the software may be either incorporated beforehand in dedicated hardware or installed upon use from a suitable program storage medium into a general-purpose personal computer or like equipment capable of executing diverse functions.

Computer-executable programs designed to perform the above-described processes when installed in a computer may be retained on such package media as the magnetic disk 71 (including floppy disks), optical disk 72 (including CD-ROM (compact disk-read only memory) and DVD (digital versatile disk)), magneto-optical disk 73 (including MD (Mini-Disc)), or semiconductor memory 124; or may be stored on the flash ROM 43 or the hard disk where the programs reside temporarily or permanently. The programs may be retained on these storage media after being transferred over wired or wireless communication media such as the public communication network 4, local area networks, the Internet 8, or digital satellite broadcasting networks via suitable interfaces such as routers and modems as needed.

In this specification, the steps which are stored on a program storage medium and which describe the programs to be executed represent not only the processes that are carried out in the depicted sequence (i.e., on a time series basis) but also the processes that are conducted parallelly or individually (e.g., in parallel or object-oriented fashion).

In this specification, the term "system" refers to an entire configuration made up of a plurality of component devices.

The above and other objects, features and advantages of the present invention will become apparent from the following description and the appended claims, taken in conjunction with the accompanying drawings in which like parts or elements denoted by like reference symbols.

What is claimed is:

1. A handheld terminal apparatus connected to a recording/reproducing apparatus, comprising:

first generating means for generating a first signal for causing said recording/reproducing apparatus to acquire program information about a program, the generation of said first signal being based on an operation performed by a user;

first transmitting means in the handheld terminal apparatus for transmitting to said recording/reproducing apparatus said first signal generated by said first generating means;

second generating means for generating a second signal for causing said recording/reproducing apparatus to display the acquired program information on the handheld terminal apparatus, the generation of said second signal being based on an operation performed by said user;

second transmitting means in the handheld terminal apparatus for transmitting to said recording/reproducing apparatus said second signal generated by said second generating means;

third generating means for generating a third signal for causing said recording/reproducing apparatus to preset said program for unattended recording, the generation of said third signal being based on an operation performed by said user;

third transmitting means in the handheld terminal apparatus for transmitting to said recording/reproducing apparatus said third signal generated by said third generating means;

fourth generating means for generating a fourth signal for causing said recording/reproducing apparatus to convert said program recorded based on said third signal to video data in a predetermined file format and to output the converted video data, the generation of said fourth signal being based on an operation performed by said user;

fourth transmitting means in the handheld terminal apparatus for transmitting to said recording/reproducing apparatus said fourth signal generated by said fourth generating means; and receiving means for receiving video data converted based on said fourth signal.

2. A handheld terminal apparatus according to claim 1, further comprising: display means for displaying video data received by the receiving means.

3. A handheld terminal apparatus according to claim 1, wherein said first transmitting means, said second transmitting means and said third transmitting means transmit infrared rays modulated to represent said first signal, said second signal and said third signal generated by said first generating means, said second generating means and said third generating means respectively.

4. A handheld terminal apparatus according to claim 1, wherein said first transmitting means, said second transmitting means and said third transmitting means transmit radio waves modulated to represent said first signal, said second signal and said third signal generated by said first generating means, said second generating means and said third generating means respectively.

5. A handheld terminal apparatus according to claim 1, wherein said fourth transmitting means transmits infrared rays modulated to represent said fourth signal generated by said fourth generating means.

6. A handheld terminal apparatus according to claim 1, wherein said fourth transmitting means transmits radio waves modulated to represent said fourth signal generated by said fourth generating means.

7. An information processing method for use with a handheld terminal apparatus connected to a recording/reproducing apparatus, comprising the steps of:
firstly generating a first signal for causing said recording/reproducing apparatus to acquire program information about a program, the generation of said first signal being based on an operation performed by a user;
firstly transmitting from the handheld terminal apparatus to said recording/reproducing apparatus said first signal generated in said first generating step;
secondly generating a second signal for causing said recording/reproducing apparatus to display the acquired program information on the handheld terminal apparatus, the generation of said second signal being based on an operation performed by said user;
secondly transmitting from the handheld terminal apparatus to said recording/reproducing apparatus said second signal generated in said second generating step;
thirdly generating a third signal for causing said recording/reproducing apparatus to preset said program for unattended recording, the generation of said third signal being based on an operation performed by said user;
thirdly transmitting from the handheld terminal apparatus to said recording/reproducing apparatus said third signal generated in said third generating step;
fourthly generating a fourth signal for causing said recording/reproducing apparatus to convert said program recorded based on said third signal to video data in a predetermined file format and to output the converted video data, the generation of said fourth signal being based on an operation performed by said user;
fourthly transmitting from the handheld terminal apparatus to said recording/reproducing apparatus said fourth signal generated in said fourth generating step; and receiving video data converted based on said fourth signal.

8. A non-transitory computer-program storage medium which stores a computer-program readable by a computer for controlling a handheld terminal apparatus connected to a recording/reproducing apparatus, the computer-program causing the computer to execute processing comprising the steps of:
firstly generating a first signal for causing said recording/reproducing apparatus to acquire program information about a program, the generation of said first signal being based on an operation performed by a user;
firstly transmitting from the handheld terminal apparatus to said recording/reproducing apparatus said first signal generated in said first generating step;
secondly generating a second signal for causing said recording/reproducing apparatus to display the acquired program information on the handheld terminal apparatus, the generation of said second signal being based on an operation performed by said user;
secondly transmitting from the handheld terminal apparatus to said recording/reproducing apparatus said second signal generated in said second generating step;
thirdly generating a third signal for causing said recording/reproducing apparatus to preset said program for unattended recording, the generation of said third signal being based on an operation performed by said user;
thirdly transmitting from the handheld terminal apparatus to said recording/reproducing apparatus said third signal generated in said third generating step;
fourthly generating a fourth signal for causing said recording/reproducing apparatus to convert said program recorded based on said third signal to video data in a predetermined file format and to output the converted video data, the generation of said fourth signal being based on an operation performed by said user;
fourthly transmitting from the handheld terminal apparatus to said recording/reproducing apparatus said fourth signal generated in said fourth generating step; and receiving video data converted based on said fourth signal.

9. A handheld terminal apparatus connected to a recording/reproducing apparatus, comprising:
first generating means for generating a first signal for causing said recording/reproducing apparatus to acquire program information about a program, the generation of said first signal being based on an operation performed by a user;
first transmitting means in the handheld terminal apparatus for transmitting to said recording/reproducing apparatus said first signal generated by said first generating means;
second generating means for generating a second signal for causing said recording/reproducing apparatus to display the acquired program information on the handheld terminal apparatus, the generation of said second signal being based on an operation performed by said user;
second transmitting means in the handheld terminal apparatus for transmitting to said recording/reproducing apparatus said second signal generated by said second generating means;
third generating means for generating a third signal for causing said recording/reproducing apparatus to preset said program for unattended recording, the generation of said third signal being based on an operation performed by said user;
third transmitting means in the handheld terminal apparatus for transmitting to said recording/reproducing apparatus said third signal generated by said third generating means;
first receiving means for receiving a fourth signal transmitted from said recording/reproducing apparatus;
fourth generating means for generating a fifth signal for causing said recording/reproducing apparatus to convert said program recorded based on said third signal to video data in a predetermined file format and to output the converted video data, the generation of said fifth signal being based on an operation performed by said user;

fourth transmitting means in the handheld terminal apparatus for transmitting to said recording/reproducing apparatus said fifth signal generated by said fourth generating means; and second receiving means for receiving video data converted based on said fifth signal.

10. A handheld terminal apparatus according to claim 9, wherein said first transmitting means, said second transmitting means and said third transmitting means transmit infrared rays modulated to represent said first signal, said second signal and said third signal generated by said first generating means, said second generating means and said third generating means respectively.

11. A handheld terminal apparatus according to claim 10, wherein said fourth signal is carried either by infrared rays or by radio waves.

12. A handheld terminal apparatus according to claim 9, wherein said first transmitting means, said second transmitting means and said third transmitting means transmit radio waves modulated to represent said first signal, said second signal and said third signal generated by said first generating means, said second generating means and said third generating means respectively.

13. A handheld terminal apparatus according to claim 9, wherein said fourth transmitting means transmits infrared rays modulated to represent said fifth signal generated by said fourth generating means.

14. A handheld terminal apparatus according to claim 9, wherein said fourth transmitting means transmits radio waves modulated to represent said fifth signal generated by said fourth generating means.

15. An information processing method for use with a handheld terminal apparatus connected to a recording/reproducing apparatus, comprising the steps of:

firstly generating a first signal for causing said recording/reproducing apparatus to acquire program information about a program, the generation of said first signal being based on an operation performed by a user; firstly transmitting from the handheld terminal apparatus to said recording/reproducing apparatus said first signal generated in said first generating step;

secondly generating a second signal for causing said recording/reproducing apparatus to display the acquired program information on the handheld terminal apparatus, the generation of said second signal being based on an operation performed by said user;

secondly transmitting from the handheld terminal apparatus to said recording/reproducing apparatus said second signal generated in said second generating step;

thirdly generating a third signal for causing said recording/reproducing apparatus to preset said program for unattended recording, the generation of said third signal being based on an operation performed by said user; thirdly transmitting from the handheld terminal apparatus to said recording/reproducing apparatus said third signal generated in said third generating step;

firstly receiving a fourth signal transmitted from said recording/reproducing apparatus;

fourthly generating a fifth signal for causing said recording/reproducing apparatus to convert said program recorded based on said third signal to video data in a predetermined file format and to output the converted video data, the generation of said fifth signal being based on an operation performed by said user;

fourthly transmitting from the handheld terminal apparatus to said recording/reproducing apparatus said fifth signal generated in said fourth generating step; and secondly receiving video data converted based on said fifth signal.

16. A non-transitory computer-program storage medium which stores a computer-program readable by a computer for controlling a handheld terminal apparatus connected to a recording/reproducing apparatus, the computer-program causing the computer to execute processing comprising the steps of:

firstly generating a first signal for causing said recording/reproducing apparatus to acquire program information about a program, the generation of said first signal being based on an operation performed by a user; firstly transmitting to from the handheld terminal apparatus said recording/reproducing apparatus said first signal generated in said first generating step;

secondly generating a second signal for causing said recording/reproducing apparatus to display the acquired program information on the handheld terminal apparatus, the generation of said second signal being based on an operation performed by said user; secondly transmitting from the handheld terminal apparatus to said recording/reproducing apparatus said second signal generated in said second generating step;

thirdly generating a third signal for causing said recording/reproducing apparatus to preset said program for unattended recording, the generation of said third signal being based on an operation performed by said user; thirdly transmitting from the handheld terminal apparatus to said recording/reproducing apparatus said third signal generated in said third generating step; firstly receiving a fourth signal transmitted from said recording/reproducing apparatus;

fourthly generating a fifth signal for causing said recording/reproducing apparatus to convert said program recorded based on said third signal to video data in a predetermined file format and to output the converted video data, the generation of said fifth signal being based on an operation performed by said user; fourthly transmitting from the handheld terminal apparatus to said recording/reproducing apparatus said fifth signal generated in said fourth generating step; and secondly receiving video data converted based on said fifth signal.

17. A recording/reproducing apparatus connected to a handheld terminal apparatus, comprising:

first receiving means for receiving a first signal for causing program information about a program to be acquired, said first signal being transmitted from said handheld terminal apparatus; acquiring means for acquiring said program information based on the received first signal; second receiving means for receiving a second signal for causing said program information to be displayed, said second signal being transmitted from said handheld terminal apparatus; display controlling means for causing display means to display said program information based on the received second signal; third receiving means for receiving a third signal for causing unattended recording of said program to be preset, said third signal being transmitted from said handheld terminal apparatus; recording means for presetting said unattended recording and recording said program, based on the received third signal; fourth receiving means for receiving a fourth signal for causing the recorded program to be converted to video data in a predetermined file format and causing the converted video data to be output, said fourth signal being transmitted from said handheld terminal apparatus; converting means for converting the recorded program to video data in a predetermined file format, based on the received fourth signal; and transmitting means for transmitting to said handheld terminal apparatus video data with converted file format.

\* \* \* \* \*